United States Patent [19]
Hornick et al.

[11] Patent Number: 5,255,184
[45] Date of Patent: Oct. 19, 1993

[54] AIRLINE SEAT INVENTORY CONTROL METHOD AND APPARATUS FOR COMPUTERIZED AIRLINE RESERVATION SYSTEMS

[75] Inventors: Scot W. Hornick, Naperville; Da D. Hong, Chicago, both of Ill.; Subhash Gupta, Minnetonka; Ravi Mehrotra, Bloomington, both of Minn.

[73] Assignee: Andersen Consulting, Chicago, Ill.

[21] Appl. No.: 630,261

[22] Filed: Dec. 19, 1990

[51] Int. Cl.$^5$ .......................................... G06F 15/26
[52] U.S. Cl. .................................. 364/407; 364/401; 364/408
[58] Field of Search ..................... 364/407, 401, 408

[56] References Cited

U.S. PATENT DOCUMENTS

| | | | |
|---|---|---|---|
| 2,542,890 | 2/1951 | Basu et al. | 340/825.37 |
| 2,883,106 | 4/1959 | Cornwell et al. | 235/385 |
| 4,862,357 | 8/1989 | Ahlstrom et al. | 364/407 |

OTHER PUBLICATIONS

E. L. Williamson, "Revenue Impacts of Seat Inventory Control," present to The Third International Airline Yield Mgmt. Conference, London, England, Dec. 3, 1990.
W. H. Press, B. P. Flannery, S. A. Teukolsky, and W. T. Vetterling, "Numerical Recipes," Cambridge University Press, 1986, pp. 300-307.
D. G. Luenberger, "Introduction to Linear and Nonlinear Programming," Addison-Wesley Publishing Company, 1973, pp. 168-188.
P. P. Belobaba, "Airline yield management; an overview of seat inventory control," 21 Transportation Science No. 2, May, 1987 pp. 63-72.
E. L. Williamson, "Comparison of the optimization techniques for origin-destinatin seat inventory control", Tech. Rpt. FTL-R88-2, Flight Transportation Lab., Massachusetts Institute of Technology, Cambridge, Mass., May 1988.
K. Littlewood, "Forecasting and control of passenger bookings," Proceedings of the 12th AGIFORS Symposium, Oct. 1972, pp. 95-117.
H. Richter, "The differential revenue method to determine optimal seat allotments by fare type," Proceedings of the 22nd AGIFORS Symposium Oct. 1982.
P. P. Belobaba, "Air travel demand and airline seat inventory management," Technical Rpt FTL-R87-8, Flight Trans. Lab. Mass. Inst. of Technology May 1987.
P. P. Belobaba, "Application of a probabilistic decision model to airline seat inventory control," 37 Oper. Rsrch No. 2, Mar. 1989.
F. Glover, R. Glover, J. Lorenzo, and C. McMillan, "The passenger-mix problem in the scheduled airlines," 12 Interfaces #3, Jun. 1982.

(List continued on next page.)

Primary Examiner—Roy N. Envall, Jr.
Assistant Examiner—Gita D. Shingala
Attorney, Agent, or Firm—Merchant, Gould, Smith, Edell, Welter & Schmidt

[57] ABSTRACT

An airline reservation system implemented using a computer wherein reservations are controlled by a seat inventory control system. The inventory control system produces optimal reservation control using network-wide booking limits while taking into account the probabilistic nature of demand. The inventory control system, based on a concept termed Network-Based Expected Marginal Seat Revenue (EMSR), does not require the large number of variables required by the other network-based approaches, and it incorporates a probabilistic demand model without resorting to computationally intractable integer programming.

22 Claims, 35 Drawing Sheets

OTHER PUBLICATIONS

R. D. Wollmer, "An airline reservation model for opening and closing fare classes," Unpublished Internal Rpt., McDonnell-Douglas Corp. 1985.

M. Mayer, "Seat allocation, or a simple model of seat allocation via sophisticated ones," 16th Annual Symposium of AGIFORS, Sep. 1976.

S. Dembo & T. Steinhaug, "Truncated-Newton algorithms for large scale unconstrained optimization," Mathematical Prog. 26, 1983.

D. P. Adhlfeld, J. M. Mulvey, R. S. Dembo, and S. A. Zenios, "Nonlinear programming on generalized networks," 13 ACM Transactions on Mathematical Software No. 4, 1987.

E. L. Williamson and P. P. Belobaba, "Optimization Techniques for Seat Inventory Control," Proceedings of the 28th Annual AGIFORS Symposium, 1988.

A. Jessop, "Optimal Seat Allocation for Airline Planning," 5th International Symposium on Forecasting, 1985.

R. E. Curry, "Optimal Airline Seat Allocation with Fare Classes Nested by Origins and Destinations," Trans. Science, vol. 24. #3, Aug. 1990.

S. L. Brumelle, J. I. McGill, T. H. Oum, K. Sawaki and M. W. Tretheway "Allocation of Airline Seats between Stochastically Dependent Demands," Trans. Science, vol. 24, No. 3, Aug. 1990.

R. W. Simpson, "Using Network Flow Techniques to Find Shadow Prices for Market Demands and Seat Inventory Control," Flight Trans. Lab Memorandum M89-Jan. 1989.

AIRLINE SEAT INVENTORY CONTROL METHOD AND APPARATUS FOR COMPUTERIZED AIRLINE RESERVATION SYSTEMS

BACKGROUND OF THE INVENTION

1. Field Of The Invention

This invention relates generally to an airline reservation system. In particular, the present invention provides an airline seat inventory control system for computerized airline reservation systems.

2. Description Of Related Art

Strategic and operational planning for commercial airlines are highly complicated problems, especially since the industry has been deregulated. In order to cope with this complexity, computer-based decision support systems have been adopted to facilitate the planning of schedules, routes, aircraft and crew rotations and yield management. Yield (or revenue) management is one of the most important aspects of the operational plan for a commercial airline. Yield management can be separated into two distinct parts: pricing and seat inventory control. Pricing involves the establishment of fare classes and tariffs within those classes for each specific origin-destination market. Seat inventory control is the periodic adjustment of nested booking limits for the various fare classes so as to optimize the passenger mix and thereby maximize the generated revenue. In particular, the objective is to fly the aircraft as full as possible without allowing the earlier-booking, discount-fare passengers to displace the later-booking, full-fare passengers.

Recently, considerable research has been devoted to developing automated seat inventory control methods (For a survey, see the following publications, all of which are incorporated herein by reference: P. P. Belobaba, "Airline yield management, an overview of seat inventory control," Transportation Science, 21, (1987), No. 2, pp. 63-72; for a comparative evaluation see E. L. Williamson, "Comparison of the optimization techniques for origin-destination seat inventory control," Technical Report FTL-R88-2, Flight Transportation Laboratory, Massachusetts Institute of Technology, Cambridge, Mass., May 1988). However, the proposed methods all have serious limitations.

Some methods are leg-based and therefore do not produce booking limits that are optimal in a system-wide sense. For example, the "locally greedy" approach used by these methods may not recognize the additional revenue generated by long-haul (multi-leg-itinerary) passengers versus short-haul (single-leg-itinerary) passengers, or, on the other hand, they may have an uneconomical bias to long-haul passengers. (see, e.g., the following publications, all of which are incorporated herein by reference: K. Littlewood, "Forecasting and control of passenger bookings," Proceedings of the 12th AGIFORS Symposium, 1972, pp. 95-117; A. V. Bhatia and S. C. Parekh, "Optimal allocation of seats by fare," Presentation to the AGIFORS Reservation Study Group, 1973; H. Richter, "The differential revenue method to determine optimal seat allotments by fare type," Proceedings of the 22nd AGIFORS Symposium, 1982, pp. 339-362; P. P. Belobaba, "Air travel demand and airline seat inventory management," Technical Report FTL-R87-8, Flight Transportation Laboratory, Massachusetts Institute of Technology, Cambridge, Mass., May 1987; P. P. Belobaba, "Application of a probabilistic decision model to airline seat inventory control:, Operations Research, 37 (1989), No. 2, pp. 183-197).

Other methods are network-based, but assume a deterministic demand model, i.e., they assume that demand for air travel in a particular market is known precisely without any uncertainty. (see, e.g., the following publication, which is incorporated herein by reference: F. Glover, R. Glover, J. Lorenzo, and C. McMillan, "The passenger-mix problem in the scheduled airlines," Interfaces, 12 (1982), pp. 73-79). Such methods do not reserve enough seats to capture higher-than-average demand for the more expensive fare classes. Further, these methods use linear programming formulations with large numbers of variables (and concomitantly time-consuming solutions) to determine the booking limits for each fare class. Efforts to simultaneously achieve network-wide optimally and account for the probabilistic nature of demand have resulted in 0-1 integer programming formulations with an even larger number of variables (see, e.g., the following publication, which is incorporated herein by reference: R. D. Wollmer, "An airline reservation model for opening and closing fare classes," Unpublished Internal Report, McDonnell-Douglas Corporation, Long Beach, Calif., 1985). The large number of variables and the complexity of the solution methods make these approaches unsuitable for real-world problems.

SUMMARY OF THE INVENTION

To overcome the limitations in the prior art discussed above, and to overcome other limitations readily recognizable to those skilled in the art, the present invention discloses an airline reservation system wherein reservations are controlled using, in part, a seat inventory control system. The present invention provides an airline seat reservation system that produces optimal reservation control using network-wide booking limits while taking into account the probabilistic nature of demand. The present invention, based on a concept termed Network-Based Expected Marginal Seat Revenue (EMSR), does not require the large number of variables required by the other network-based approaches, and it incorporates a probabilistic demand model without resorting to computationally intractable integer programming.

BRIEF DESCRIPTION OF THE DRAWINGS

In the drawings, where like numerals refer to like elements throughout the several views:

FIGS. 9A and 9B combined are a flow chart describing the logic of the Calculate Seats routine in the preferred embodiment of the present invention;

DETAILED DESCRIPTION OF THE PREFERRED EMBODIMENT

Figure 1:
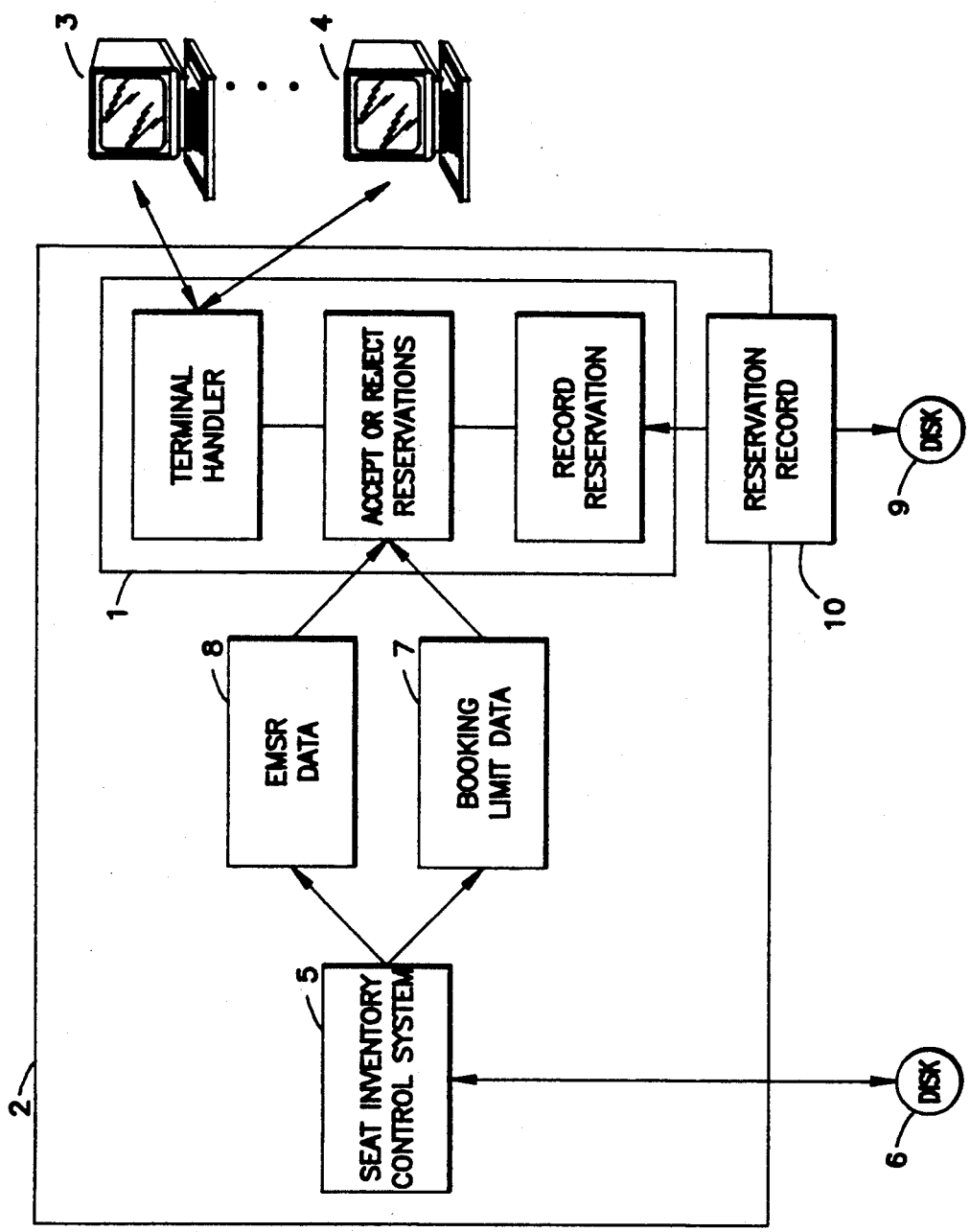
FIG. 1 is a block diagram describing the components of an airline seat reservation system.

In the following Detailed Description of the Preferred Embodiment, reference is made to the accompanying Drawings which form a part hereof, and in which is shown by way of illustration four embodiments in which the invention may be practiced. It is to be understood that other embodiments may be utilized, and changes may be made to both the that process and the structure without departing from the scope of the present invention.

The present invention is an airline seat reservation system wherein seat reservations are controlled using, in part, a seat inventory control system. The present invention provides optimal seat reservation control using network-wide booking limits while taking into account the probabilistic nature of demand. The seat reservation control, based on a concept termed Network-Based Expected Marginal Seat Revenue (EMSR), does not require the large number of variables required by the other network-based approaches, and it incorporates a probabilistic demand model without resorting to computationally intractable integer programming as compared in Table 1.

This Detailed Description is organized into six sections. In the first section, entitled "An Airline Seat Reservation System", the basic components of an airline seat reservation system are described, illustrating how the seat inventory control system can be integrated into such a system. The seat inventory control system generates the information necessary to set booking limits for the airline seat reservation system.

In the second section, entitled "A Mathematical Formulation", the mathematical formulation of the network-based seat inventory control problem as a constrained nonlinear optimization problem is described, illustrating how the problem can be reduced to the solution of a relatively small system of nonlinear equations by using the classical Lagrange multiplier technique. These Lagrange multipliers have a very interesting physical significance in that they represent the expected marginal seat revenue for each flight leg. By formulating the problem in terms of these variables, the number of variables required is greatly reduced.

In the third section, entitled "Solving the System of Nonlinear Equations," an iterative method for solving these nonlinear equations is described. This method initializes the values of the expected marginal seat revenues by performing a leg-based mileage-prorated EMSR allocation as a first pass. This initial local approximation is then iteratively refined by a truncated Newton-Raphson method until a globally optimal set of expected marginal seat revenues is obtained. For each iteration of the Newton-Raphson method, a system of linear equations is solved. The choice of the Conjugate Gradient method to solve the system of linear equations is justified by complexity theoretic considerations. It also permits the present invention to solve problems for which there is more than one optimal seat allocation (which would cause a singularity in the Jacobian matrix).

In the fourth section, entitled "Extensions for Overbooking, Nesting, and Multiple Origin-Destination Itineraries," the extensions that permit the handling of multiple itineraries serving the same origin-destination market, overbooking, and nesting of seat inventories by marginal revenues are described.

In the fifth section, entitled "Integrated Operational/Strategic Planning Based on Expected Marginal Seat Revenues," the use of the airline seat inventory control system in an integrated airline operational and strategic planning system is described.

In the sixth section, entitled "Implementation of Network-Based EMSR", the implementation of a preferred embodiment of the airline seat inventory control is described.

I. An Airline Seat Reservation System

FIG. 1 describes the elements of an airline seat reservation system 1 according to the present invention. The reservation system 1 is a software system that is executed by a computer 2. The reservation system 1 communicates with a plurality of remote terminals 3 and printers 4. The reservation system 1 accepts or rejects seat reservation requests and records those reservations 10 in a database 9. In the present invention, a seat inventory control software system 5, uses a flight network database 6 to generate booking limits 7 and/or expected marginal seat revenues (EMSRs) 8 for input to the reservation system 1. The reservation system 1 relies on this data 7 and 8 to determine whether to accept or reject seat reservation requests.

The flight network database 6 specifies a plurality of flight legs, a plurality of itineraries (including which flight legs are used therein), one or more fare classes for each itinerary, a known seat capacity for each flight leg, a known demand distribution for each itinerary/fare class combination, a known revenue yield for a seat reserved within each itinerary/fare class combination, and a booking limit for each itinerary/fare class combination. The seat inventory control system 5 processes the flight network database 6 to assign seats in a particular flight leg to one or more itinerary/fare class combinations in the flight network database 6.

The seat inventory control system 5 formulates a plurality of nonlinear equations representing a constrained optimization of an expected total revenue for the flight network and formulates a plurality of Lagrange multipliers each representing an EMSR for an additional seat available on a flight leg. This formulation maximizes the expected total revenue for the flight network, subject to capacity constraints for each flight leg. The seat inventory control system 5 refines an initial approximation of a solution to the nonlinear equations using a Newton-Raphson iteration to provide a globally optimal set of EMSRs 8 and booking limits 7. For each Newton-Raphson iteration, the linear equations are solved using a Conjugate Gradient iteration.

The seat inventory control system 5 first calculates an initial EMSR for each flight leg in the flight network database 6. A residual capacity is calculated for each of the flight legs in the flight network database 6. A matrix multiplication occurs between a Jacobian matrix comprised of a summation of a plurality of itinerary matrices and a vector comprising the residual capacities of the flight legs of the itinerary. In the Jacobian matrix, each itinerary matrix is comprised of a set of identical entries characteristic of an itinerary. The entries are comprised of partial derivatives of the residual capacity of the flight legs of the itinerary with respect to the EMSRs 8 of the flight legs of the itinerary. The result is a vector whose entries correspond to the flight legs of the itinerary. A new EMSR 8 is calculated for all flight legs in the flight network database. Those flight legs where the EMSR 8 is less than a tolerance value are removed from the flight network database 6. A booking limit 7 is then calculated for each itinerary/fare class in the flight network database 6. Those itinerary/fare classes where a sum of the EMSRs 8 for all flight legs of the itinerary is greater than the revenue generated are rejected from the flight network database 6. Those itinerary/fare classes which are rejected more than once are deleted from the flight network database 6. The residual capacity for each flight leg in the flight network database 6 is examined and the process repeats from the matrix-multiplication step if any of the absolute values of the residual capacities of the flight legs in the flight network database 6 are greater than or equal to 1. Then, the rejected itinerary/fare classes are brought back into the flight network database 6 and the process repeats from the step where the residual capacity is calculated for each of the flight legs in the flight network database 6 until a convergence occurs as indicated when there are no rejected itinerary/fare classes to be brought back into the flight network database 6. This provides an approximate solution to the linear system of equations.

As a final step, for those itineraries where the sum of the EMSRs 8 of all constituent flight legs are zero, the remaining seats are made available to the lowest fare classes. A record indicative of the classification of the airline seats and booking limits, or alternatively, the EMSRs 8, is created wherein the record can be used in an airline seat reservation system to control the assignment of the airline seats to passengers.

Operators at the reservation terminals 3 enter a seat reservation request for a particular itinerary. The computer 2 receives the seat reservation request from the reservation terminals 3 and the airline reservation system 1 lists as available only those fare classes that are acceptable for the given itinerary in accordance with the globally optimal set of EMSRs 8 and booking limits. The seat reservation request is accepted when a total number of seats reserved in the itinerary/fare class does not exceed the booking limit 7 for the itinerary/fare class, or, alternatively, when the seat reservation request would yield revenue greater than or equal to a sum of the EMSRs 8 for all flight legs in the itinerary. Otherwise, the request is rejected.

A status message indicating acceptance or rejection of the seat reservation request is transmitted by the airline seat reservation system 1 to the reservation terminal 3. If accepted, the reservation requests are recorded in the database 9 and a ticket may be printed on the printer 4 attached to the terminal 3.

II. A Mathematical Formulation

1. Deriving the Network Equations

The network-based seat inventory control problem can be formulated on a directed graph $D=(V,A)$, where the set of vertices $V$ represents the set of cities and the set of arcs $A$ represents the set of flight legs. If the seat inventory control system is controlling bookings for a particular day, then $A$ represents the set of all flight legs occurring on that day, and it may include more than one flight leg between some city pairs. A path or itinerary $p$ has a sequence of connecting flight legs in the graph $D$ with an origin city $s(p)$ and a destination city $t(p)$. If leg $a$ is included in itinerary $p$, then $a \in p$. In this context, only itineraries satisfying minimum connection times constraints and having non-negligible traffic demand will be considered. The set of all such itineraries is denoted by $P$, and for each $p \in P$, $f^i_p$ is established, which is the nominal revenue yield or tariff from fare class $i$ for itinerary $p$ travel from city $s(p)$ to city $t(p)$. Booking limits $S^i_p$ must be set for fare class $i$ on itinerary $p$ so as to maximize total system revenue, subject to the constraint that the total number of seats authorized for sale on each flight leg $a$ is exactly equal to the capacity of that leg $C_a$, i.e., the number of seats on the aircraft flying the leg (overbooking is considered in the fourth section below). As a matter of notation, the superscript $i$ is dropped whenever a total over all fare classes is taken, and hence:

$$S_{(s,t)} = \sum_{i=1}^{\phi} S_p^i$$

where $\phi$ is the number of fare classes or tariff code buckets.

Since demand is stochastic, the total system revenue is actually a random variable, and so the objective of the present invention is to maximize its expected value $R$, which is just the sum of the expected revenue for all itinerary/fare class combinations. Writing this as an equation gives:

$$R = \sum_{p \in P} \sum_{i=1}^{\phi} R_p^i(S_p^i) \quad (1)$$

The capacity constraint for leg a can be written as:

$$\sum_{\substack{p \in P \\ a \in p}} S_p = C_a, \text{ for all } a \in A \quad (2)$$

Thus, a constrained optimization problem is presented, wherein the revenue R from Eq. (1) is to be maximized subject to the constraints embodied by Eq. (2). The classical Lagrange multiplier method provides a solution for this constrained optimization problem. Introducing a multiplier $\lambda_a$ for each arc $a \in A$, a new objective function can be derived:

$$R = \sum_{p \in P} \sum_{i=1}^{\phi} R_p^i(S_p^i) - \sum_{a \in A} \lambda_a \left( \sum_{\substack{p \in P \\ a \in p}} S_p - C_a \right) \quad (3)$$

To maximize R, the following conditions must be satisfied:

$$\frac{\partial}{\partial S_p^i} R = 0, \text{ for all } p \in P \text{ and all } i = 1, 2, \ldots, \phi$$

which gives:

$$R_p^{i\prime}(S_p^i) = \sum_{a \in p} \lambda_a, \text{ for all } p \in P \text{ and all } i = 1, 2, \ldots, \phi \quad (4)$$

where:

$$R_p^{i\prime}(S_p^i) \triangleq \frac{\partial}{\partial S_p^i} R_p^i$$

and:

$$\frac{\partial}{\partial \lambda_a} R = 0, \text{ for all } a \in A$$

which simply gives the capacity constraints.

As is typical in such physical optimization problems, there is a physical interpretation of the Lagrange multipliers, which, in this case, is revealed by Eq. (4). This equation shows that the $\lambda_a$'s represent the expected marginal revenue generated by increasing the capacity on leg a by one seat. This becomes increasingly important, as described in the fifth section below, where it can be shown that the $\lambda_a$'s essentially characterize the network and can be used at higher levels of the planning process for such things as scheduling and routing.

The inverse function (by composition) of $R_p^{i\prime}(.)$ normalized by the fare $f_p^i$, i.e., $Q_p^i$, $(R_p^{i\prime}(S_p^i)/f_p^i) \triangleq S_p^i$, is denoted by $Q_p^i(.)$. Then, $Q_p^i(.)$ is applied to both sides of Eq. (4) to derive:

$$S_p^i = Q_p^i \left( \sum_{a \in p} \lambda_a / f_p^i \right) \quad (5)$$

Substituting Eq. (5) into the capacity constraints, gives:

$$\sum_{\substack{p \in P \\ a \in p}} \sum_{i=1}^{\phi} Q_p^i \left( \sum_{b \in p} \lambda_b / f_p^i \right) = C_a, \text{ for all } a \in A \quad (6)$$

Thus, the $|A| \lambda_a$'s are the variables, and the $|A|$ equations provided by Eq. (6) are used to determine the values of these variables. Since the number of variables equals the number of equations, appropriate solution methods can now be considered, but first there must be an explicit representation of $Q_p^i(.)$, which depends on a statistical model for demand.

2. Modeling the Demand

The demand for each itinerary/fare class is assumed to be distinct, i.e, for each itinerary/fare class there is a demand distribution function $d_p^i(s)$. If the demand distribution is approximated as continuous, then the expected revenue for an itinerary/fare class can be defined by:

$$R_p^i(S_p^i) = f_p^i \left[ \int_0^{S_p^i} s \, d_p^i(s) ds + S_p^i \int_{S_p^i}^{\infty} d_p^i(s) ds \right] \quad (7)$$

The derivative is thus defined by:

$$R_p^{i\prime}(S_p^i) = f_p^i \int_{S_p^i}^{\infty} d_p^i(s) ds \quad (8)$$

Notice that $R_p^{i\prime}(S_p^i)$ is just $f_p^i$ times the probability that the demand for fare class i travel on itinerary p exceeds $S_p^i$.

In order to derive a closed form for this quantity, a statistical characterization of the demand is determined. It has been suggested by R. D. Wollmer, in "An airline reservation model for opening and closing fare classes," Unpublished Internal Report, McDonnell-Douglas Corporation, Long Beach, Calif., 1985, that the demand for a given itinerary/fare class market can be approximately modeled as a Gaussian random variable with mean $\mu_p^i$ and variance $(\sigma_p^i)^2$. Under this model, the expected marginal seat revenue for travel on itinerary p in fare class i is:

$$R_p^{i\prime}(S_p^i) = \frac{f_p^i}{\sqrt{2\pi}\sigma_p^i} \int_{S_p^i}^{\infty} \exp\left[ -\frac{(x-\mu_p^i)^2}{2(\sigma_p^i)^2} \right] dx = \quad (9)$$

$$\frac{f_p^i}{2} \text{erfc}\left( \frac{S_p^i - \mu_p^i}{\sqrt{2}\sigma_p^i} \right)$$

where erfc is the complementary error function defined by:

$$\text{erfc}(x) \triangleq \frac{2}{\sqrt{\pi}} \int_x^{\infty} e^{-t^2} dt$$

This equation, in turn, implies that:

$$Q_p^i(x) = \mu_p^i + \sqrt{2}\ \sigma_p^i \text{erfc}^{-1}\left(\frac{2x}{f_p^i}\right) \quad (10)$$

which concretely specifies the form of Eq. (6). Alternative demand models, e.g., an incomplete gamma function, can be used by specifying a different form of Eq. (10).

III. Solving the System of Nonlinear Equations

1. An Iterative Method

Because $Q_p^i(\ )$ is a nonlinear function, the equations to be solved are also nonlinear. In this section, a solution method that is based on Newton-Raphson iteration is described. The values of the $\lambda_a$'s that satisfy the system:

$$\gamma_a = C_a - \sum_{\substack{p \in P \\ a \in p}} \sum_{i=1}^{\phi} Q_p^i\left(\sum_{b \in p} \lambda_b/f_p^i\right) = 0, \text{ for all } a \in A \quad (11)$$

must be determined. First, $$\lambda \triangleq [\lambda_1, \ldots, \lambda_{|A|}]^T$$

and $$\lambda \triangleq [\lambda_1, \ldots, \lambda_{|A|}]^T$$

are defined. To solve Eq. (11), a vector $\lambda$ must be found, such that:

$$\gamma(\lambda) = 0 \quad (12)$$

The Jacobian matrix J of the system in Eq. (11) is the matrix whose entries are the partial derivatives of the components of $\gamma$ with respect to the components of $\lambda$. Thus, $$(J)_{a,b} \quad \frac{\partial \gamma_a}{\partial \lambda_b} = -\sum_{\substack{p \in P \\ a,b \in p}} \sum_{i=1}^{\phi} \left(\frac{Q_p^{i'}\left(\sum_{c \in p} \lambda_c/f_p^i\right)}{f_p^i}\right) \quad (13)$$

where:

$$Q_p^{i'}(x) = -\sqrt{2\pi}\ \sigma_p^i \exp\{[\text{erfc}^{-1}(2x)]^2\} \quad (14)$$

is the derivative of $Q_p^i(x)$.

If $\lambda_i$ is the ith iterated approximate solution vector, then Newton-Raphson iteration (see, e.g., the following publication, which is incorporated herein by reference: W. H. Press, B. P. Flannery, S. A. Teukolsky, and W. T. Vetterling, "Numerical Recipes," Cambridge University Press, 1986) obtains an updated solution vector according to the formula:

$$\lambda_{t+1} = \lambda_t - \delta_t \quad (15)$$

where $\delta_t$ is a vector chosen such that:

$$J\delta_t = \gamma_t \quad (16)$$

Typically, Eq. (16) is solved by LU decomposition or some other method that requires an explicit representation of J. Eq. (16) may also be solved by the Conjugate Gradient method.

The Conjugate Gradient method is an iterative method for minimizing functions of several variables. It can be adapted to solving the linear system $Ax = b$ by defining the function:

$$f(x) \quad \frac{1}{2}\ \|Ax - b\|_2^2$$

and finding x to minimize f. In the event that A is symmetric positive semidefinite, improvements in computation time can be obtained by defining the function to be minimized as:

$$f(x) \quad \frac{1}{2} x^T A x - x^T b$$

which has gradient:

$$\nabla f = Ax - b$$

(see, e.g., the following publication, which is incorporated herein by reference: W. H. Press, B. P. Flannery, S. A. Teukolsky, and W. T. Vetterling, "Numerical Recipes," Cambridge University Press, 1986). In Eq. (16), J is indeed positive semidefinite (see Appendix A.1), and so the Conjugate Gradient method is applied to:

$$f(\delta_l) \quad \frac{1}{2} \delta_l^T A \delta_l - \delta_l^T \gamma_l \quad (17)$$

as detailed in the CONJUGATE GRADIENT routine of FIGS. 7A, 7B, 7C, and 7D. Thus, the preferred embodiment consists of a minor iteration (Conjugate Gradient) nested inside a major iteration (Newton-Raphson).

The Conjugate Gradient method offers several advantages over LU decomposition and other direct solution methods. First and foremost, it allows the exploitation of the sparse structure of J to obtain savings in computation time and storage space. In particular, because J is only used in matrix-vector multiplications (the calls to the JACOBIAN routine of FIG. 15 in the CONJUGATE GRADIENT routine of FIGS. 7A, 7B, 7C, and 7D), the matrix J need never be explicitly assembled. Instead, the matrix-vector multiplications are accumulated on an itinerary-by-itinerary basis, saving a tremendous amount of computation time.

To clarify this, consider the form of Eq. (13). This equation indicates that J can be thought of as the sum of several J(p)'s, each of which is the contribution of a specific itinerary p:

$$(J(p))_{a,b} = -\sum_{i=1}^{\phi} \left(\frac{Q_p^{i'}\left(\sum_{c \in p} \lambda_c/f_p^i\right)}{f_p^i}\right) \quad (18)$$

if $a, b \in p$, 0 otherwise

Thus, the matrix-vector product Jx can be computed as:

$$\sum_{p \in P} J(p)x$$

and the ath element of one of these terms is:

$$(J(p)x)_a = - \sum_{i=1}^{\phi} \left[ \frac{Q_p^{i} \left( \sum_{c \in p} \lambda_c / f_p^{i} \right)}{f_p^{i}} \right] \left( \sum_{b \in p} x_b \right)$$

if $a \in p$, 0 otherwise

A straightforward implementation of these equations gives an $O(|P| \text{avg}(\iota))$-time version of the JACOBIAN routine, where $\text{avg}(\iota)$ is the average number of legs in an itinerary in P. The number of iterations required for the Conjugate Gradient method is highly variable, depending strongly on the eigenvalue structure of J. Nevertheless, for a purely quadratic function like that in Eq. (17), convergence is guaranteed in $O(|A|)$ iterations (see, e.g., the following publication, which is incorporated herein by reference: D. G. Luenberger, "Introduction to Linear and Nonlinear Programming," Addison-Wesley Publishing Company, 1973, pp. 168-188). In many applications, the Conjugate Gradient method converges much faster. Indeed, only approximately 80 iterations were required for a realistic network with $|A| \approx 1400$ legs. Similar findings have been made in the application of the Conjugate Gradient method to solving finite element problems.

Since $|A| \leq |P|$, the time complexity of each minor iteration is dominated by the two calls to the JACOBIAN routine, and the overall time complexity of each major iteration is $O(|A||P| \text{avg}(\iota))$. In contrast, the standard LU decomposition procedure would require computation time $O(|A|)^3$. For typical values $|A| \approx 1400$, $|P| \approx 9000$, and $\text{avg}(\iota) \approx 3$, this provides a more than 70-fold improvement in computation time.

A second advantage of using the Conjugate Gradient method to solve Eq. (16) is that the iteration can be terminated early to give an approximate solution. During the early major iterations of the Newton-Raphson method, an exact solution of the linear system in Eq. (16) has no particular significance with respect to the underlying nonlinear system of equations; it is merely an approximate solution to the nonlinear system. This idea is the basis of the truncated Newton's method (see, e.g., the following publications, which are incorporated herein by reference: S. Dembo and T. Steihaug, "Truncated-Newton algorithms for large-scale optimization," Mathematical Programming, 26 (1983), pp. 190-212; and D. P. Adhlfeld, J. M. Mulvey, R. S. Dembo, and S. A. Zenios, "Nonlinear programming on generalized networks," ACM Transactions on Mathematical Software, 13 (1987), pp. 350-367), in which the relative error criterion for the solution of Eq. (16) becomes more stringent as the major iterations proceed. In the preferred embodiment, the convergence criterion:

$$\frac{\| J \delta_\iota - \gamma_\iota \|_2}{\| \gamma_\iota \|_2} \leq \eta_\iota$$

is adopted, with:

$$\eta_\iota = \min \left( \frac{1}{\iota + 2}, \| \gamma_\iota \|_2^{\iota} \right), \text{ where } 0 \leq \iota \leq 1$$

This ensures that this inexact Newton-Raphson method will exhibit local convergence of order $1+t$ (see, e.g., the following publication, which is incorporated herein by reference: R. S. Dembo and T. Steihaug, "Truncated-Newton algorithms for large-scale unconstrained optimization," Mathematical Programming, 26 (1983), pp. 190-212). In other words, because the Conjugate Gradient method can terminate earlier when the convergence criterion is less strict, the computation time per major iteration is reduced without sacrificing superlinear convergence.

A final benefit of using the Conjugate Gradient method is the fact that it can be applied to systems with singular Jacobians to find a minimum-norm, least-squared-error solution of Eq. (16). This may be necessary, for instance, whenever the optimal seat allocation is not unique.

2. Obtaining an Initial Estimate of the Solution

The determination of the starting point typically is critical to the success of the Newton-Raphson iteration. In the preferred embodiment, the approach is to set $\lambda_0$ according to the expected marginal seat revenues generated by a leg-based mileage-prorated EMSR method. For each fare class and for each flight leg, a leg-based EMSR method aggregates the demand in that fare class for each itinerary that includes that leg. In essence, effective leg/fare class demand statistics are computed from the itinerary/fare class demand statistics:

$$\mu_a^i \quad \sum_{\substack{p \in P \mu_p^i \\ a \in p}} \tag{19}$$

$$\sigma_a^i \quad \left[ \sum_{\substack{p \in P (\sigma_p^i)^2 \\ a \in p}} \right]^{\frac{1}{2}} \tag{20}$$

A nominal leg fare is also preferably computed for each fare class based on the fares for all origin-destination itineraries that include the leg. The several variants of the leg-based EMSR method differ only in the manner in which it is done. Specifically, in a leg-based mileage-prorated EMSR method, the revenue generated by a passenger with a particular itinerary typically is apportioned to each leg of the itinerary in a prorated (by leg mileage) fashion. The contribution of each origin-destination itinerary is also preferably weighted by the mean demand for that itinerary. Thus, the nominal fare for a given leg a and fare class i may be defined as:

$$f_a^i \quad \frac{\left[ \sum_{\substack{p \in P \mu_p^i f_p^i \frac{L(a)}{L(p)} \\ a \in p}} \right]}{\mu_a^i} \tag{21}$$

where L(a) and L(p) are respectively the length of leg a and the length of itinerary p in miles. This definition preserves the sense of the fare as a measure of the contribution of a passenger to total revenue.

The optimal seat inventories for leg-based EMSR can also be found by Newton-Raphson iteration. However, since this is a one dimensional problem, the method is considerably simpler than in the multidimensional case. The scalar version of the truncated Newton's method on leg a may be described by the following iteration:

$$\lambda_a^{(\iota+1)} = \lambda_a^{(\iota)} + \tag{22}$$

-continued $$\left( \sum_{i=1}^{\phi} \frac{\sqrt{2\pi} \, \sigma_a{}^i}{f_a{}^i} \exp\left( \left( \mathrm{erfc}^{-1}\left( \frac{2\lambda_a^{(t)}}{f_a{}^i} \right) \right)^2 \right) \right)^{-1} \gamma_a^{(t)}$$

If this iteration fails to converge, the preferred embodiment resorts to a binary search on the interval between the greatest lower bound and the least upper bound.

3. Handling Out-of-Range EMSR's

Since the complementary error function is a cumulative probability density function, its range is the closed interval [0,1], which is the domain of its inverse $\mathrm{erfc}^{-1}(.)$. However, bounded values are returned by $\mathrm{erfc}^{-1}$ only for arguments in the open interval (0,1). Considering Eq. (10), it becomes apparent that computational difficulty arises whenever:

$$\sum_{a \in p} \lambda_a \leq 0 \text{ or } \sum_{a \in p} \lambda_a \geq f_p{}^i$$

for some fare class i. In fact, it is numerically necessary to take precautions whenever this sum approaches either of these extremes.

The physical interpretation and handling of these two situations is quite different. The first situation can arise under two separate circumstances: (1) an itinerary has a capacity almost certain to exceed the demand, or (2) the update due to the Truncated Newton iteration has "overcorrected" one or more $\lambda$'s and driven them negative. In the first case, it is somewhat artificial to determine booking limits since it would almost never be necessary to deny a passenger a seat on this itinerary. Therefore, such itineraries and their constituent legs (which all must have $\lambda_a \approx 0$) are removed from the system, with the capacity of the legs "dumped" into the lowest fare classes of all itineraries using them. Of course, since the seat inventories are nested, this does not mean that seats are denied to passengers in higher fare classes. In the second case, it typically is necessary to "damp" the Truncated Newton update for those legs whose $\lambda$'s would be otherwise driven negative. This is done by setting:

$$\lambda_a^{(t+1)} = \frac{\lambda_a^{(t)}}{10}$$

instead of allowing them to become negative.

The second situation corresponds to the existence of an itinerary/fare class that is (at least with the current approximate EMSR's) not economical for the airline to offer. Typically, in this case, the booking limits for this itinerary/fare class should be set to zero (subject to government regulations), and it should be rejected from the system. It is possible that such itinerary/fare classes really do belong in the system, but that the approximate EMSR's on the itinerary were temporarily higher than the optimal solution. In order to deal with this possibility, it is preferable to reexamine these rejected itinerary/fare classes after convergence is achieved in order to determine whether they can be reincorporated into the system. At this point, the itinerary/fare classes are ordered by the degree to which their fares exceed the final values of the itinerary EMSR. Any itinerary/fare class whose fare does not exceed the EMSR can be eliminated since adding itineraries can only increase EMSR's. The rejected itinerary/fare classes are then considered in order, with an itinerary/fare class being added as long as it does not include a leg a whose corresponding $\gamma_a$ does not exceed 1 in absolute value. This tends to limit the number of strongly competing itinerary/fare classes that are simultaneously reincorporated. The process normally terminates when all itinerary/fare classes have been either incorporated or eliminated.

IV. Extensions for Overbooking and Nesting

Overbooking is the practice of authorizing the sale of seats in excess of an aircraft's seating capacity. This practice increases revenues on flights where there is a high incidence of cancellation or no-shows. Overbooking can easily be handled in a network-based EMSR seat inventory control system by setting the capacity of leg a to $B_a C_a$ where $B_a$ is the overbooking factor for flight leg a. This allows the definition of leg-specific overbooking factors. An alternative approach is to establish itinerary/fare class-specific overbooking factors.

In network-based EMSR, seat inventories typically can be nested according to the value of the $\lambda$'s along a particular itinerary. Because of the computational efficiency of the method described above, the EMSR's can be realistically maintained in real-time, with adjustments made dynamically as new reservations or cancellations alter the residual capacity. Previous EMSR's are simply used as initial approximations in computing updated values. This allows the preferred embodiment to avoid the problem of reducing itinerary/fare class booking limits (many of which will be fractional) to integers. Instead, a passenger's request for a seat reservation is typically granted whenever the fare offered exceeds the sum of the EMSR's along the itinerary. An equivalent option is to maintain a Boolean-valued vector with one component corresponding to each origin-destination-fare class. A component of this vector is normally 1 if the corresponding fare exceeds the sum of the EMSR's along the itinerary. A request can then be granted or refused simply by examining this vector. The exact implementation will of course depend on the details of the passenger reservation system and other compatibility issues.

Figure 2:
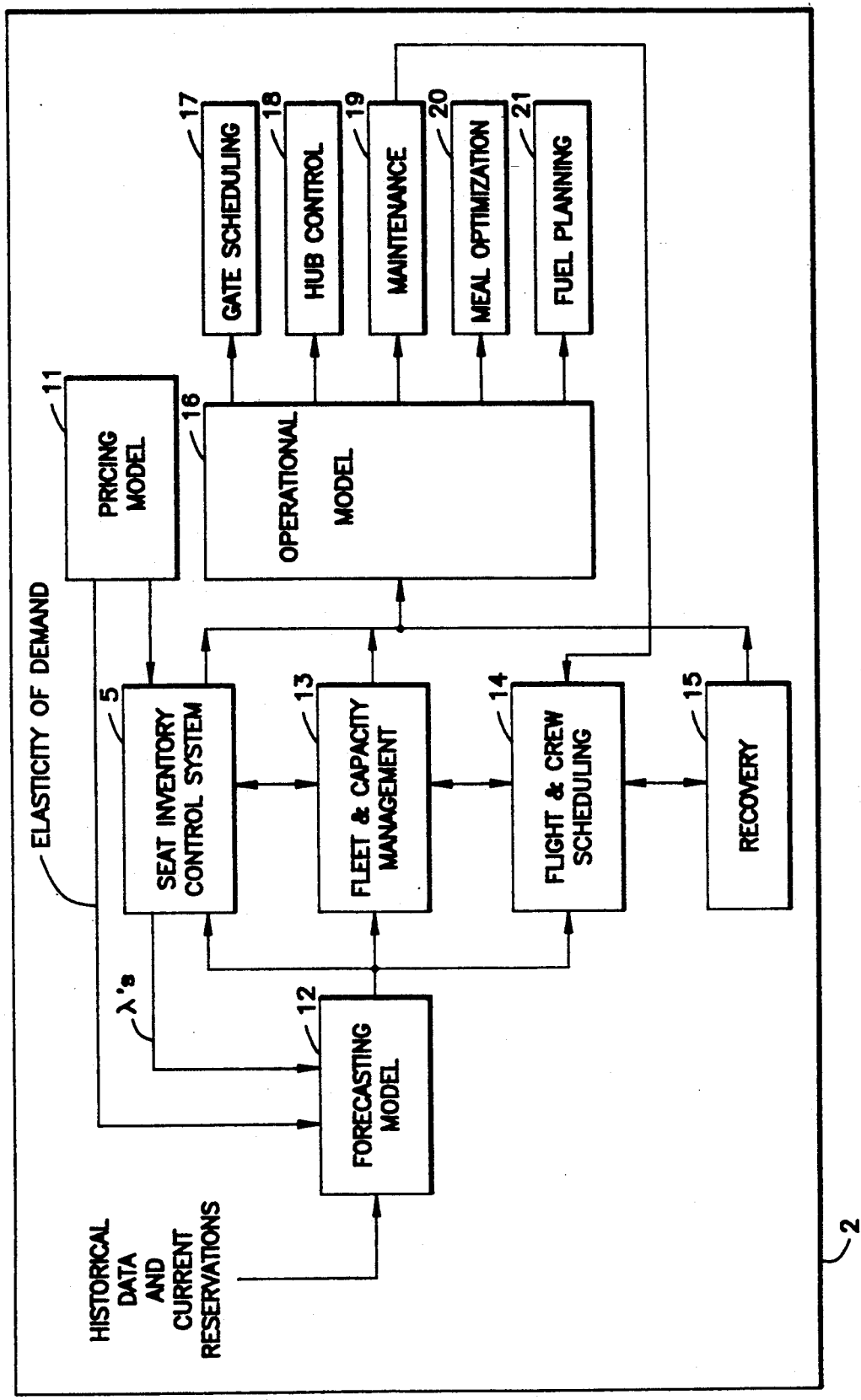
FIG. 2 is a block diagram describing the components of an integrated operation and strategic planning system using the inventory control method and apparatus of the preferred embodiment of the present invention.

V. Integrated Operational/Strategic Planning Based on Expected Marginal Seat Revenues The EMSR's computed by network-based EMSR seat inventory can be useful in many other aspects of airline planning as illustrated in FIG. 2. Ideally, the pricing model system 11 and forecasting model system 12 would provide real-time, up-to-date data to the seat inventory control system 5. The EMSR data generated by the seat inventory control system 5 could be used as feedback to modify or correct global decision variables in a fleet and capacity management system 13, a flight and crew scheduling system 14, and an operational model system 16 comprised of a gate scheduling system 17, a hub control system 18, a maintenance system 19, a meal optimization system 20, and a fuel planning system 21. For example, a high EMSR value might indicate to the fleet and capacity management system 13 that additional capacity (i.e., a larger aircraft) should be allocated to the corresponding leg. Alternatively, a high EMSR value might trigger the pricing model system 11 to increase fares on all paths going through the leg, simultaneously capturing more revenue and reducing demand through price elasticity. A leg with a very low EMSR, in contrast, would not require extremely accurate forecasts of demand. Such a leg might also be a good candidate for a reduction in flight frequency. These possible relationships are conveyed in the conceptual architecture of FIG. 2.

VI. Implementation of Network-Based EMSR

FIGS. 3-20 are flow charts describing the operation of a number of routines of a computer program in the preferred embodiment. The following symbols are used in the flow charts and the descriptions thereof:

1. ITIN is an itinerary (also termed "path").
2. ITIN-F is an itinerary/fare class combination.
3. LEG-F is a flight leg/fare class combination.
4. FARE(ITIN-F) is the fare for an ITIN-F.
5. FARE(LEG-F) is the sum of all FARE(ITIN-F)'s for all paths containing the leg, multiplied by the Leg Miles, divided by the itinerary miles, and divided by the sum of all means of the demand for the ITIN-F for all paths that include the leg.
6. S(ITIN-F) is the booking limits for the ITIN-F.
7. S(LEG-F) is the sum of all S(ITIN-F)'s for all ITIN-F's on the leg.
8. NEW_S(ITIN-F) is the new booking limits for the ITIN-F.
9. $\lambda$(LEG) is the expected marginal seat revenue (EMSR) generated by increasing the capacity of the leg by 1 seat.
10. $\lambda$_OFFSET(ITIN-F) is the maximum EMSR the itinerary may generate.
11. $\lambda$_SUM(ITIN) is the sum of the $\lambda$(LEG)'s for all legs of the itinerary.
12. $\mu$(ITIN-F) is the mean of the demand for the ITIN-F.
13. $\mu$(LEG-F) is the sum of all $\mu$(ITIN-F)'s for all paths that include the leg.
14. $\mu$_SUM(ITIN) is the sum of all $\mu$(ITIN-F)'s for all fare classes on the itinerary.
15. $\sigma$(ITIN-F) is the standard deviation of the demand for the ITIN-F (i.e., $\sigma^2$(ITIN-F) is the variance of the demand for the ITIN-F).
16. $\sigma$(LEG-F) is the sum of all $\sigma$(ITIN-F)'s for all itinerary/fare class combinations that include the leg.
17. $\sigma$_SUM(ITIN) is the sum of all $\sigma$(ITIN-F)'s for fare classes on the itinerary.
18. $\gamma$(LEG) is the residual capacity value for each leg.
19. $\delta$(LEG) is the change in the EMSR, i.e., $\delta$(LEG).
20. ROOT2(ITIN-F) is the value defined by:

$$= \frac{\sqrt{2\pi}\, \sigma(ITIN\text{-}F)}{FARE(ITIN\text{-}F)}$$

21. FLAG(ITIN-F) is 0 if ITIN-F is currently rejected, $-1$ if ITIN-F is deleted, and 1 if ITIN-F is in network.
22. REJECTED(ITIN-F) is 1 if ITIN-F has been previously or is currently rejected, and 0 if ITIN-F has never been rejected.
23. EXPCFRESQ(ITIN) is the summation for all ITIN-F's in the itinerary of:

$$\exp\left(\left(erfc^{-1}\left(\frac{2\,\lambda\_SUM(ITIN)}{FARE(ITIN\text{-}F)}\right)\right)^2\right) ROOT2(ITIN\text{-}F)$$

24. $\epsilon$ is a tolerance value.

Figure 3:
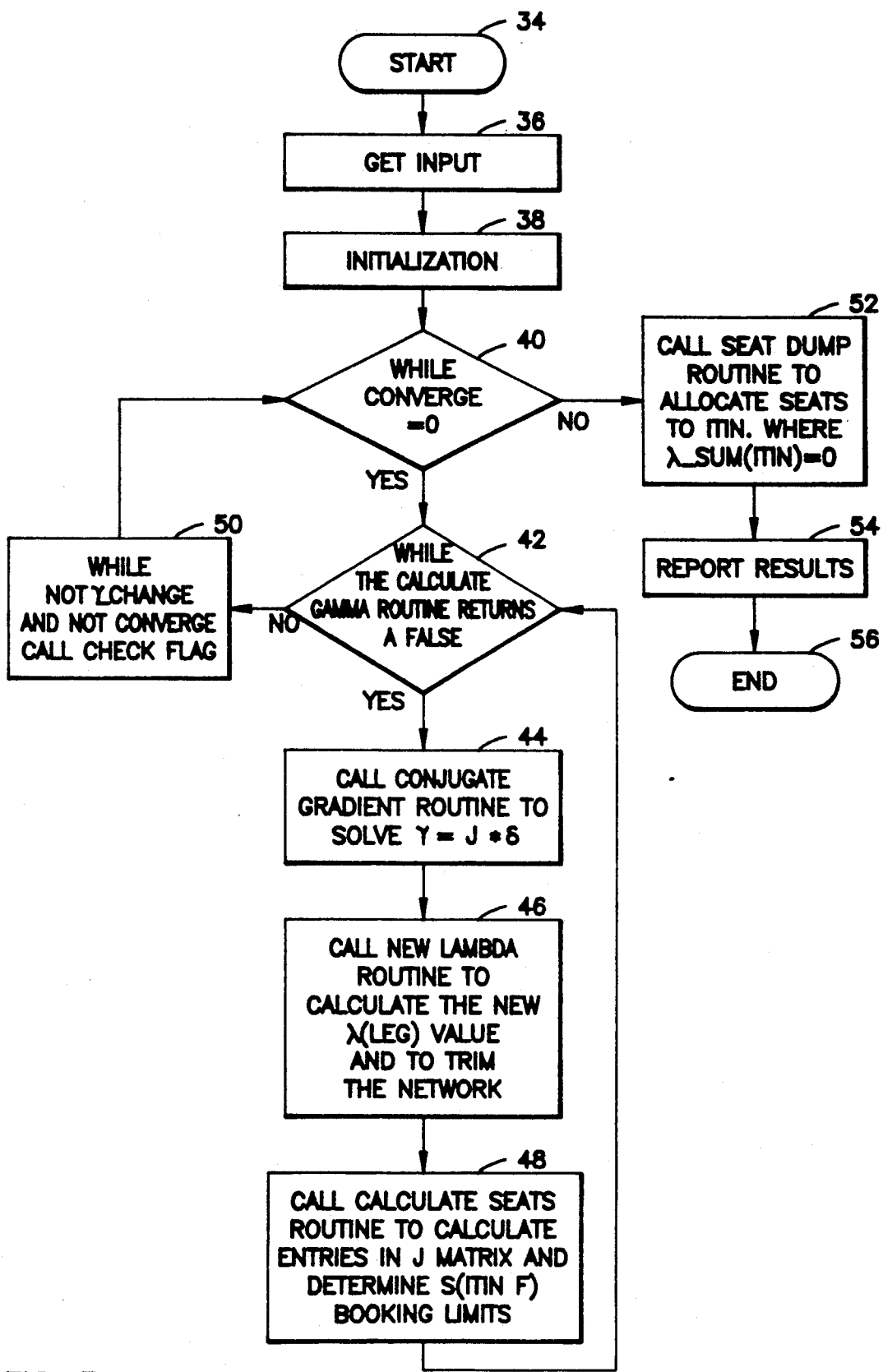
FIG. 3 is a flow chart describing the logic of the Main routine in the preferred embodiment of the present invention.

FIG. 3 is a flow chart describing the logic of the MAIN routine in the preferred embodiment. When the MAIN routine starts (34), the GET INPUT routine is called to read the input data for the system (36). The INITIALIZATION routine is called to initialize data structures, calculate the initial expected marginal seat revenue (EMSR) values, i.e., $\lambda$(LEG), using a leg-based mileage-prorated EMSR method (38), and set a CONVERGE flag to 0 (38).

A first loop is executed as long as CONVERGE remains 0 (40). The routine CALCULATE GAMMA is called to calculate the residual capacity, $\gamma$(LEG), and a second loop is executed as long as the CALCULATE GAMMA routine returns a "false" value, indicating that the absolute value of at least one residual capacity, $\gamma$(LEG), is greater than 1 (42). The CONJUGATE GRADIENT routine is called to solve the network $J*\delta = \gamma$ (44). The NEW LAMBDA routine is called to calculate a new $\lambda$(LEG) for all legs, and to trim the network by removing from the network those legs where $\lambda$(LEG) is less than the $\epsilon$ tolerance value (46). The CALCULATE SEATS routine is called to calculate the booking limit S(ITIN-F) for each ITIN-F entry in the J matrix and to reject those ITIN-F's where $\lambda$_SUM(ITIN) is greater than $\lambda$_OFFSET (48). The CALCULATE SEATS routine also deletes those ITIN-F's which were rejected previously (48).

At this point, all the $\gamma$(LEG) values are examined, and if the absolute values thereof are all less than 1, then the second loop terminates (42). Otherwise, the second loop is executed again.

When the second loop terminates (42), then the CHECK FLAG routine is called to put the rejected paths back into the network (50). The first loop then terminates if CONVERGE is set to 1 by CHECK FLAG, indicating that there are no rejected ITIN-F's (40). Otherwise, the first loop is executed again.

When the first loop terminates (40), the SEAT DUMP routine is called to allocate seats to those paths where $\lambda$_SUM(ITIN) is 0 (52). Finally, the results are output from the system, including: (1) the $\lambda$(LEG) values, i.e., the expected marginal seat revenues, for all the legs; and (2) the S(ITIN-F) values, i.e., the booking limits, for each itinerary/fare class combination (54). The MAIN routine then terminates (56).

Figure 4:
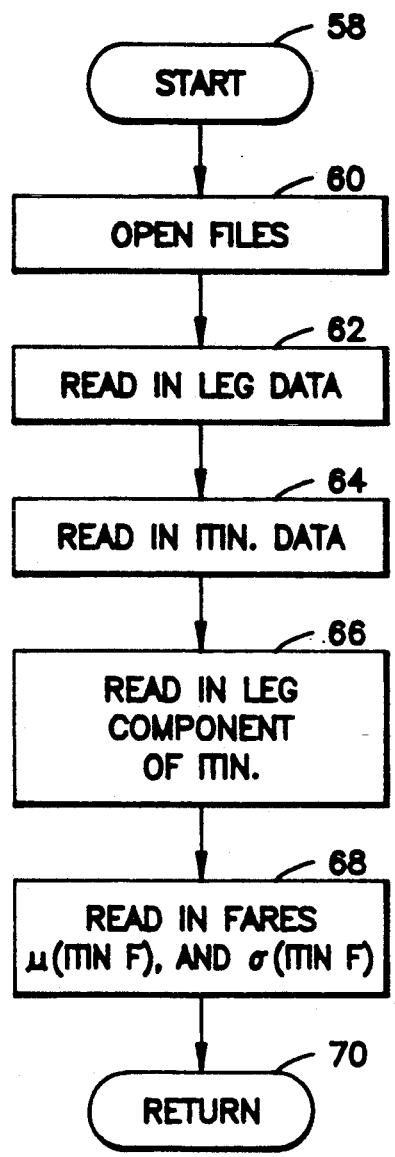
FIG. 4 is a flow chart describing the logic of the Get Input routine in the preferred embodiment of the present invention.

FIG. 4 is a flow chart describing the logic of the GET INPUT routine. The GET INPUT routine inputs data consisting of:

1. The names of the cities served by the airline.
2. The leg information:
   a. Flight information;
   b. Origin;
   c. Destination;
   d. Capacity of the carriers;
   e. Distance;
3. Itinerary Information:
   a. Flight number of the first leg;
   b. Origin;
   c. Destination;
   d. Number of stops;
   e. Flight number, origin and destination of each leg component;
   f. Fares for each fare class;
   g. The $\mu$(ITIN-F), i.e., mean, and $\sigma$(ITIN-F), i.e., standard deviation, of demand for each ITIN-F.

Because the present invention may be used with any number of airline reservation systems, the actual operation of the GET INPUT depends on the specific format of the input supplied by the airline reservation system.

Figure 5A:
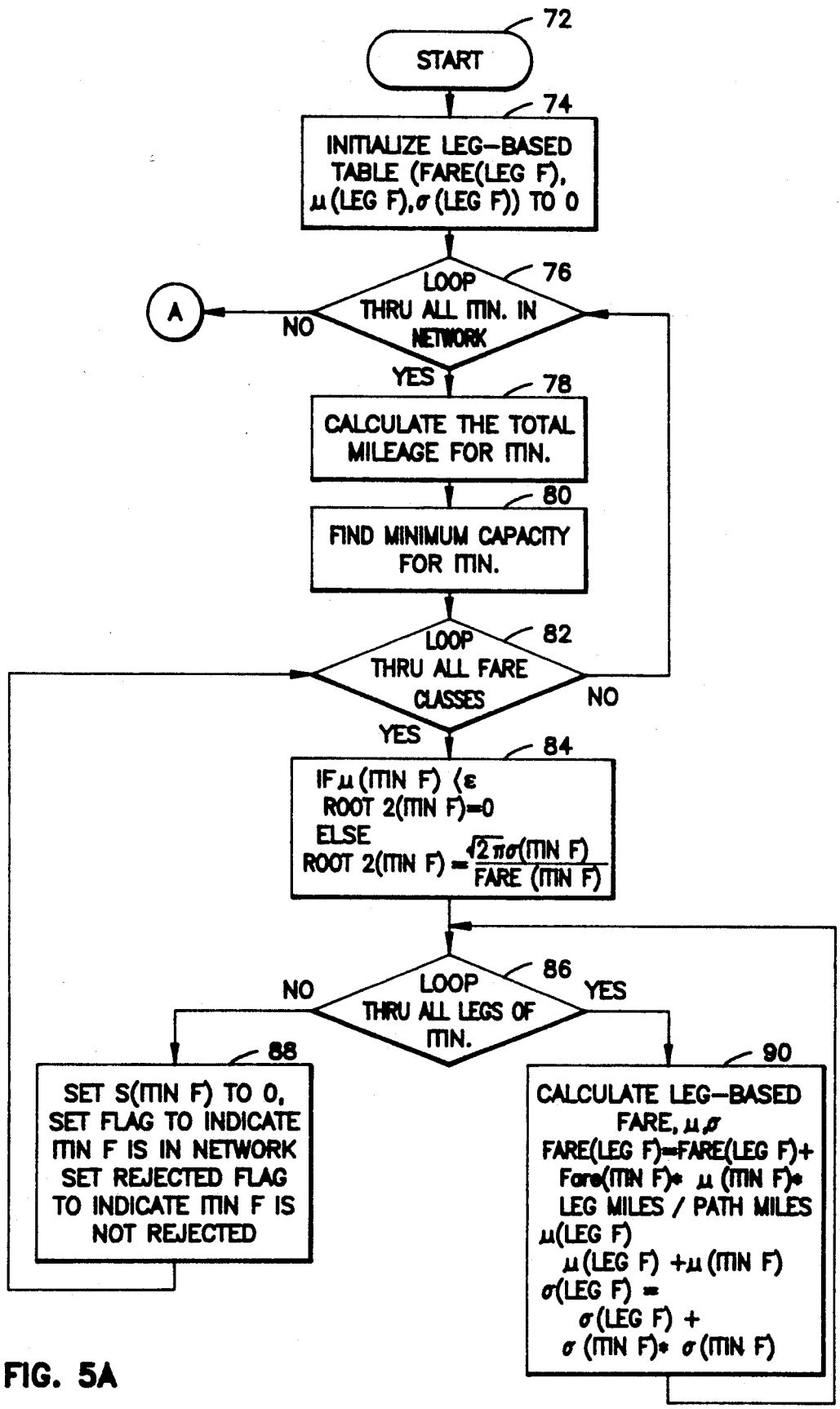
FIGS. 5A and 5B combined are a flow chart describing the logic of the Initialize routine in the preferred embodiment of the present invention.
Figure 5B:
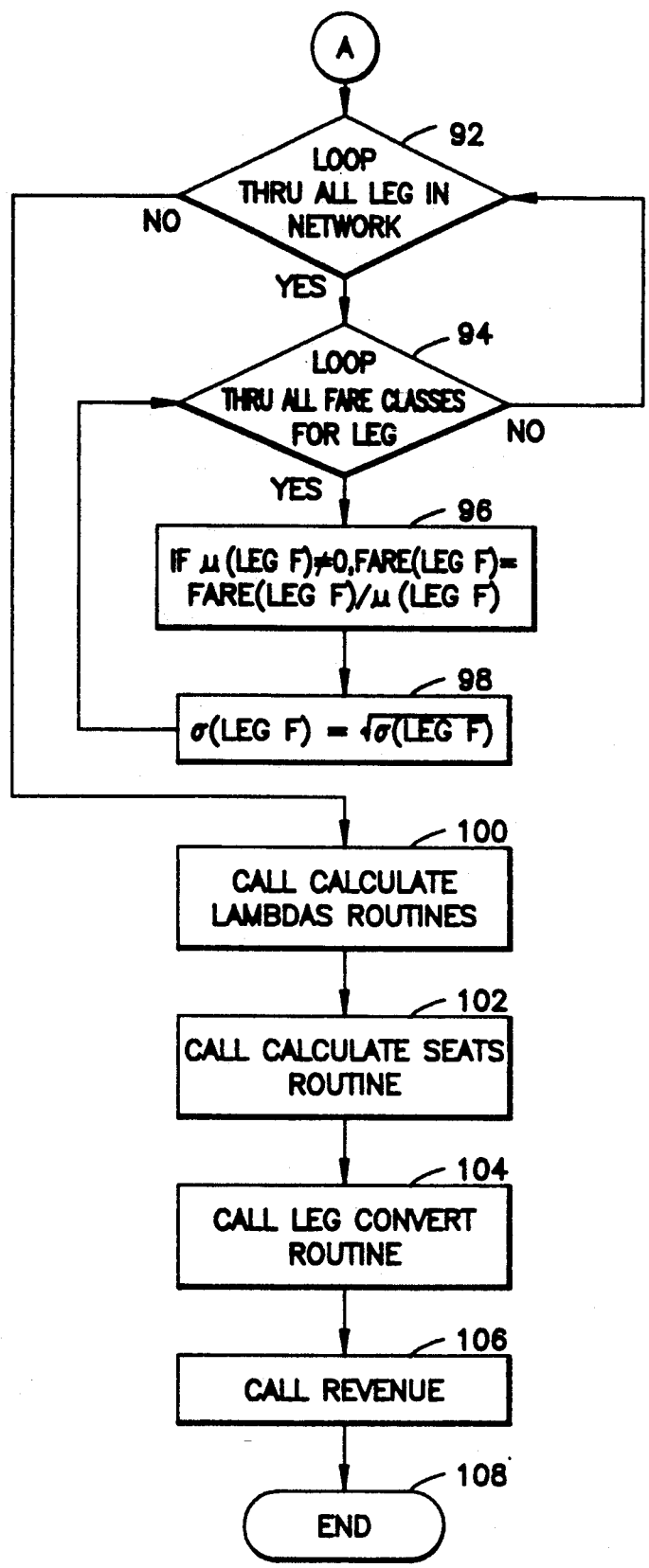

FIGS. 5A and 5B combined are a flow chart describing the logic of the INITIALIZATION routine in the present invention. The INITIALIZATION routine initializes the global variables of the program, and calculates the starting λ(LEG) values using a leg-based mileage-prorated EMSR method. It also calculates the S(ITIN-F) values for the network-based EMSR method using the resulting λ(LEG). In addition, it calculates the total revenue for the leg-based mileage-prorated EMSR method for later comparison with the value calculated using network-based EMSR method.

After the INITIALIZATION routine starts (72), the FARE(LEG-F), μ(LEG-F), and σ(LEG-F) of the demand are initialized to 0 (74). A first loop is executed once for each itinerary in the network (76). The total mileage and the minimum capacity of the itinerary are calculated (78, 80). A second loop is executed once for each fare class (82). If μ(ITIN-F) is less than the ε tolerance value, then ROOT2(ITIN-F) is set to 0 (84). Otherwise, ROOT2(ITIN-F) is set to the value (84):

$$ROOT2(ITIN\text{-}F) = \frac{\sqrt{2\pi}\ \sigma(ITIN\text{-}F)}{FARE(ITIN\text{-}F)}$$

A third loop is executed once for each leg in the itinerary (86) and calculates μ(LEG-F), σ(LEG-F) and FARE(LEG-F) (90):

$$FARE(LEG\text{-}F) =$$
$$FARE(LEG\text{-}F) + \frac{FARE(ITIN\text{-}F)\mu(ITIN\text{-}F)\text{Leg-MILES}}{\text{INTINERARY-MILES}}$$
$$\mu(LEG\text{-}F) = \mu(LEG\text{-}F) + \mu(ITIN\text{-}F)$$
$$\sigma(LEG\text{-}F) = \sigma(LEG\text{-}F) + \sigma(ITIN\text{-}F)^2$$

After termination of the third loop (86), S(ITIN-F) is set to 0 (88). FLAG(ITIN-F) is set to 1, indicating that the ITIN-F is in the network (88). REJECTED(ITIN-F) is set to 0, indicating the ITIN-F has not been rejected (88). The second and first loops terminate when complete (82, 76).

Upon termination of the first loop (76), a fourth loop is executed once for each leg (92) and a fifth loop is executed once for each fare class (94). If μ(LEG-F) is not 0, then FARE(LEG-F) is normalized (96):

$$FARE(LEG\text{-}F) = \frac{FARE(LEG\text{-}F)}{\mu(LEG\text{-}F)}$$

The σ(LEG-F) is calculated as (98):

$$\sigma(LEG\text{-}F) = \sqrt{\sigma(LEG\text{-}F)}$$

The fifth and fourth loops terminate when complete (94, 92).

Upon termination of the fourth loop (92), the routine CALCULATE LAMBDAS is called to calculate the initial λ(LEG) values using a leg-based mileage-prorated EMSR method, and to remove those legs where λ(LEG) is less than the ε tolerance value (100). The routine CALCULATES SEATS is called to calculate the network-based S(ITIN-F) values using the λ(LEG) values (102). The routine LEG CONVERT is called to convert the leg-based booking limits S(LEG-F) to the corresponding network-based booking limits S(ITIN-F) (104). The routine REVENUE is called to calculate the revenue generated by a leg-based mileage-prorated EMSR method using the NEW_S(ITIN-F) values from the LEG CONVERT routine (106). The INITIALIZATION routine then terminates, and control is returned to the MAIN routine (108).

Figure 6A:
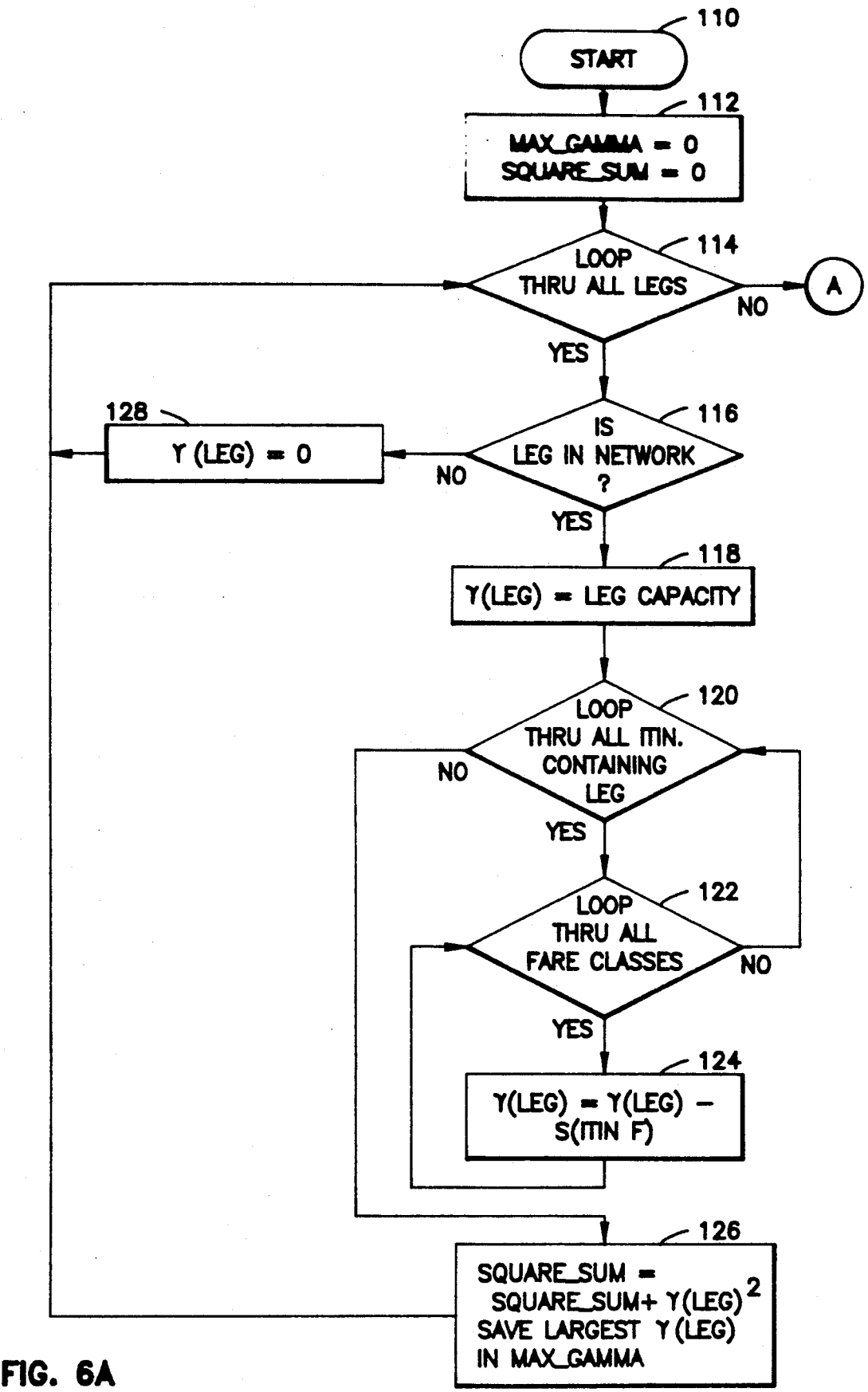
FIGS. 6A and 6B combined are a flow chart describing the logic of the Calculate Gamma routine in the preferred embodiment of the present invention.
Figure 6B:
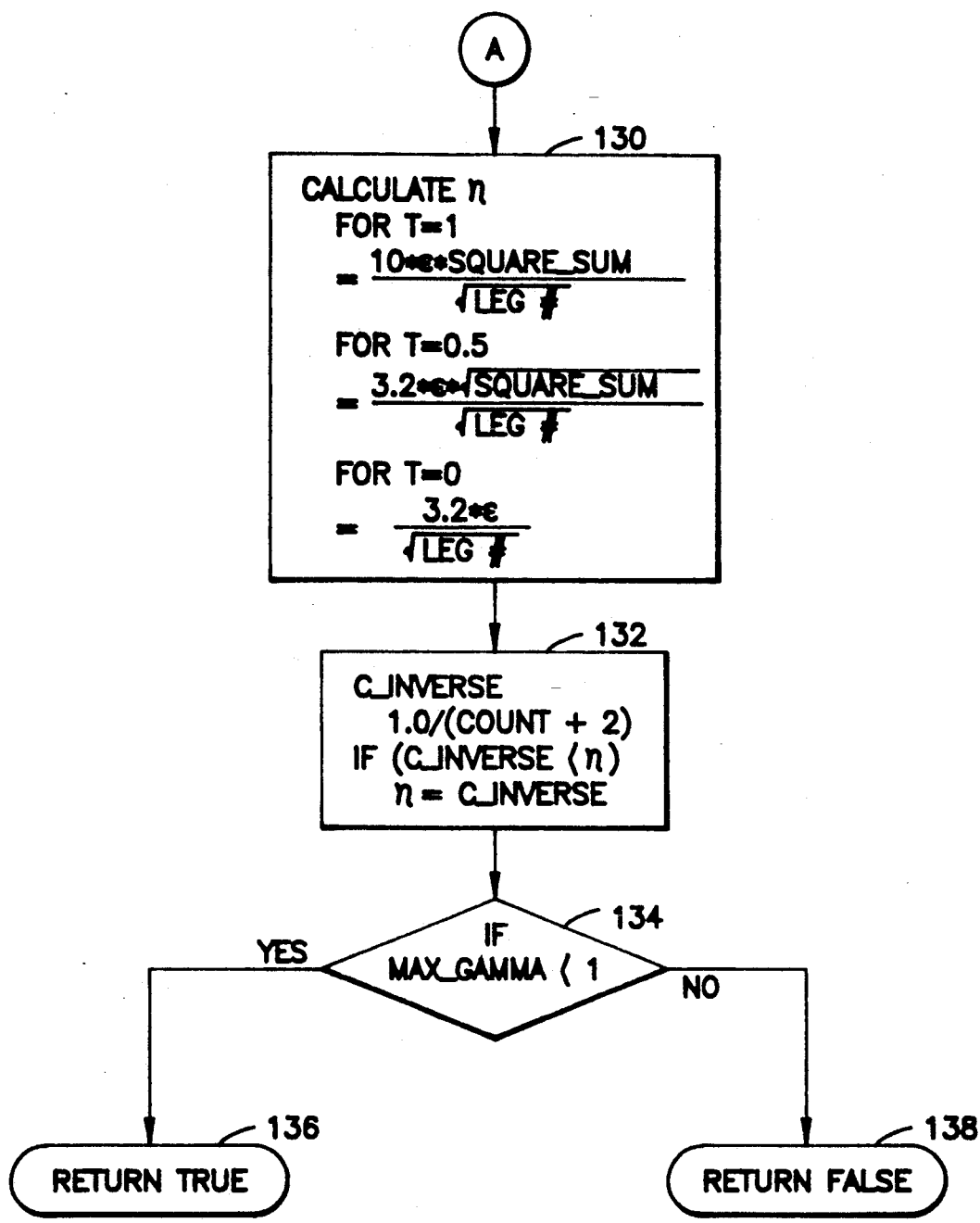
Figure 7A:
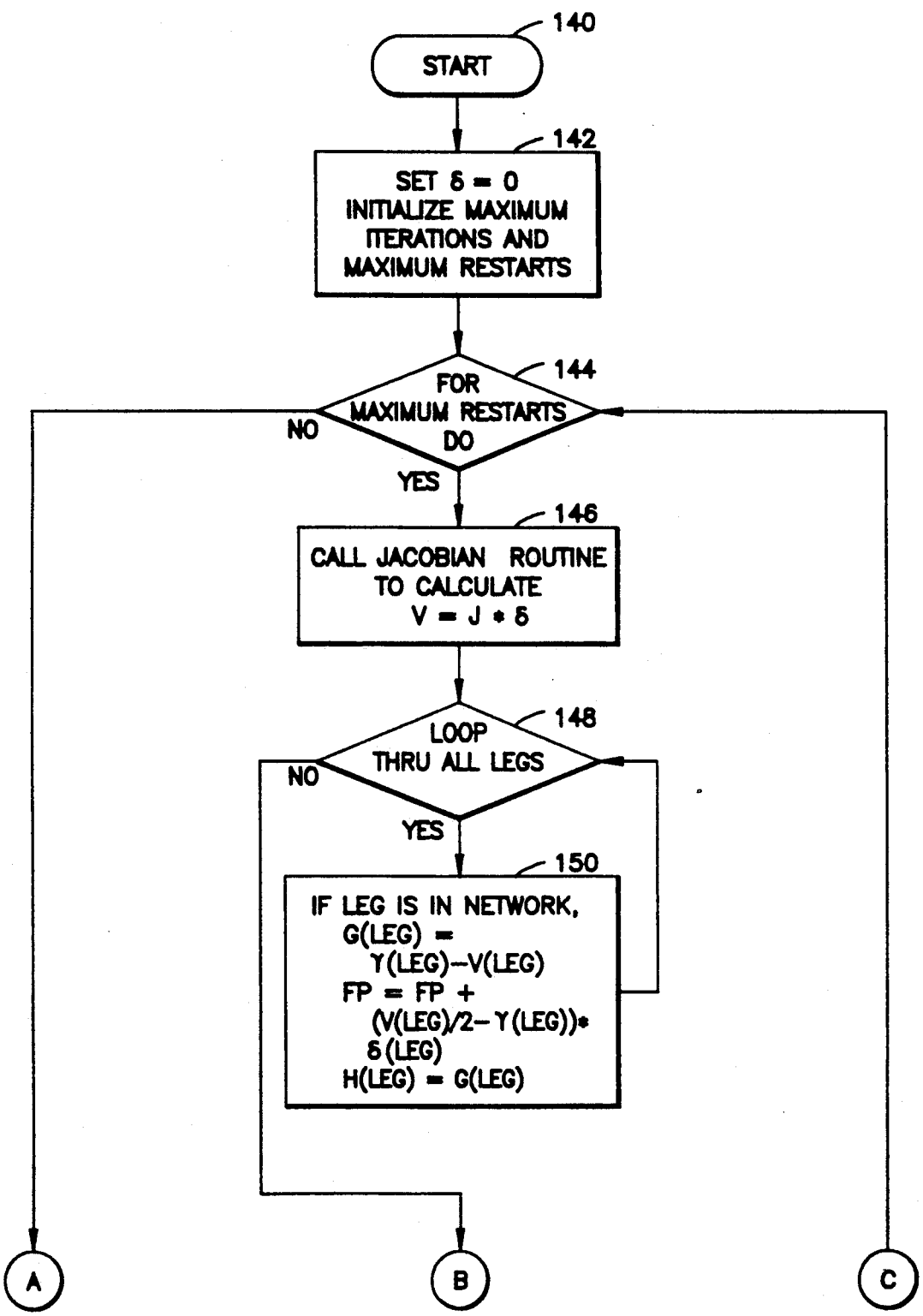
FIGS. 7A, 7B, 7C, and 7D combined are a flow chart describing the logic of the Conjugate Gradient routine in the preferred embodiment of the present invention.
Figure 7B:
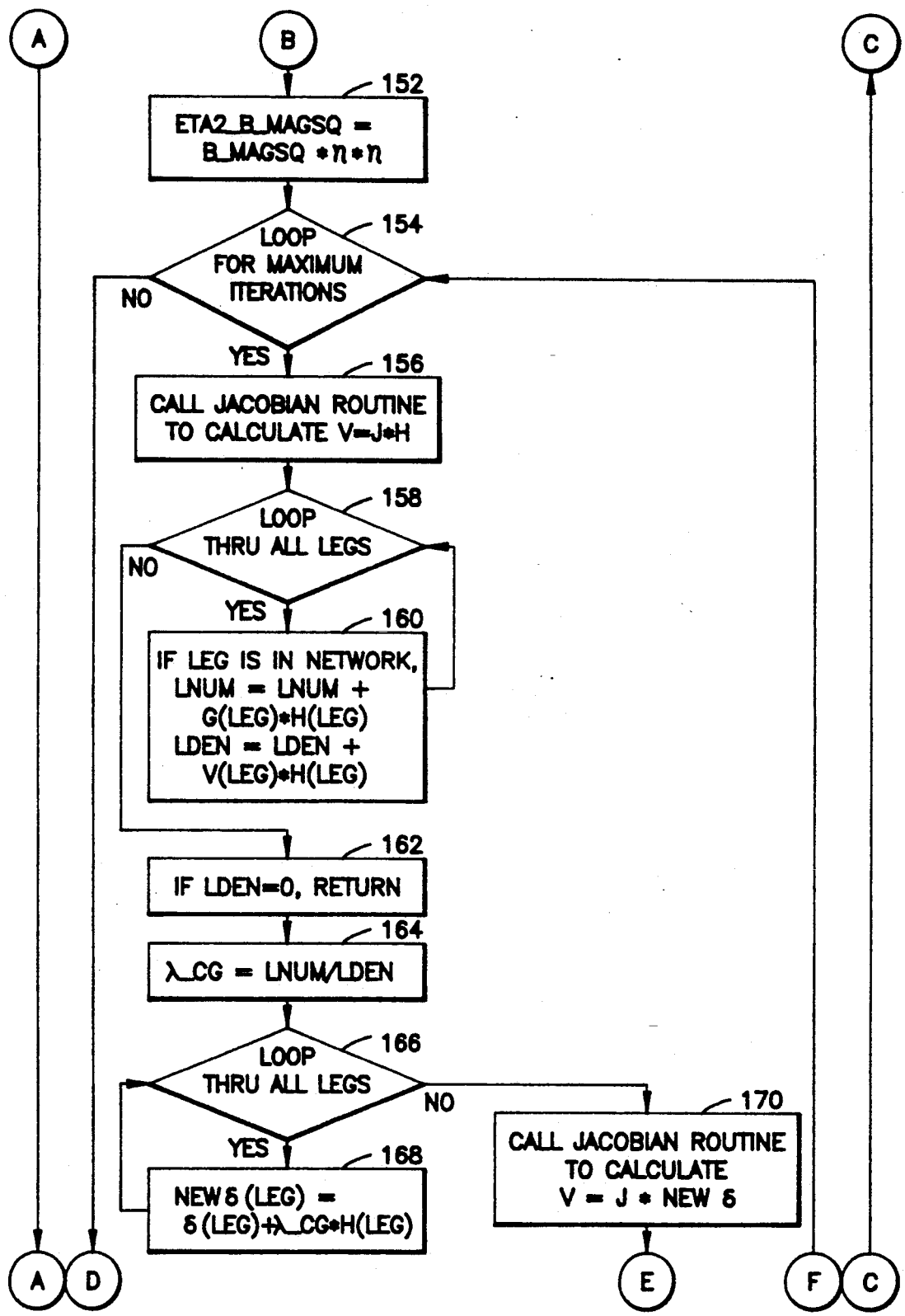
Figure 7C:
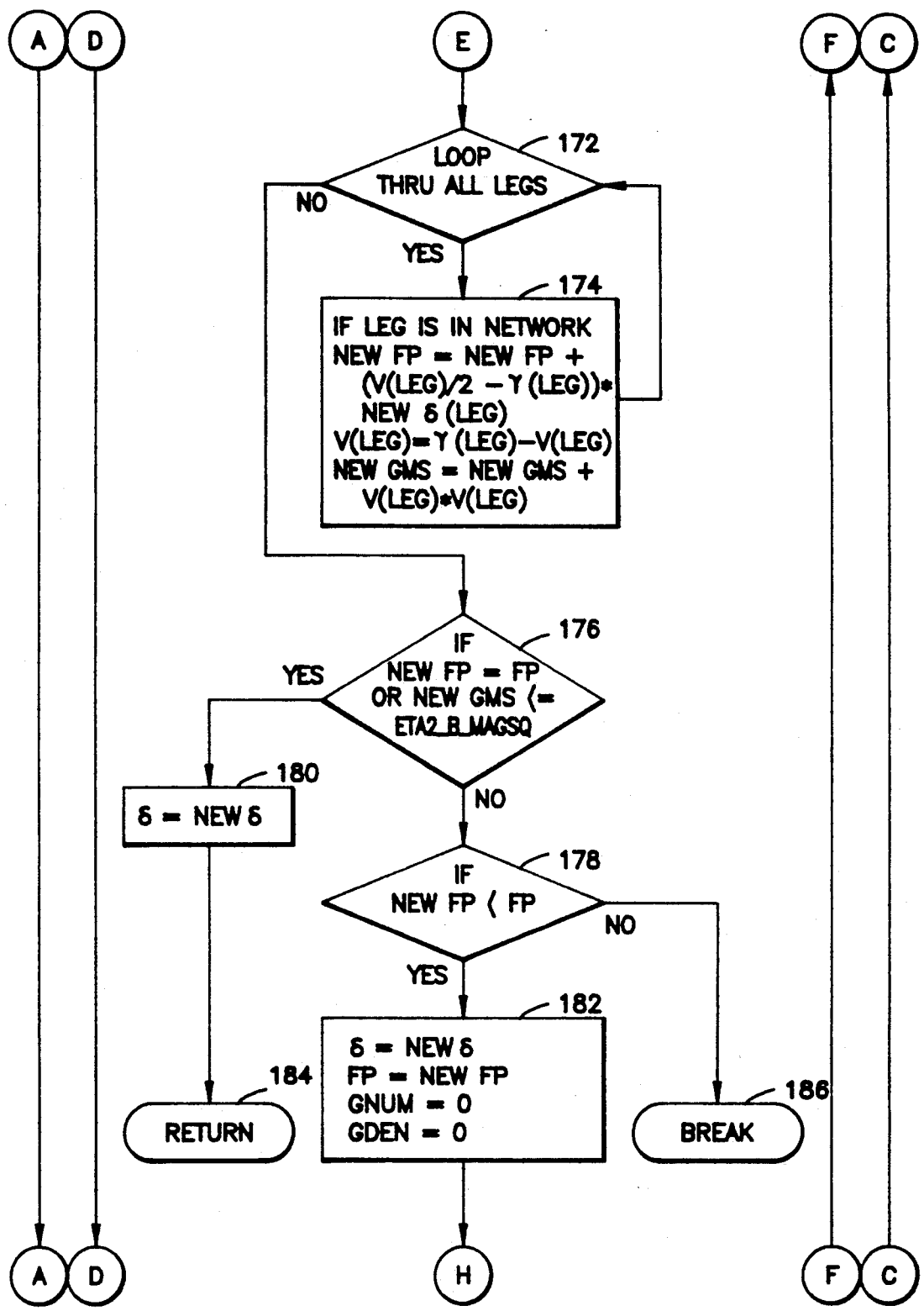
Figure 7D:
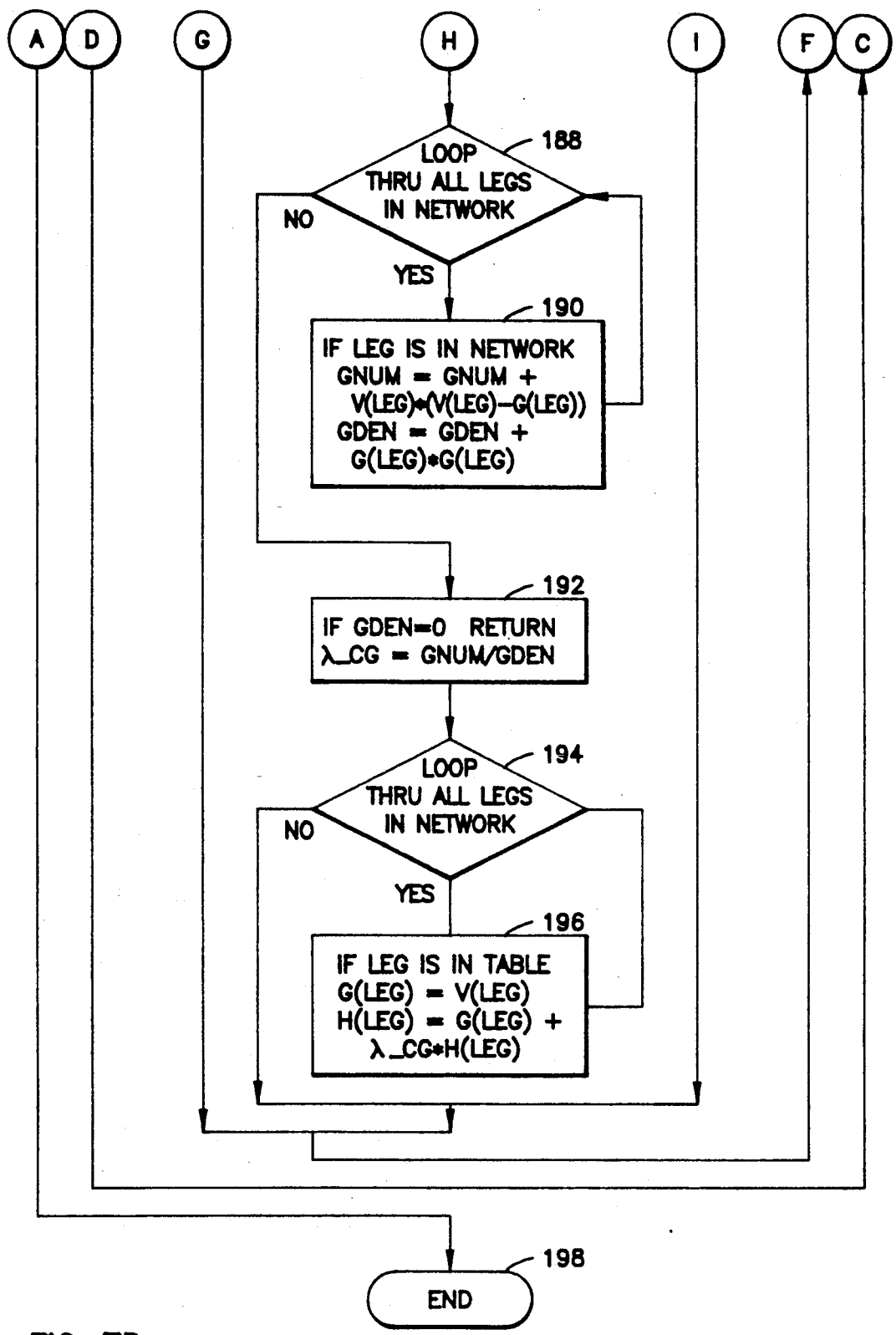

FIGS. 6A and 6B combined are a flow chart describing the logic of the CALCULATE GAMMA routine in the preferred embodiment. This routine calculates γ(LEG) for those legs where ε(LEG) is greater than the ε tolerance value. The calculation proceeds by subtracting each S(ITIN-F) using the leg from the leg capacity. If all the absolute values of the differences are less than 1, then the CALCULATE GAMMA routine returns a true indicator. Otherwise, a false indicator is returned. At the same time, the CALCULATE GAMMA routine calculates η, the relaxation coefficient value, for the Conjugate Gradient method.

After the CALCULATE GAMMA routine starts (110), the MAX_GAMMA and SQUARE_SUM variables are initialized to 0 (112). A first loop is executed once for all legs (114). If the leg is in the network (116), then γ(LEG) is set to the leg capacity (118). A second loop is executed once for all paths that contain the leg (120). A third loop is executed once for every fare class (122). S(ITIN-F) is subtracted from γ(LEG) (124). The third and second loops terminate when complete (122, 120).

After the second loop terminates (12), a summation of the squares of the γ(LEG) values is accumulated in SQUARE_SUM (126). If the MAX_GAMMA value is less than the absolute value of γ(LEG), then MAX_GAMMA is set to the absolute value of γ(LEG) (126).

If the leg is not in the network (116), then γ(LEG) is set to 0 (128).

When the first loop terminates (114), the η value is calculated (130):

For $t = 1$:

$$\eta = \frac{10.0\epsilon \text{SQUARE\_SUM}}{\sqrt{\text{LEG\_NUMBER}}}$$

For $t = 0.05$:

$$\eta = \frac{3.2\epsilon \sqrt{\text{SQUARE\_SUM}}}{\sqrt{\text{LEG\_NUMBER}}}$$

For $t = 0$:

$$\eta = \frac{3.2\epsilon}{\sqrt{\text{LEG\_NUMBER}}}$$

Subsequently, η is compared with C_INVERSE (which has the value 1/(COUNT+2)) (132). If η is bigger than C_INVERSE (132), then η=C_INVERSE. If MAX_GAMMA is less than 1 (134), a true indicator is returned to the calling routine (136). Otherwise (134), a false indicator is returned (138).

FIGS. 7A, 7B, 7C, and 7D combined are a flow chart describing the logic of the CONJUGATE GRADIENT routine in the preferred embodiment. The CONJUGATE GRADIENT routine solves the network system for the dot product of a Jacobian matrix: J*δ=γ. Three variables δ, γ, and η are passed as parameters to the routine. The δ array contains the change in the λ(LEG) values. The γ array contains the γ(LEG) values. The η variable contains the relaxation coefficient.

After the CONJUGATE GRADIENT starts (140), the entries in the δ array are initialized to 0 (142) and a maximum iteration number is set to:

MAX_ITERATIONS = NUMBER_OF_LEGS −

$$\log\left(\frac{3.2\epsilon}{\sqrt{\text{NUMBER\_OF\_LEGS}}}\right)$$

A maximum restart number is set to some predetermined value (142). A first loop is executed for the maximum restart number of times (144). The JACOBIAN routine is called to calculate the dot product of the J matrix and the δ array, returning the result in the V array (146). A second loop is executed once for every leg in the network (148). The G array is loaded with the mutually orthogonal directions by subtracting the V entries from the γ entries and storing the difference in the G entries (150). The FP variable stores the value of the quadratic objective function (150), calculated as:

$$FP = FP + \left(\frac{V(\text{LEG})}{2} - \gamma(\text{LEG})\right)\delta(\text{LEG})$$

The entries in the H array are loaded with the mutually conjugate directions from the corresponding G entries (150). The second loop terminates when complete (148).

After second loop terminates (148), the relaxation coefficient is calculated (152):

ETA-B-MAGSQ=B-MAGSQ ($\eta^2$)

A third loop is executed at most the maximum iterations number of times (154). The JACOBIAN routine is called to calculate the dot product of J and H, with the result returned in V (156). A fourth loop is executed once for every leg (158). The summation of the product of G(LEG) and H(LEG) is stored in LNUM (160). The summation of the product of V(LEG) and H(LEG) is stored in LDEN (160). The fourth loop terminates when complete (158).

After the fourth loop terminates (158), if LDEN is equal to 0, the CONJUGATE GRADIENT routine terminates (162). Otherwise, the step size, λ_CG, is calculated by dividing LNUM by LDEN (164). A fifth loop is executed once for every leg (166). A step is taken in the direction H (168). An array of NEW_δ(LEG) values are calculated as (168):

NEW-δ(LEG)=δ(LEG)+λ-CG (H(LEG))

The fifth loop terminates when complete (166).

After the fifth loop terminates (166), the JACOBIAN routine is called to calculate the dot product of J and the NEW_δ values, returning the results in the V array (170). A sixth loop is executed once for every leg in the network (170). A new quadratic objective function value, NEW_FP, is calculated as (174):

NEW-FP =

$$\text{NEW-}FP + \left(\frac{V(\text{LEG})}{2} - \gamma(\text{LEG})\right)\text{NEW-}\delta(\text{LEG})$$

A new residual capacity is determined by subtracting the V entries from the γ entries and storing the results in V (174). The sum of the square of the new residual capacity is stored in the NEW_GMS variable (174). The sixth loop terminates when complete (172).

After the sixth loop terminates (172), if NEW_FP is no different from the prior FP value (176), or if NEW_GMS is less than or equal to ETA2_B_MAGSQ (176), then the δ(LEG) entries are updated with the NEW_δ(LEG) values (180), and the CONJUGATE GRADIENT routine is terminated (184).

Otherwise, if NEW_FP is different from FP and NEW_GMS is greater than η (176), then convergence is examined. A convergence occurs when NEW_FP is less than FP (178).

If there is no convergence (178), then the counter for the third loop is set to the maximum iteration value, and the third loop terminates (186).

If convergence occurs (178), then the ε(LEG) entries are updated with the new ε(LEG) values, FP is set to the value of NEW_FP, and the variables GNUM and GDEN are both set to 0 (182). A seventh loop is executed once for every leg in the network (188). The GNUM and GDEN values are calculated as (190):

GNUM = GNUM + V(LEG)(V(LEG) − G(LEG))
GDEN = GDEN + G (LEG)$^2$

The seventh loop terminates when complete (188).

After the seventh loop terminates (188), if GDEN is 0, the CONJUGATE GRADIENT routine terminates (192). Otherwise, the step size λ_CG is re-calculated by dividing GNUM by GDEN (192). An eighth loop is executed once for every leg in the network (194). The G(LEG) entries are set to the V(LEG) values and H(LEG) is re-calculated as (196):

H(LEG)=G(LEG)+λ-CG (H(LEG))

The eighth, third, and first loops terminate when complete (194, 154, 144).

After the first loop terminates when complete (144), the CONJUGATE GRADIENT routine terminates (198).

Figure 8:
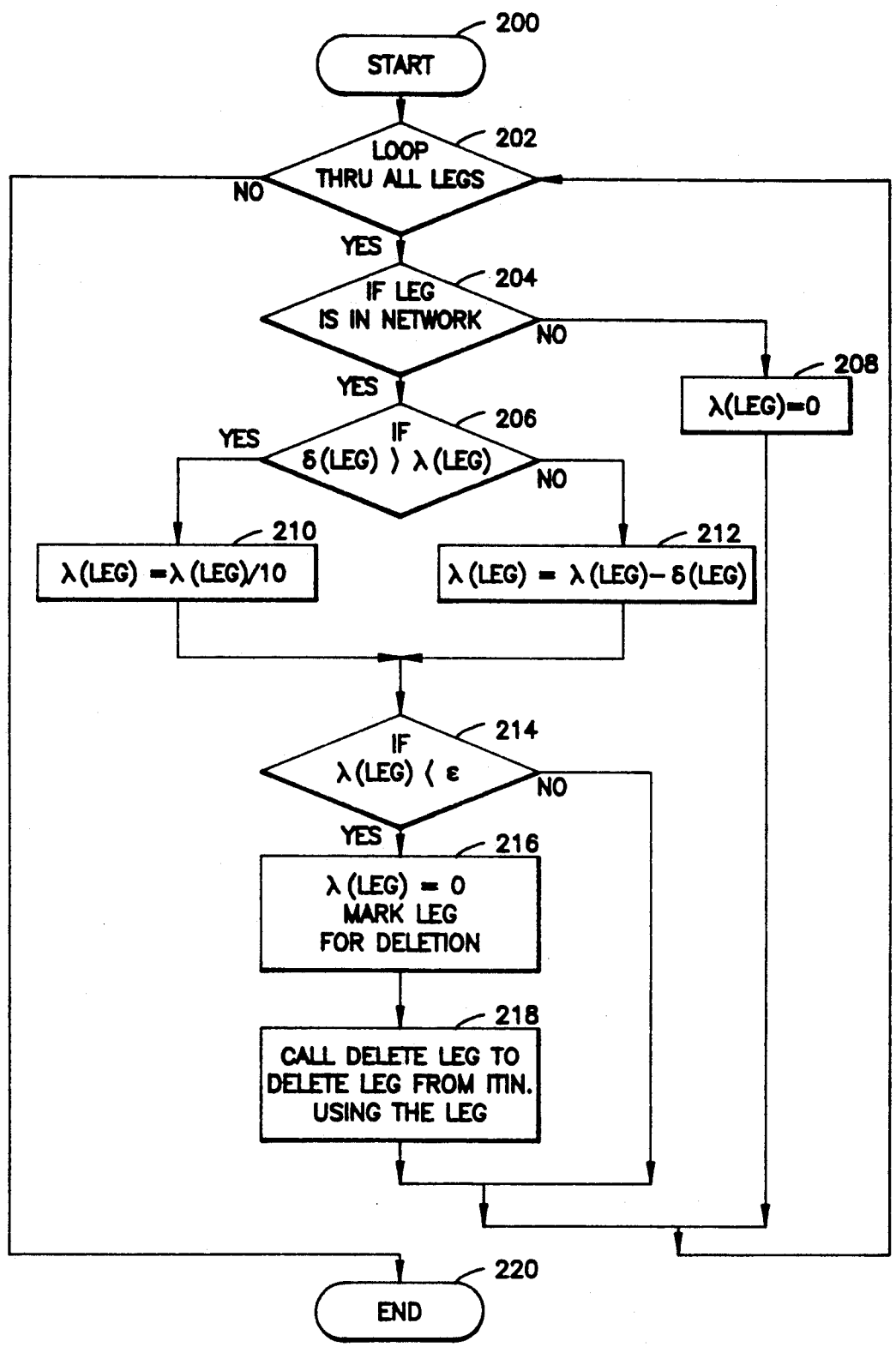
FIG. 8 is a flow chart describing the logic of the New Lambda routine in the preferred embodiment of the present invention.
Figure 8A:
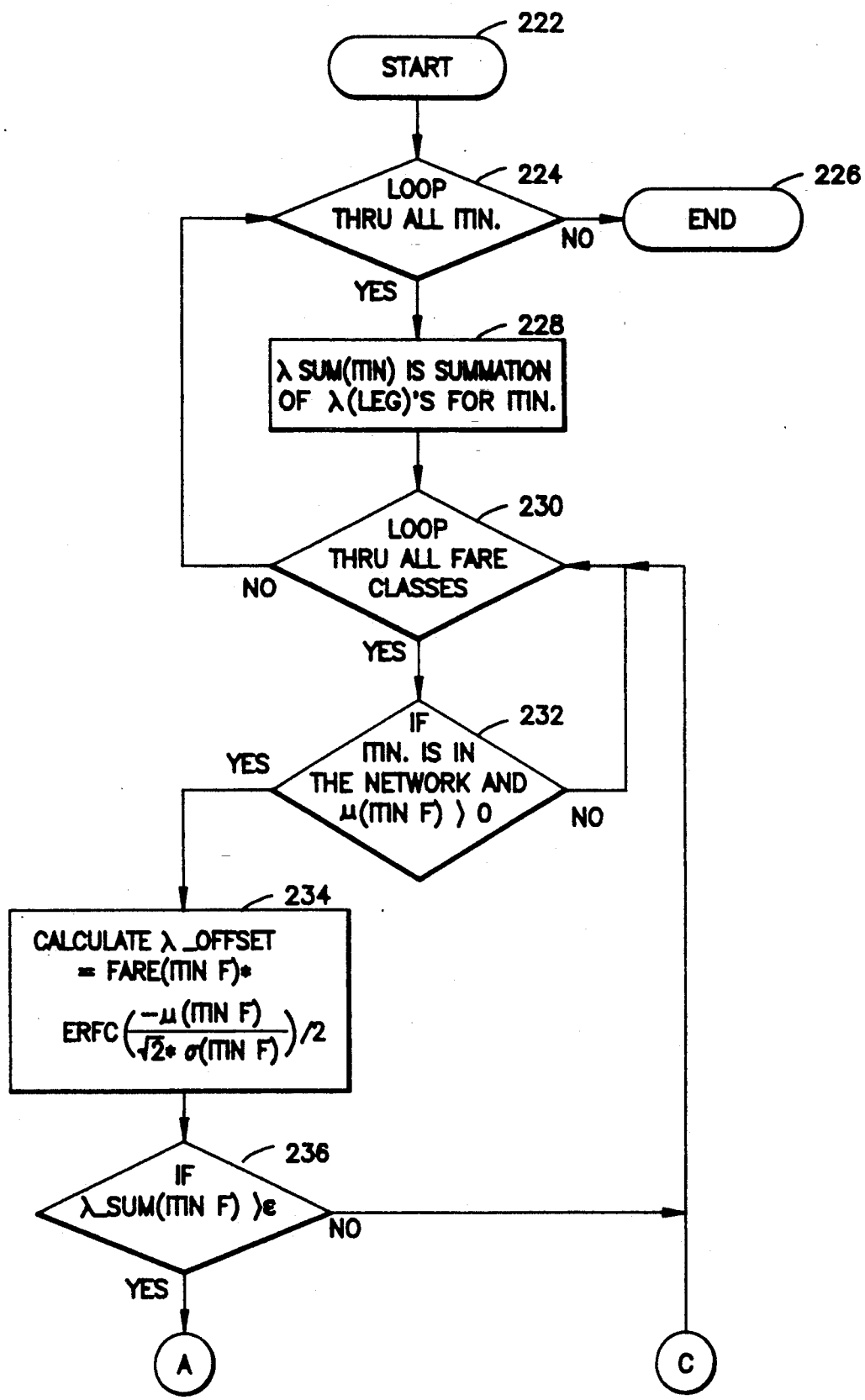

FIG. 8 is a flow chart describing the logic of the NEW LAMBDA routine in the preferred embodiment. This routine updates the λ(LEG) values after each Truncated Newton iteration, and removes those legs where λ(LEG) is less than the ε tolerance value.

After the NEW LAMBDA routine starts (200), a first loop is executed once for each leg in the network (202). If the leg is not in the network (204), then λ(LEG) is set to 0 (208). Otherwise (204), if δ(LEG) is greater than λ(LEG) (206), then λ(LEG) is divided by 10 (210). Otherwise (206), ε(LEG) is subtracted from λ(LEG) (212). If λ(LEG) is less than the δ tolerance value (214), then λ(LEG) is set to 0, and the leg is marked for deletion from the network (216). The routine DELETE LEG is called to delete the leg from the network (218). The first loop terminates when complete (202) and the NEW LAMBDA routine terminates (220).

Figure 9B:
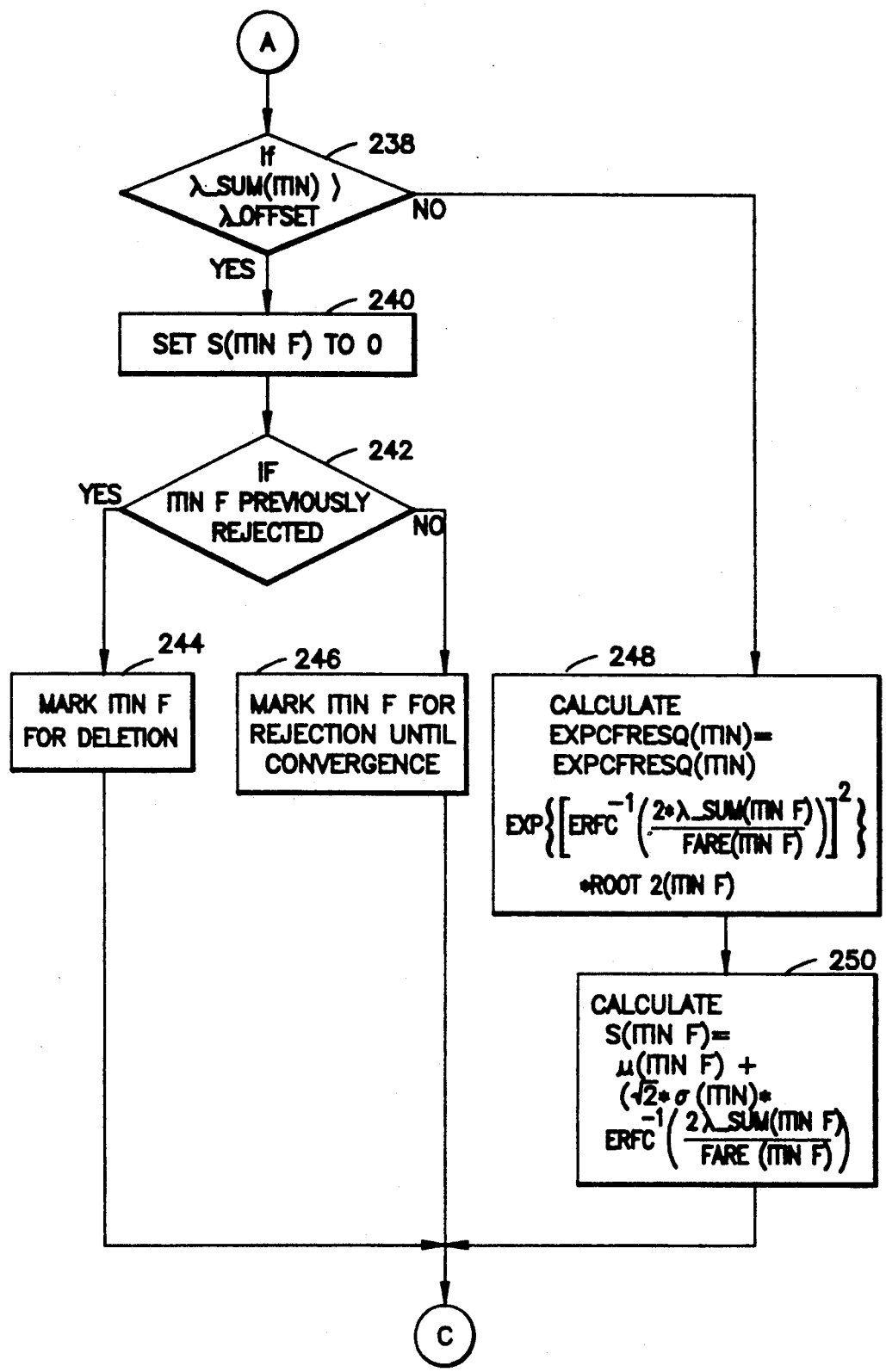

FIGS. 9A and 9B combined are a flow chart describing the logic of the CALCULATE SEATS routine in the preferred embodiment. The CALCULATE SEATS routine calculates the S(ITIN-F) value for each itinerary/fare class, the $\lambda\_SUM(ITIN)$ values, the EXPCFRESQ(ITIN) values, and the $\lambda\_OFFSET$ values. $\lambda\_SUM(ITIN)$ represents the sum of the $\lambda(LEG)$ values for all legs of the itinerary. $\lambda\_OFFSET$ represents the maximum marginal revenue the itinerary may generate. If $\lambda\_SUM(ITIN)$ of an itinerary is greater than $\lambda\_OFFSET$, then the itinerary is rejected temporarily from the network until an optimal solution is reached, or the itinerary is deleted from the network if the itinerary has been previously rejected.

After the CALCULATE SEATS routine starts (222), a first loop is executed once for each itinerary (224). EXPCFRESQ(ITIN) and $\lambda\_SUM(ITIN)$ are set to 0. $\lambda\_SUM(ITIN)$ is a summation of the $\lambda(LEG)$ values for all legs in the itinerary (228). A second loop is executed once for each fare class (230). If the itinerary is in the network, which is indicated by FLAG(ITIN-F) having a value of 1, and $\mu(ITIN-F)$ is greater than the $\epsilon$ tolerance value, i.e., then the itinerary has demand and a number of functions are performed (232). The $\lambda\_OFFSET$ value for the itinerary is calculated (234):

$$\lambda x - OFFSET = (0.5) FARE(ITIN-F) erfc\left(\frac{-\mu(ITIN-F)}{\sqrt{2}\ \sigma(ITIN-F)}\right)$$

If $\lambda\_SUM(ITIN)$ is greater than S(ITIN-F), then a number of functions are performed (236). If $\lambda\_SUM(ITIN)$ for the itinerary is greater than $\lambda\_OFFSET$ (238), then S(ITIN-F) is set to 0 (240). If REJECTED(ITIN-F) has been set to 1 242), indicating a prior rejection for the ITIN-F, then FLAG(ITIN-F) is set to $-1$ (244), indicating that deletion of the itinerary from the network is required. Otherwise (242), FLAG(ITIN-F) is set to 0 (246), indicating that the ITIN-F is rejected from the network until convergence.

If $\lambda\_SUM(ITIN)$ for the itinerary is less than or equal to $\lambda\_OFFSET$ (238), then the EXPCFRESQ(ITIN) value is calculated (248):

$$EXPCFRESQ(ITIN) = EXPCFRESQ(ITIN) +$$

$$\exp\left(\left(erfc^{-1}\left(\frac{2\lambda\_SUM(ITIN)}{FARE(ITIN-F)}\right)\right)^2\right) ROOT2(ITIN-F)$$

The S(ITIN-F) value is also calculated (250):

$$S(ITIN-F) = \mu(ITIN-F) +$$

$$\sqrt{2}\ \sigma(ITIN-F)\ erfc^{-1}\left(\frac{2\lambda\_SUM(ITIN)}{FARE(ITIN-F)}\right)$$

The second and first loops terminate when complete (230, 224). The CALCULATE SEATS routine terminates (226).

Figure 10A:
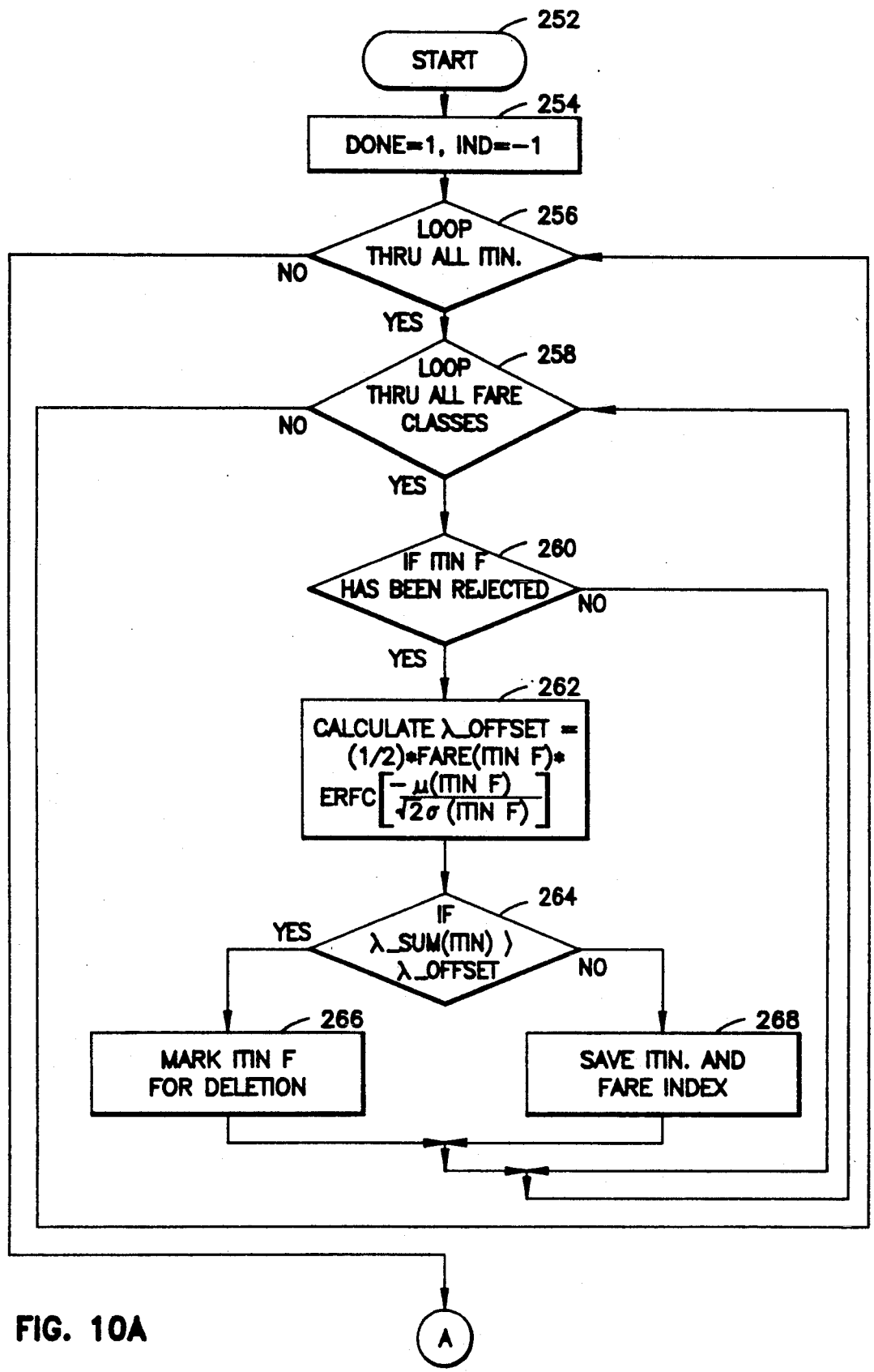
FIGS. 10A and 10B combined are a flow chart describing the logic of the Check Flags routine in the preferred embodiment of the present invention.
Figure 10B:
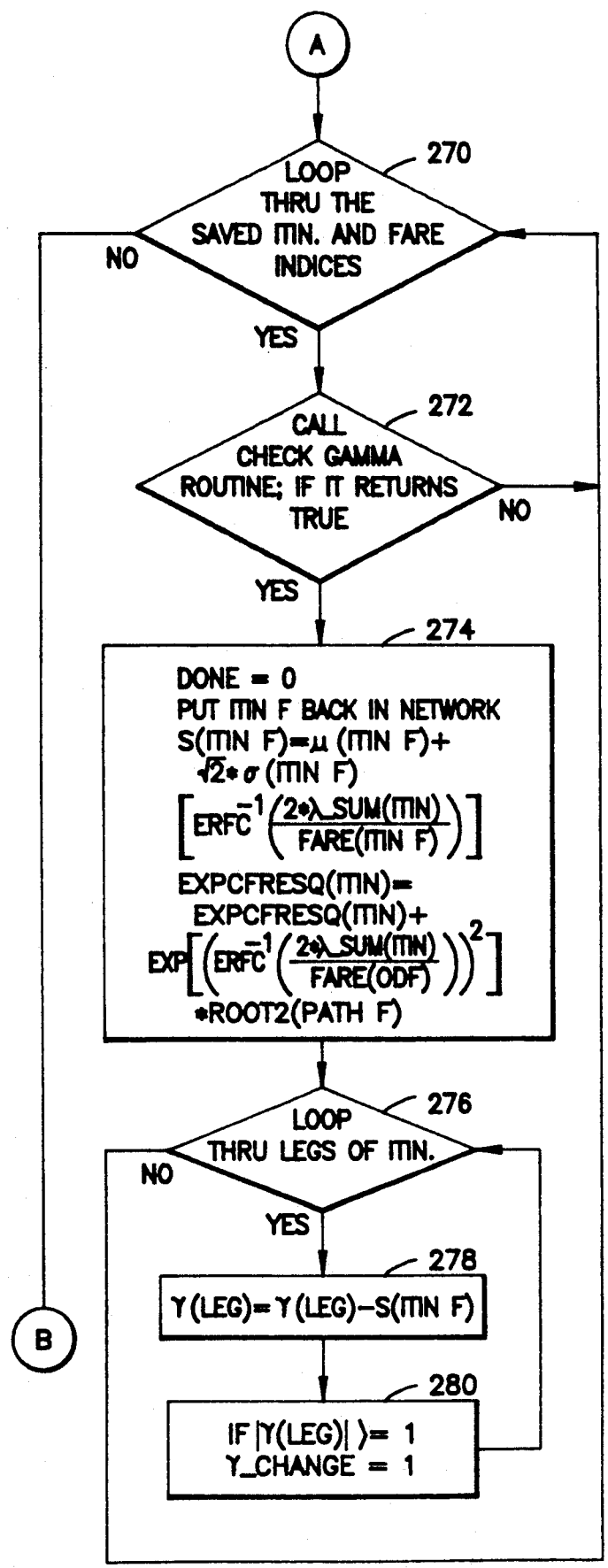
Figure 10C:
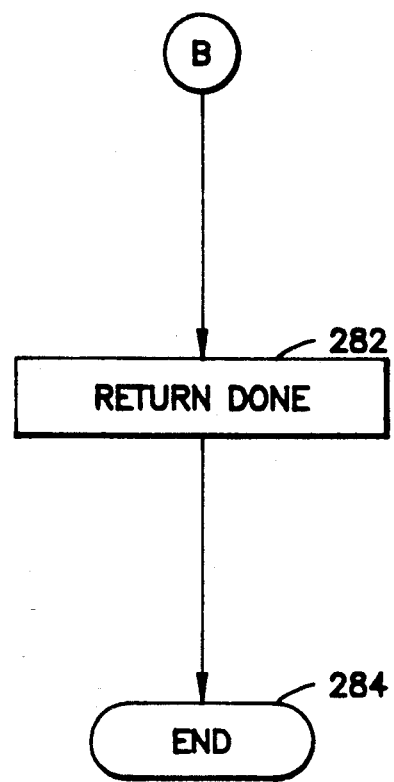

FIGS. 10A and 10B combined are a flow chart describing the logic of the CHECK FLAG routine in the preferred embodiment. The CHECK FLAG routine is called after the Truncated Newton iteration reaches an optimal solution for the current network. If there exists any rejected ITIN-F's, the CHECK FLAG routine calculates the $\lambda\_OFFSET$ of the itinerary. If $\lambda\_SUM(ITIN)$ is greater than $\lambda\_OFFSET$, then the ITIN-F is deleted from the network. Otherwise, the CHECK GAMMA routine is called to determine if the rejected ITIN-F can be put back into the network. The ITIN-F is returned to the network when the CHECK GAMMA routine returns a true value.

After the CHECK FLAGS routine starts (252), the DONE and IND flags are initialized (252). A first loop is executed once for each itinerary in the network (256). A second loop is executed once for each fare class (258). If the ITIN-F is rejected (260), as indicated by FLAG(ITIN-F) having a value of 0, then $\lambda\_OFFSET$ is calculated for the ITIN-F (262):

$$\lambda\_OFFSET = (0.5)\ FARE(ITIN-F)\ erfc\left(\frac{-\mu(ITIN-F)}{\sqrt{2}\ \sigma(ITIN-F)}\right)$$

If $\lambda\_OFFSET$ is less than $\lambda\_SUM(ITIN)$ (264), then the ITIN-F is marked for deletion by setting FLAG(ITIN-F) to $-1$ (266). Otherwise (264), the itinerary index and the fare index are temporarily stored (268). The second and first loops terminate when complete (258, 256).

After the first loop terminates (256), a third loop is executed once for each ITIN-F whose itinerary index and fare index were temporarily stored (270). The CHECK GAMMA routine is called, and its return value is examined (272). If the return value is true, then the ITIN-F is put back into the network, as indicated by setting FLAG(ITIN-F) to the value 1 (274). The EXPCFRESQ(ITIN) is recalculated as (274):

$$EXPCFRESQ(ITIN) = EXPCFRESQ(ITIN) +$$

$$\exp\left(\left(erfc^{-1}\left(\frac{2\lambda\_SUM(ITIN)}{FARE(ITIN-F)}\right)\right)^2\right) ROOT2(ITIN-F)$$

S(ITIN-F) is recalculated as (274):

$$S(ITIN-F) = \mu(ITIN-F) +$$

$$\sqrt{2}\ \sigma(ITIN-F)\ erfc^{-1}\left(\frac{2\lambda\_SUM(ITIN)}{FARE(ITIN-F)}\right)$$

A fourth loop is executed once for each leg component for the itinerary (276). S(ITIN-F) is subtracted from $\gamma(LEG)$ (278). If the absolute value of $\gamma(LEG)$ is greater than or equal to 1, then $\gamma\_CHANGE$ is set to indicate that the CHECK FLAG routine should be called again by the MAIN routine (280). The fourth loop terminates when complete (276).

If the CHECK GAMMA routine returns a false indication (272), the next pair of saved itinerary indices are processed (270). The third loop terminates when complete (270).

After the third loop terminates (270), if an ITIN-F has been put back into the network, a false indicator, i.e. 0, is returned (282). Otherwise, a true indicator, i.e. 1, is returned (282).

Figure 11A:
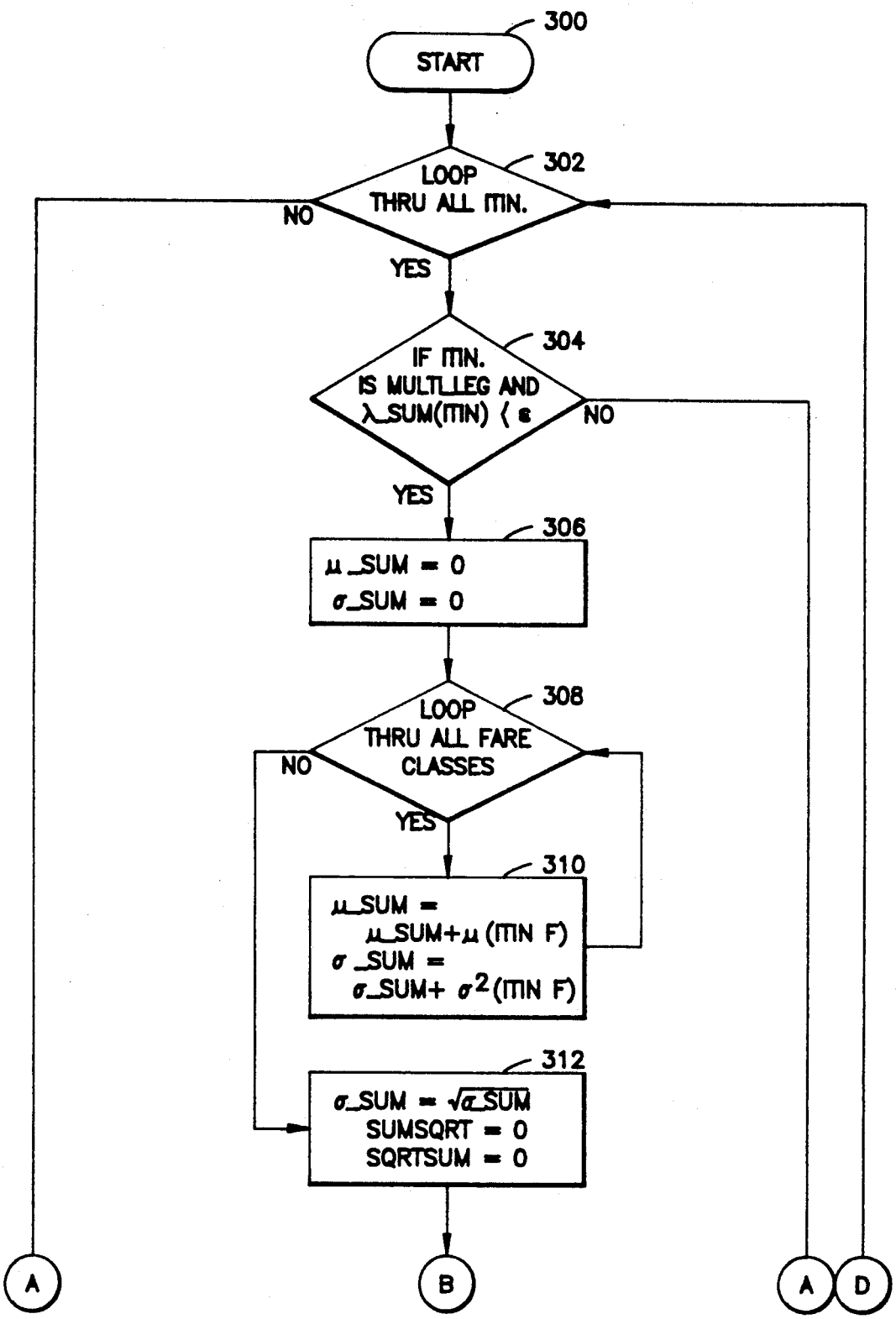
FIGS. 11A, 11B, and 11C combined are a flow chart describing the logic of the Seat Dump routine in the preferred embodiment of the present invention.
Figure 11B:
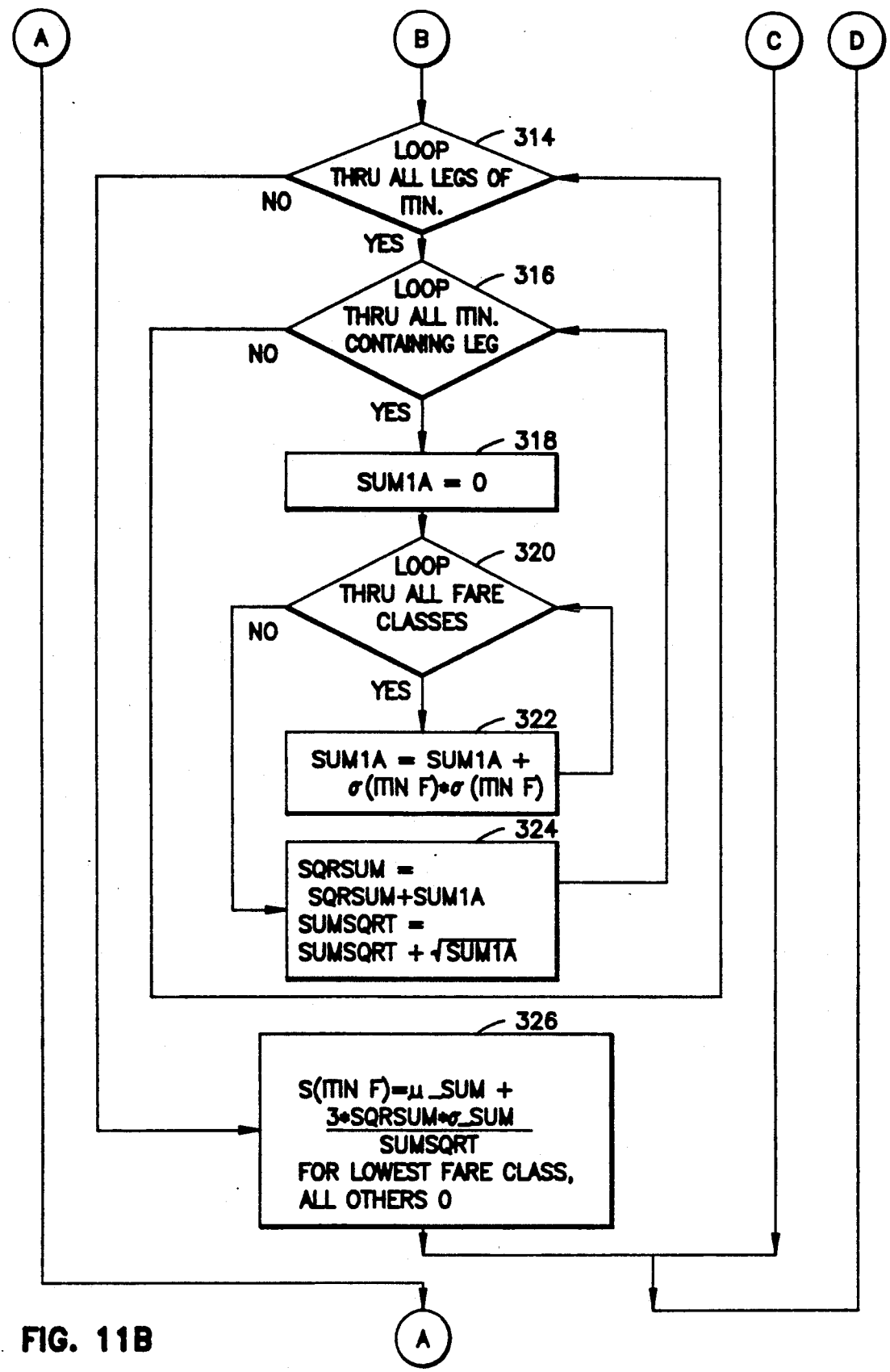
Figure 11C:
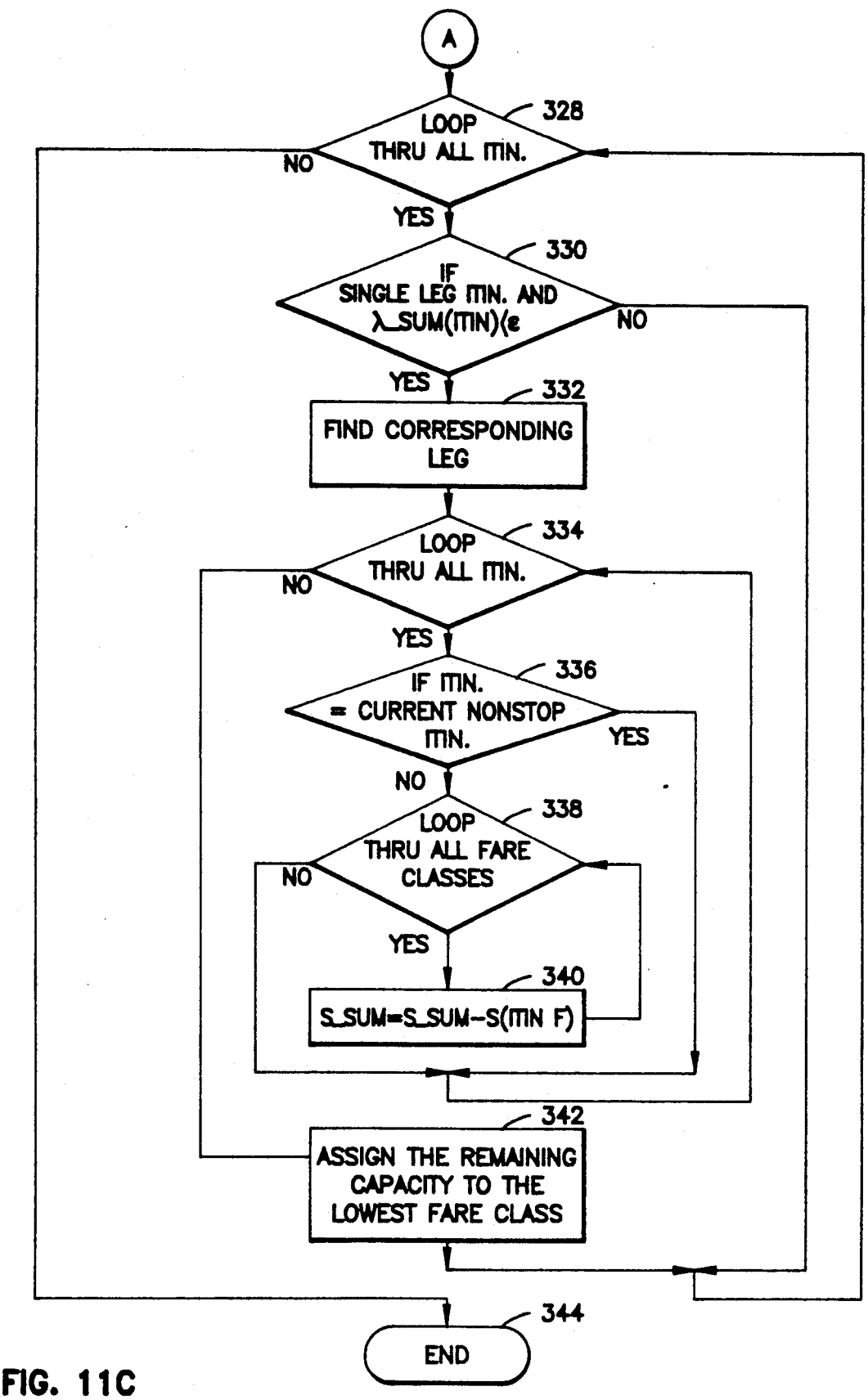

FIGS. 11A, 11B, and 11C combined are a flow chart describing the logic of the SEAT DUMP routine in the preferred embodiment. The SEAT DUMP routine allocates the seats for those paths where $\lambda\_SUM(ITIN)$ is equal to 0. For these paths, the combined demands for all fare classes are well below the minimum capacity of the paths. Since the booking limits are nested, all seats will be assigned to the lowest fare class. The SEAT DUMP routine first assigns seats to the multi-leg paths, and then assigns seats to the single-leg paths.

After the SEAT DUMP routine starts (300), a first loop is executed once for each itinerary in the network (302). If an itinerary is a multi-leg itinerary and λ_SUM(ITIN) is less than ε (304), then μ_SUM and σ_SUM for the itinerary are initialized to 0 (306). A second loop is executed once for each fare class (308). A summation of the μ(ITIN-F) values for all fare classes is stored in μ_SUM (310). The σ(ITIN-F) values are squared and a summation for all fare classes is stored in σ_SUM (310). The second loop terminates when complete (308).

After the second loop terminates (308), the square root of σ_SUM is stored in σ_SUM (312). A third loop is executed once for each leg in the itinerary (314). A fourth loop is executed once for each itinerary that contains the particular leg (316). The variable SUM1A is initialized to 0 (318). A fifth loop is executed once for each fare class (320). σ(ITIN-F) is squared and a summation for all legs is stored in SUM1A (322). The fifth loop terminates when complete (320).

After the fifth loop terminates (320), a summation of SUM1A is stored in SQRSUM (324). A summation of the square root of SUM1A is stored in SUMSQRT (324). The third and fourth loops terminate when complete (316, 314).

After the third loop terminates (314), S(ITIN-F) for the lowest fare in the itinerary is calculated as:

$$S(ITIN\text{-}F) = \mu\_SUM + \frac{3\,(SQRSUM)\,\sigma\_SUM}{SUMSQRT}$$

and the S(ITIN-F) values for the remaining fare classes are set to 0 (326). The first loop terminates when complete (302).

After the first loop terminates (302), a sixth loop is executed once for each itinerary (328). If the itinerary has only a single leg (i.e., it is a nonstop flight) and λ_SUM(ITIN) is less than the ε tolerance value (330), then a seventh loop is executed once for every itinerary (334). For every itinerary that contains the leg (336), and for every fare class in those paths (338), the seats allocated to the fare classes are subtracted from the total capacity (340). The seventh loop terminates when complete (334).

After the seventh loop terminates (334), the remaining capacity is assigned to the lowest fare class (342). The sixth loop terminates when complete (328).

After the sixth loop terminates (328), the SEAT DUMP routine terminates (344).

Figure 12A:
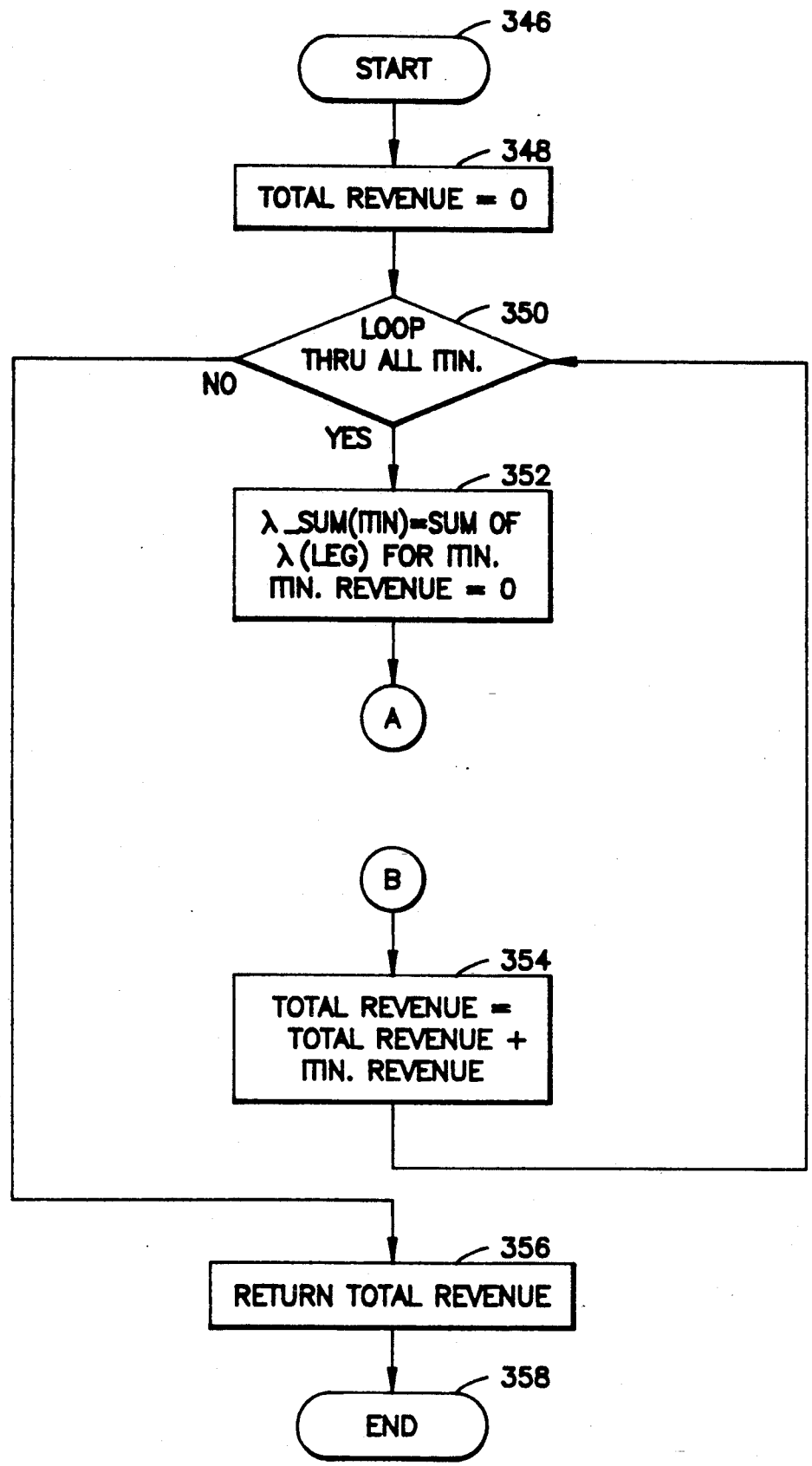
FIG. 12 is a flow chart describing the logic of the Revenue routine in the preferred embodiment of the present invention.
Figure 12B:
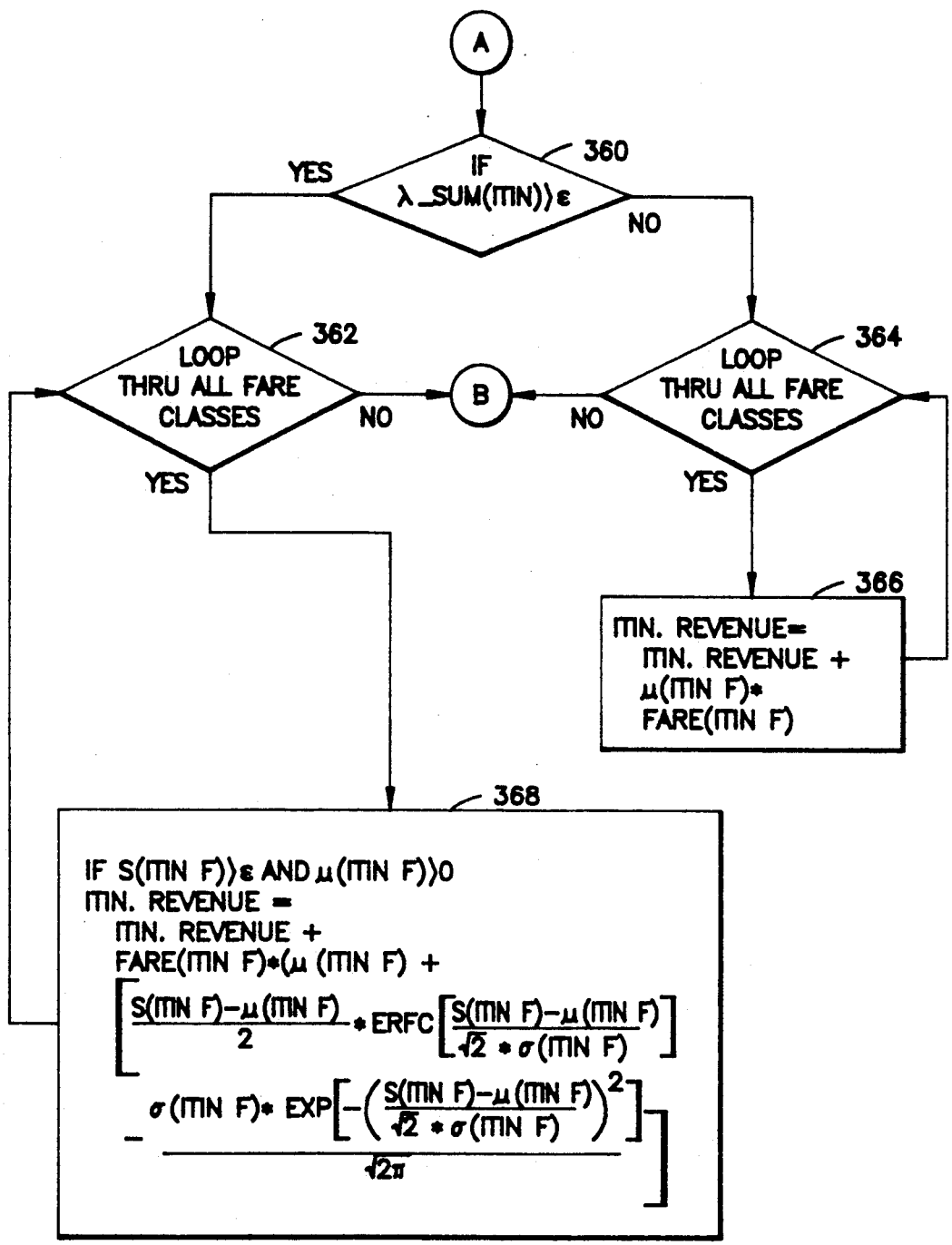
Figure 13A:
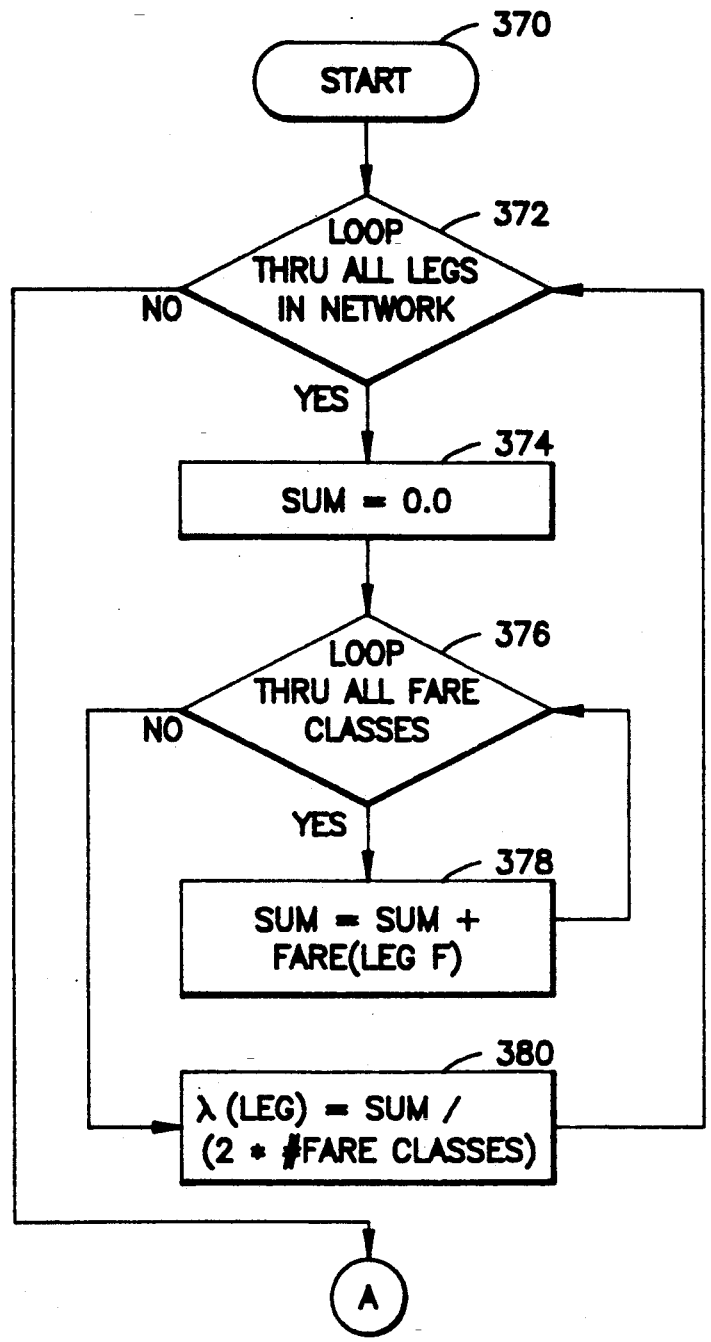
FIG. 13 is a flow chart describing the logic of the Calculate Lambdas routine in the preferred embodiment of the present invention.
Figure 13B:
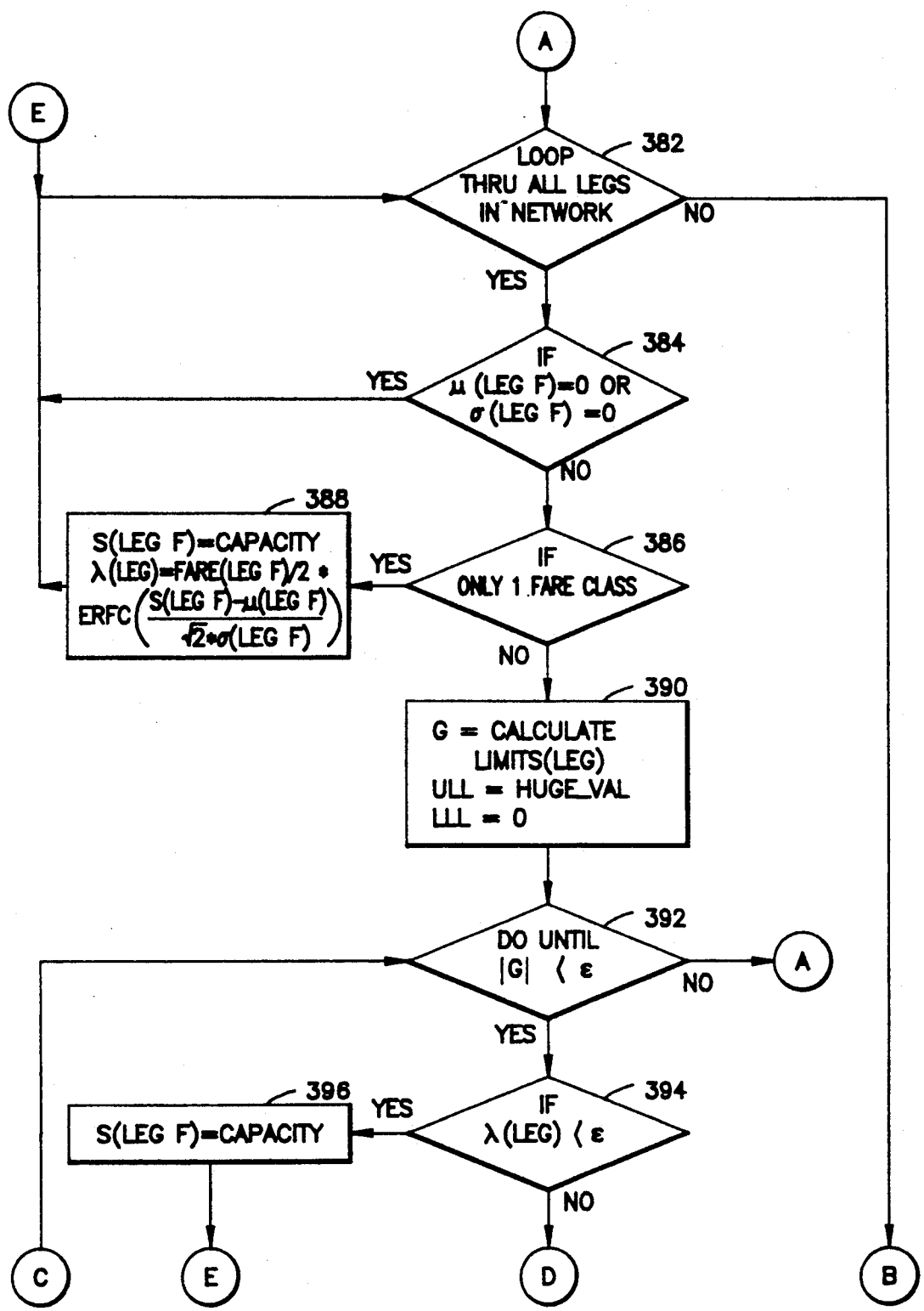
Figure 13C:
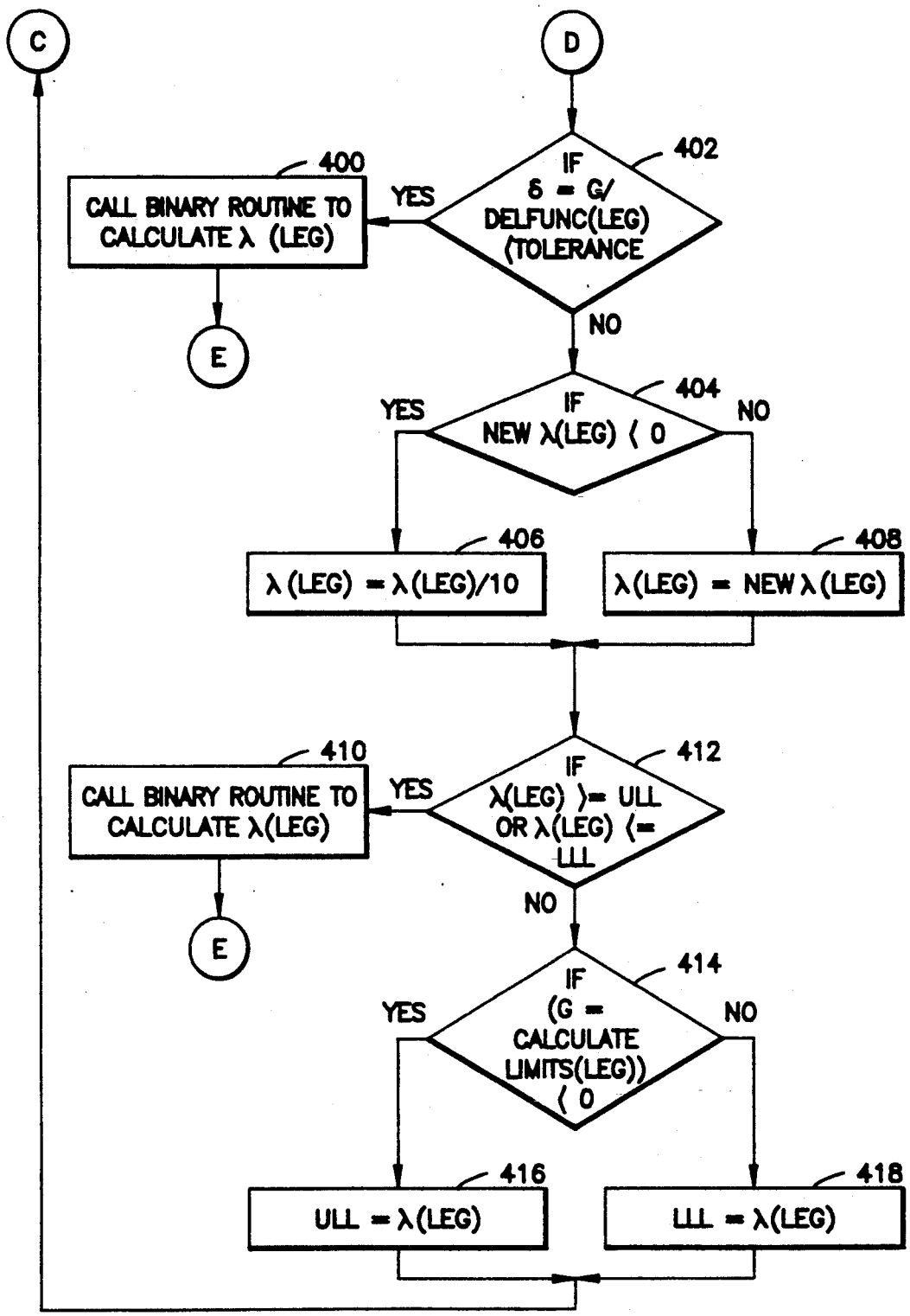
Figure 13D:
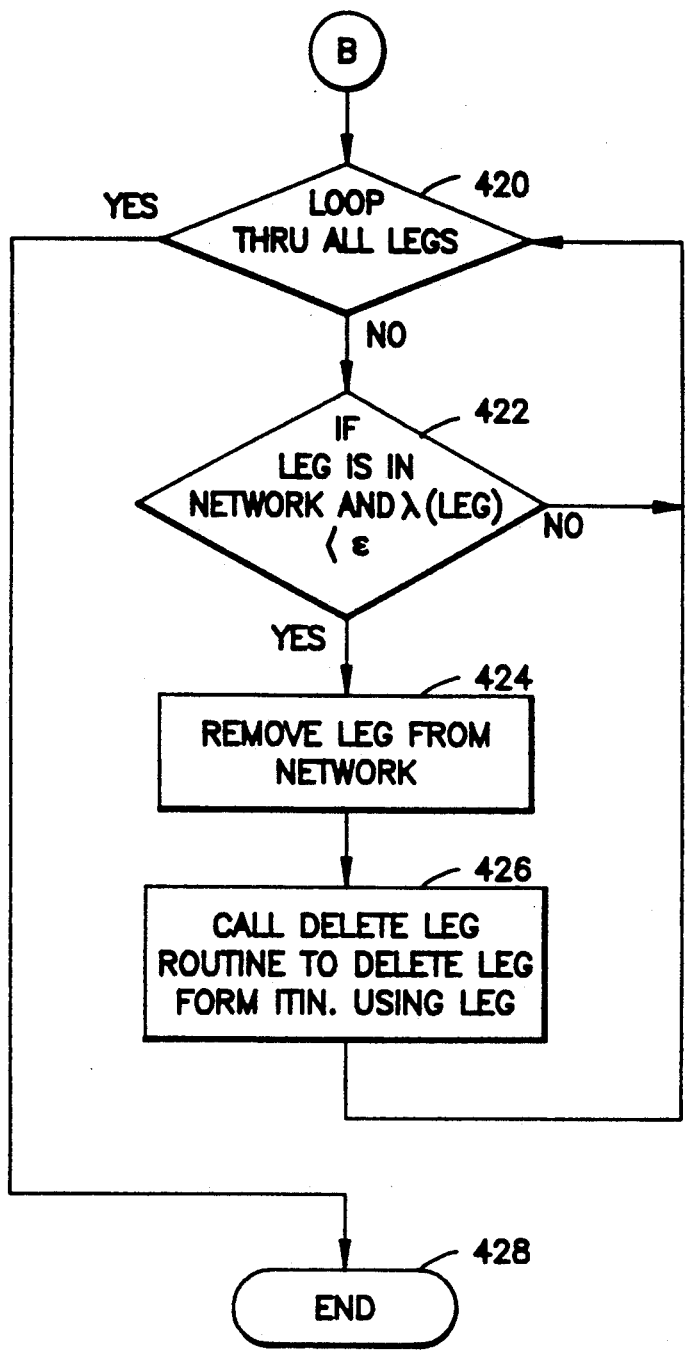

FIG. 12 is a flow chart describing the logic of the REVENUE routine in the preferred embodiment. The REVENUE routine calculates the total revenue generated by the S(ITIN-F) values.

After the REVENUE routine starts (346), a total revenue variable is initialized to 0 (348). A first loop is executed once for every itinerary (350). A summation of λ(LEG) values for the itinerary is stored in λ_SUM(ITIN) and an itinerary revenue variable is initialized to 0 (352).

If λ_SUM(ITIN) is greater than the ε tolerance value (360), then a second loop is executed once for every fare class (362). Within the second loop, the itinerary revenue is calculated as (368):

ITINERARY REVENUE =

ITINERARY REVENUE + FARE(ITIN-F)

$$\left( \mu(ITIN\text{-}F) + \left( \frac{S(ITIN\text{-}F) - \mu(ITIN\text{-}F)}{2} \right) \right.$$

$$erfc\left( \frac{S(ITIN\text{-}F) - \mu(ITIN\text{-}F)}{\sqrt{2}\,\sigma(ITIN\text{-}F)} \right) -$$

$$\left. \frac{\sigma(ITIN\text{-}F)\exp\left( -\left( \frac{S(ITIN\text{-}F) - \mu(ITIN\text{-}F)}{\sqrt{2}\,\sigma(ITIN\text{-}F)} \right)^2 \right)}{\sqrt{2\pi}} \right)$$

The second loop terminates when complete (362).

After the second loop terminates (362), the itinerary revenue is added to the total revenue (354).

If λ_SUM(ITIN) is less than or equal to the ε tolerance value (360), then a third loop is executed once for each fare class (364). Within the third loop, the itinerary revenue is calculate as (366):

ITINERARY REVENUE =

ITINERARY REVENUE + FARE(ITIN-F) μ(ITIN-F)

The third loop terminates when complete (364).

After the second and third loops terminate (362, 364), the itinerary revenue is added to the total revenue (354). The first loop terminates when complete (350).

After the first loop terminates (350), the total revenue is returned (356) and the REVENUE routine terminates (358).

FIG. 13 is a flow chart describing the logic of the CALCULATE LAMBDAS routine in the preferred embodiment. The CALCULATE LAMBDAS routine calculates the expected marginal seat revenue (EMSR), i.e., λ(LEG), for all legs in the network using a leg-based mileage-prorated EMSR method. The resulting λ(LEG) values are then used as the initial value for the Truncated Newton method. The CALCULATE LAMBDAS routine also removes those legs from the network where λ(LEG) is less than the ε tolerance value.

After the CALCULATE LAMBDAS routine starts (370), a first loop is executed once for each leg in the network (372). A second loop is executed to sum the fares in all fare classes and store the result in the SUM variable (374, 376, 378). After the second loop terminates (376), the λ(LEG) is calculated as (380):

$$\lambda(LEG) = \frac{SUM}{(2)\,(NUMBER\text{-}OF\text{-}FARE\text{-}CLASSES)}$$

The first loop terminates when complete (372). This provides the first approximation for the λ(LEG) values.

After the first loop terminates (372), a third loop is executed once for each leg in the network (382). If μ(LEG-F) or σ(LEG-F) is 0 for the lowest fare class (384), then the leg is skipped. Otherwise (384), if there is only one fare class (386), i.e., the lowest fare class, then all seats are dumped into the lowest fare class by setting S(ITIN-F) for the lowest fare class equal to the capacity of the leg, and an approximation for λ(LEG) is computed as (388):

$$\lambda(LEG) = \frac{FARE(LEG\text{-}F)}{2} \, erfc\left(\frac{S(LEG\text{-}F) - \mu(LEG\text{-}F)}{\sqrt{2}\,\sigma(LEG\text{-}F)}\right)$$

Otherwise (386), if there is more than one fare class, then the CALCULATE LIMITS routine is called to calculate a first approximation for γ(LEG) (storing the result in the G variable), to set the variable ULL to a high value, and to set the variable LLL to 0 (390). A third loop is executed until the absolute value of G is less than the ε tolerance value (392). If λ(LEG) is less than the ε tolerance value (394), then all seats are dumped into the lowest fare class by setting S(ITIN-F) for the lowest fare class equal to the capacity of the leg and setting the S(ITIN-F) values for the remaining fare classes to 0 (396). Otherwise (394), if δ(LEG), the change in λ(LEG), G, divided by the results of the DELFUNC routine, is less than the ε tolerance value (402), then the BINARY routine is called to compute λ(LEG) using a binary search, because the scalar Newton's method has failed to find the λ(LEG) value in the leg-based mileage-prorated EMSR method (400). If δ(LEG) is greater than or equal to the ε tolerance value, then the new λ(LEG) is calculated by subtracting δ(LEG) from λ(LEG) (402). If the new λ(LEG) is negative (404), then λ(LEG) is set to the old value of λ(LEG) divided by 10 (406). Otherwise (404), λ(LEG) is set to the value of the new λ(LEG) (408). If λ(LEG) is greater than or equal to the ULL value or less than or equal to the LLL value (412), then the scalar Newton iteration has failed, and the BINARY routine is called to compute λ(LEG) using a binary search (410). Otherwise (412), the CALCULATE LIMITS routine is called to calculate an approximation for γ(LEG) (414). If the approximation for γ(LEG) is less than 0 (414), then ULL is set to the value of λ(LEG) (416). Otherwise, if γ(LEG) is greater than or equal to 0 (414), then LLL is set to the value of λ(LEG) (418). The fourth and third loops terminate when complete (392, 382).

After the third loop terminates (382), a fifth loop is executed once for each leg (420). If the leg is in the network and λ(LEG) is less than the ε tolerance value (422), then the leg is marked for deletion from the network (424). The DELETE LEG routine is called to remove the leg from the network (426). The fifth loop terminates when complete (420).

After the fifth loop terminates (420), the CALCULATE LAMBDA routine terminates (428).

Figure 14A:
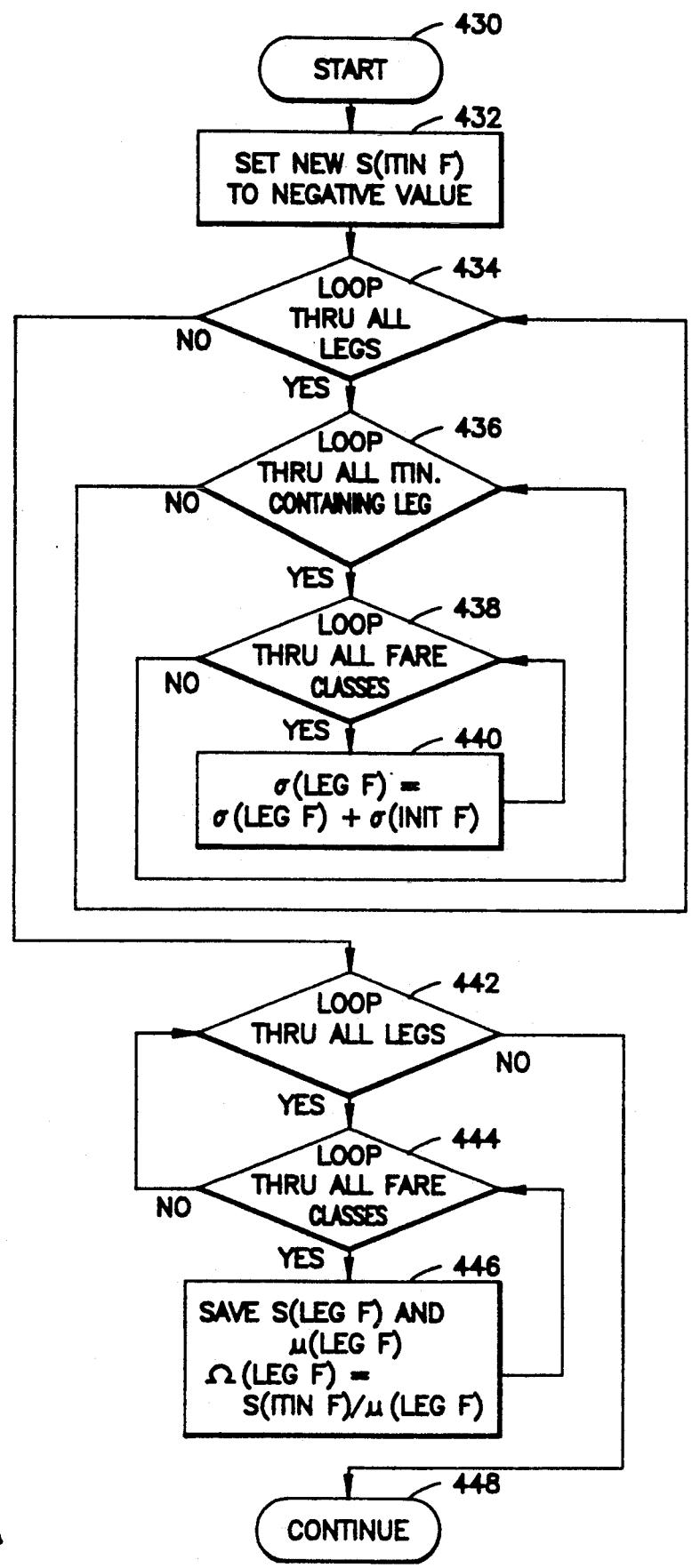
FIGS. 14A and 14B combined are a flow chart describing the logic of the Leg Convert routine in the preferred embodiment of the present invention.
Figure 14B:
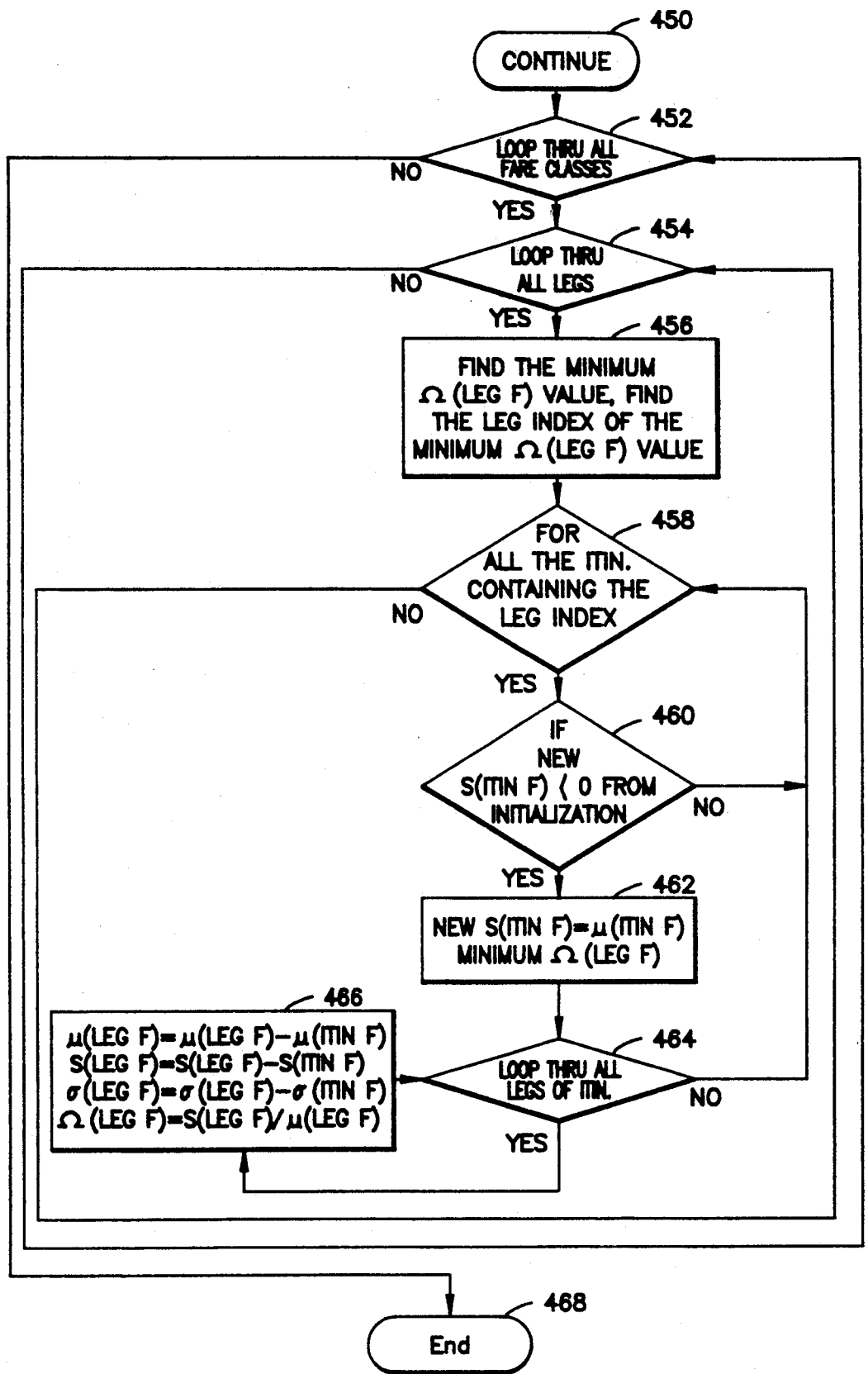

FIGS. 14A and 14B combined are a flow chart describing the logic of the LEG CONVERT routine in the preferred embodiment. The LEG CONVERT routine converts the S(LEG-F) values from the leg-based mileage-prorated EMSR method to a corresponding set of S(ITIN-F) network-based booking limit values.

After the LEG CONVERT routine starts (430), NEW_S(ITIN-F) is initialized to a negative value (432). A first loop is executed once for every leg in the network (434). A second loop is executed for all paths containing the leg (436). A third loop is executed once for each fare class (438). A summation of all σ(ITIN-F) values is stored in σ(LEG-F) (440). The third, second, and first loops terminate when complete (438, 436, 434).

After the first loop terminates (434), a fourth loop is executed once for each leg (442). A fifth loop is executed once for each fare class (444). The S(LEG-F) and μ(LEG-F) values are temporarily stored (446). Ω(LEG-F) is calculated as (446):

$$\Omega(LEG\text{-}F) = \frac{S(LEG\text{-}F)}{\mu(LEG\text{-}F)}$$

The fifth and fourth loops terminate when complete (444, 442).

After the fourth loop terminates (442), a sixth loop is executed once for each fare class (452). A seventh loop is executed once for each leg (454). If μ(ITIN-F) is greater than ε, and Ω(LEG-F) is less than the prior minimum Ω(LEG-F), then the new minimum Ω(LEG-F) value, and the corresponding leg, are saved (456). An eighth loop is executed once for all paths containing the minimum Ω(LEG-F) leg (458). If NEW_S(ITIN-F) is a negative value (i.e., from the initialization) (460), then NEW_S(ITIN-F) is calculated as (462):

$$NEW\_S(ITIN\text{-}F) = \frac{\mu(ITIN\text{-}F)}{MIN\ \Omega(LEG\text{-}F)}$$

A ninth loop is executed once for all legs of the itinerary (464). A number of calculations are performed (466):

$$\mu(LEG\text{-}F) = \mu(LEG\text{-}F) - \mu(ITIN\text{-}F)$$
$$S(LEG\text{-}F) = S(LEG\text{-}F) - NEW\_S(ITIN\text{-}F)$$
$$\sigma(LEG\text{-}F) = \sigma(LEG\text{-}F) - \sigma(ITIN\text{-}F)$$

$$\Omega(LEG\text{-}F) = \frac{S(LEG\text{-}F)}{\mu(LEG\text{-}F)}$$

These are recalculations of the leg-based mean μ(LEG-F), the leg-based total leg booking limit S(LEG-F), the leg-based standard deviation σ(LEG-F), and the Ω(LEG-F) value (466). The ninth, eighth, seventh, and sixth loops terminate when complete (464, 458, 454, 452).

After the sixth loop terminates (452), the LEG CONVERT routine terminates (468).

Figure 15:
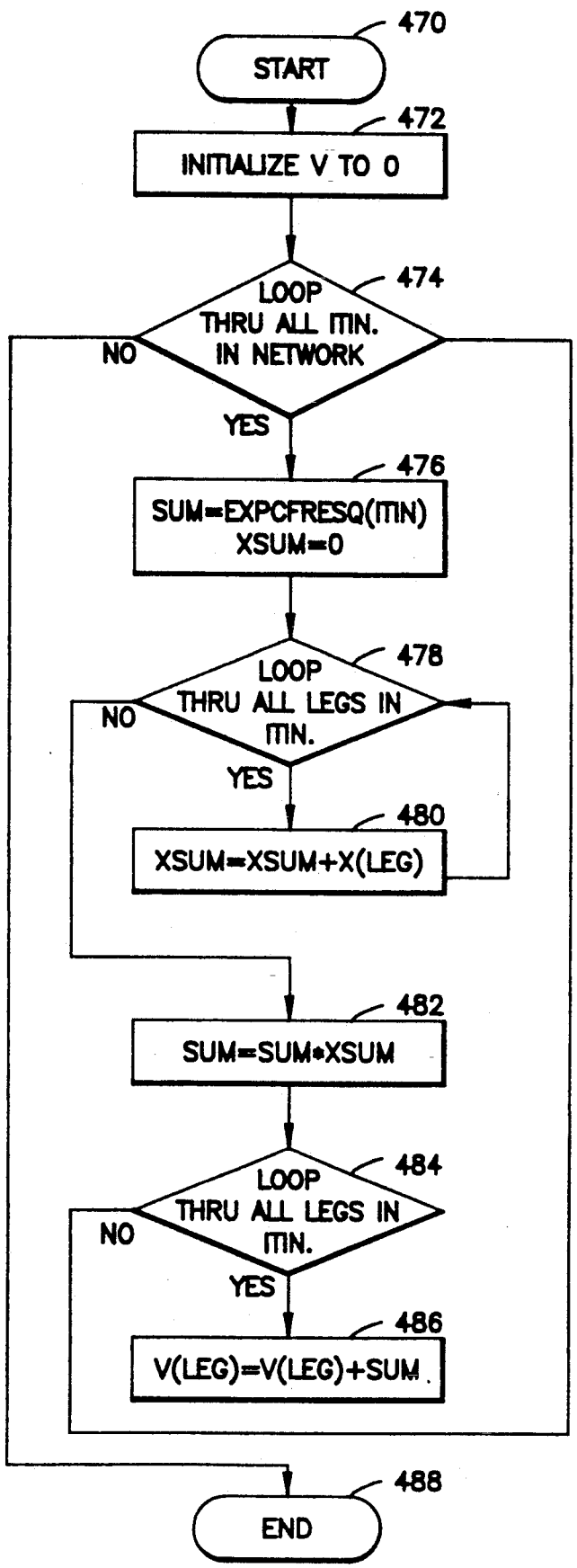
FIG. 15 is a flow chart describing the logic of the Jacobian routine in the preferred embodiment of the present invention.

FIG. 15 is a flow chart describing the logic of the JACOBIAN routine in the preferred embodiment. The JACOBIAN routine calculates the dot product of a Jacobian matrix V=J*X, where X is given as the first argument and the result is returned in the second argument in V. By definition, a Jacobian matrix is symmetric in the seat inventory control method of the preferred embodiment, thus J*X=J$^T$*X. At the same time, the JACOBIAN routine takes advantage of the sparseness of the J matrix.

After the JACOBIAN routine starts (470), the entries in the V array are initialized to 0 (472). A first loop is executed for each itinerary in the network (474), calculating the entries for the Jacobian matrix. EXPCFRESQ(ITIN) is stored in the variable SUM and X_SUM is set to 0 (436). A second loop is executed once for all legs in the itinerary (478). The entries in the X array, corresponding to the legs, are summed and stored in the variable X_SUM (480). The second loop terminates when complete (478).

After the second loop terminates (478), the variable SUM is set to the product of SUM and X_SUM, i.e., the product of the X array entry summation and one column of the J matrix (482). A third loop is executed once for all legs in the itinerary (484). The V array entry, corresponding to the leg, has the SUM value added to it (486). The third and first loops terminate when complete (484, 474).

After the first loop terminates (474), the JACOBIAN routine terminates (488).

Figure 16:
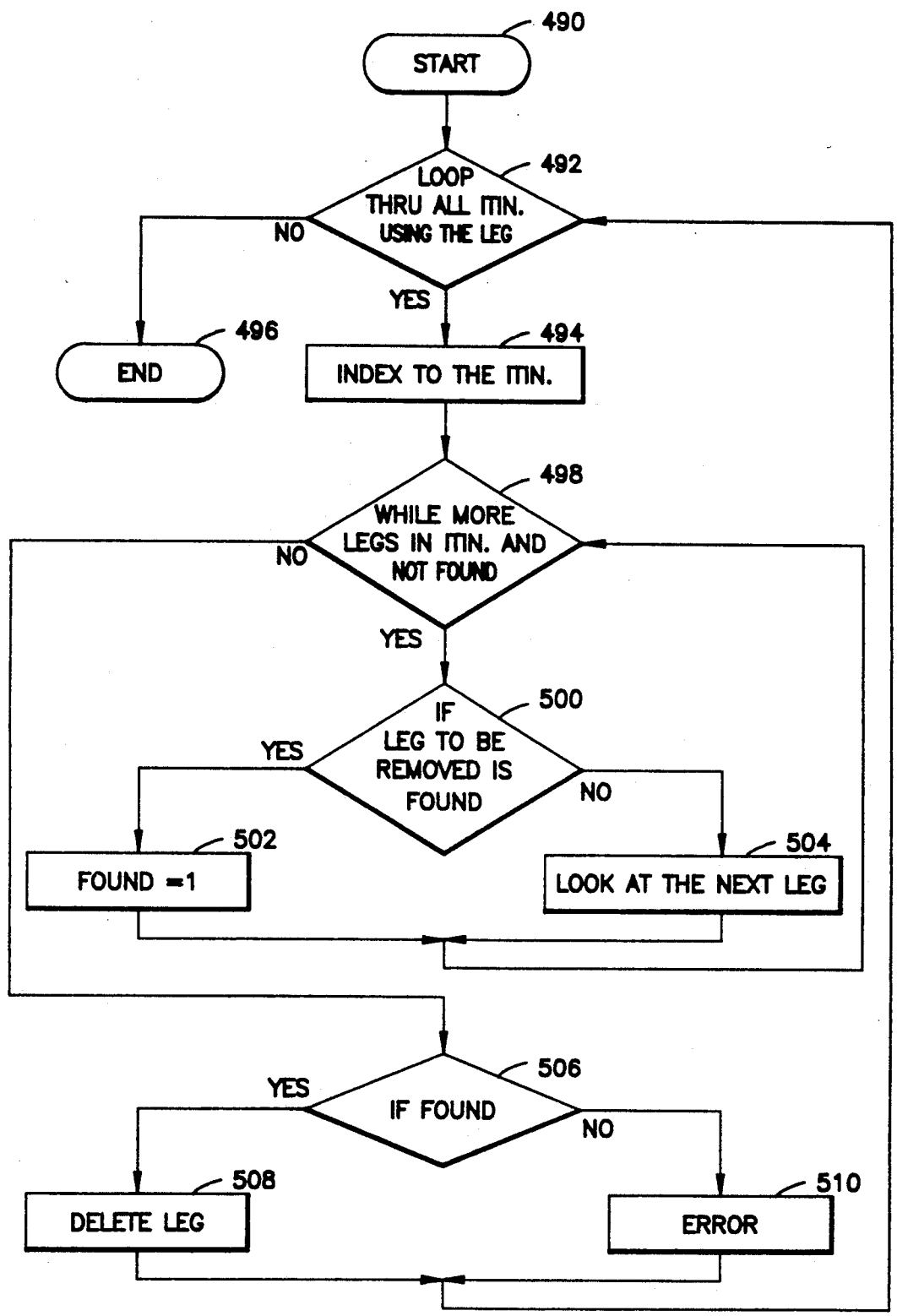
FIG. 16 is a flow chart describing the logic of the Delete Leg routine in the preferred embodiment of the present invention.

FIG. 16 is a flow chart describing the logic of the DELETE LEG routine in the preferred embodiment. The DELETE LEG routine removes the identified leg from the identified itinerary, where $\lambda(LEG)$ is equal to 0.

When the DELETE LEG routine starts (490), it accepts as an argument the index of the leg to be deleted. A first loop is executed for all the paths using this leg (492). A second loop is executed as long as there are more legs are in the itinerary and the particular leg has not been found (498). If the leg to be removed is found (500), then a FOUND flag is set to 1 (502). Otherwise (500), the next leg is examined (504). The second loop terminates when complete (498).

After the second loop terminates (498), the FOUND flag is examined, and if set to 1 (506), the leg is then deleted (508). Otherwise (506), an error occurred (510). The first loop terminates when complete (492).

After the first loop terminates (492), the DELETE LEG routine terminates (496).

Figure 17:
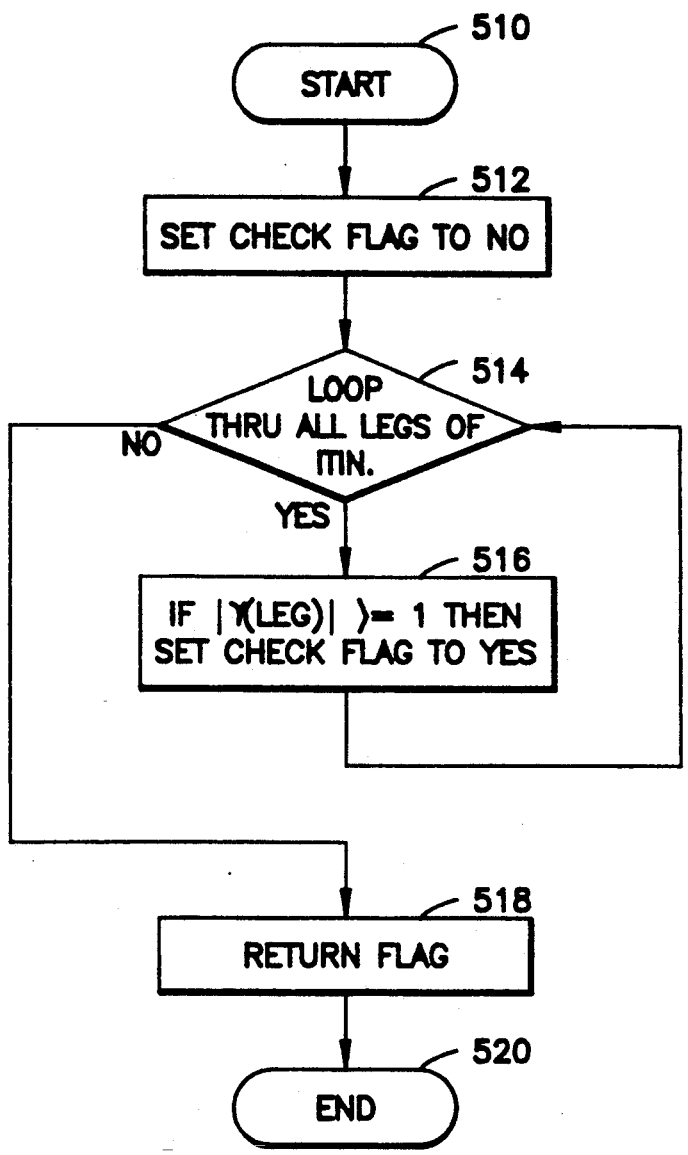
FIG. 17 is a flow chart describing the logic of the Check Gamma routine in the preferred embodiment of the present invention.

FIG. 17 is a flow chart describing logic of the CHECK GAMMA routine in the preferred embodiment. The CHECK GAMMA routine checks to see if a rejected itinerary can be put back into the network by determining if all $\gamma(LEG)$ values for all the legs in the itinerary are less than 1.

After the CHECK GAMMA routine starts (510), a CHECK_FLAG variable is set to "no" (512). A first loop is executed once for all legs of the itinerary (514). If the absolute value of $\gamma(LEG)$ is greater than or equal to 1, then the CHECK_FLAG is set to "yes" (516). The first loop terminates when complete (514), the CHECK_FLAG is returned to the calling routine (518), and the CHECK GAMMA routine terminates (520).

Figure 18:
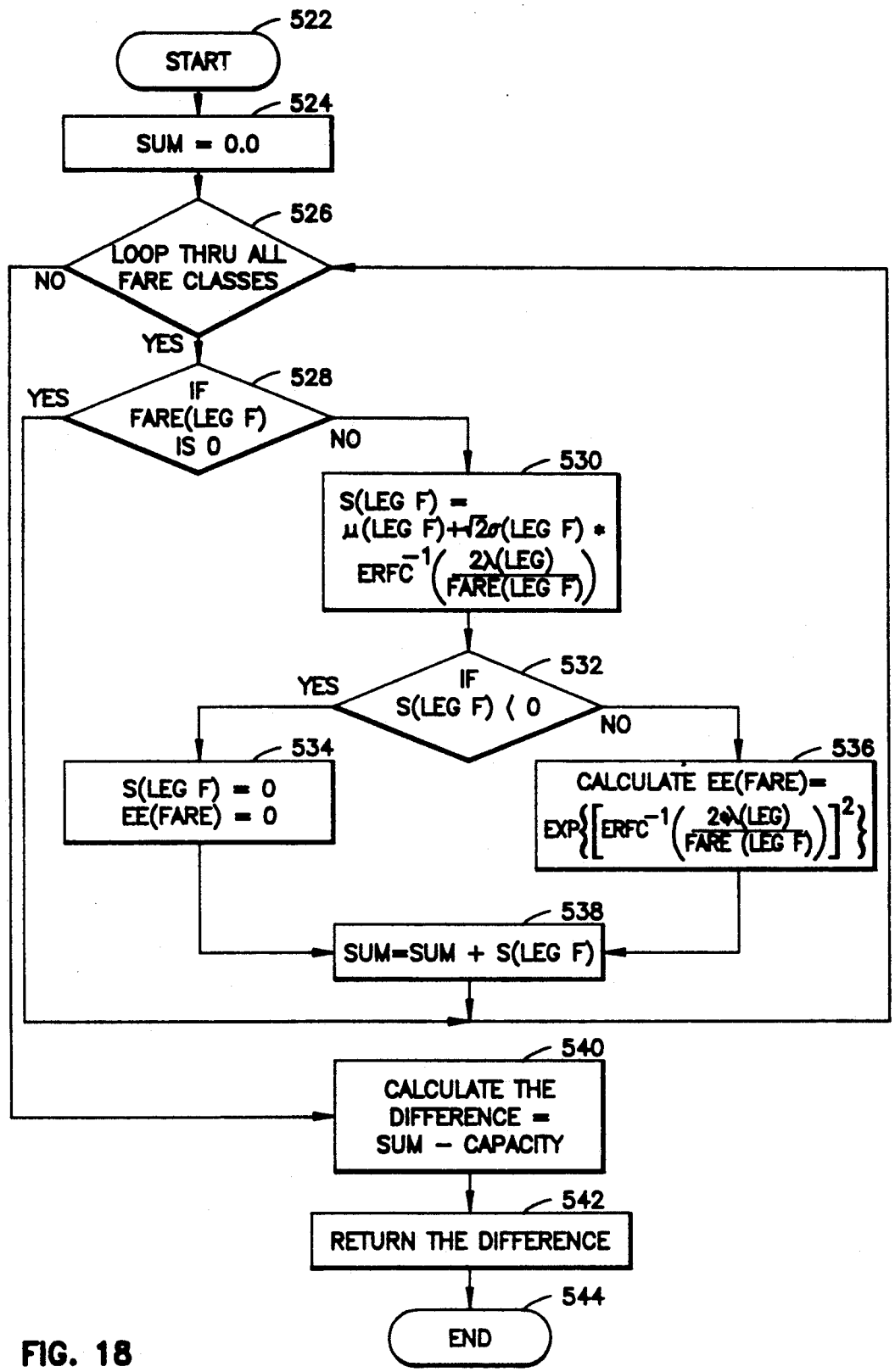
FIG. 18 is a flow chart describing the logic of the Calculate Limits routine in the preferred embodiment of the present invention.

FIG. 18 is a flow chart describing a logic of the CALCULATE LIMITS routine in the preferred embodiment. The CALCULATE LIMITS routine calculates the S(LEG-F) values using a leg-based mileage-prorated EMSR method.

After the CALCULATE LIMITS routine starts (522), a SUM variable is initialized to 0 (524). A first loop is executed once for each fare class (526). If FARE(LEG-F) is not 0 (528), then the S(LEG-F) is calculated as (530):

$$S(LEG\text{-}F) = \mu(LEG\text{-}F) + \sqrt{2}\,\sigma(LEG\text{-}F)\,erfc^{-1}\left(\frac{2\lambda(LEG)}{FARE(LEG\text{-}F)}\right)$$

If S(LEG-F) is less than 0 (532), then S(LEG-F) and EE(FARE) are set to 0 (534). Otherwise (532), EE(-FARE) is calculated as (536):

$$EE(FARE) = \exp\left(\left(erfc^{-1}\left(\frac{2\lambda(LEG)}{FARE(LEG\text{-}F)}\right)\right)^2\right)$$

The S(LEG-F) values are accumulated in the SUM variable (538). The first loop terminates when complete (526).

After the first loop terminates (526), the difference between SUM and the leg capacity is determined (540), returned to the calling procedure (542), and the CALCULATE LIMITS routine terminates (544).

Figure 19:
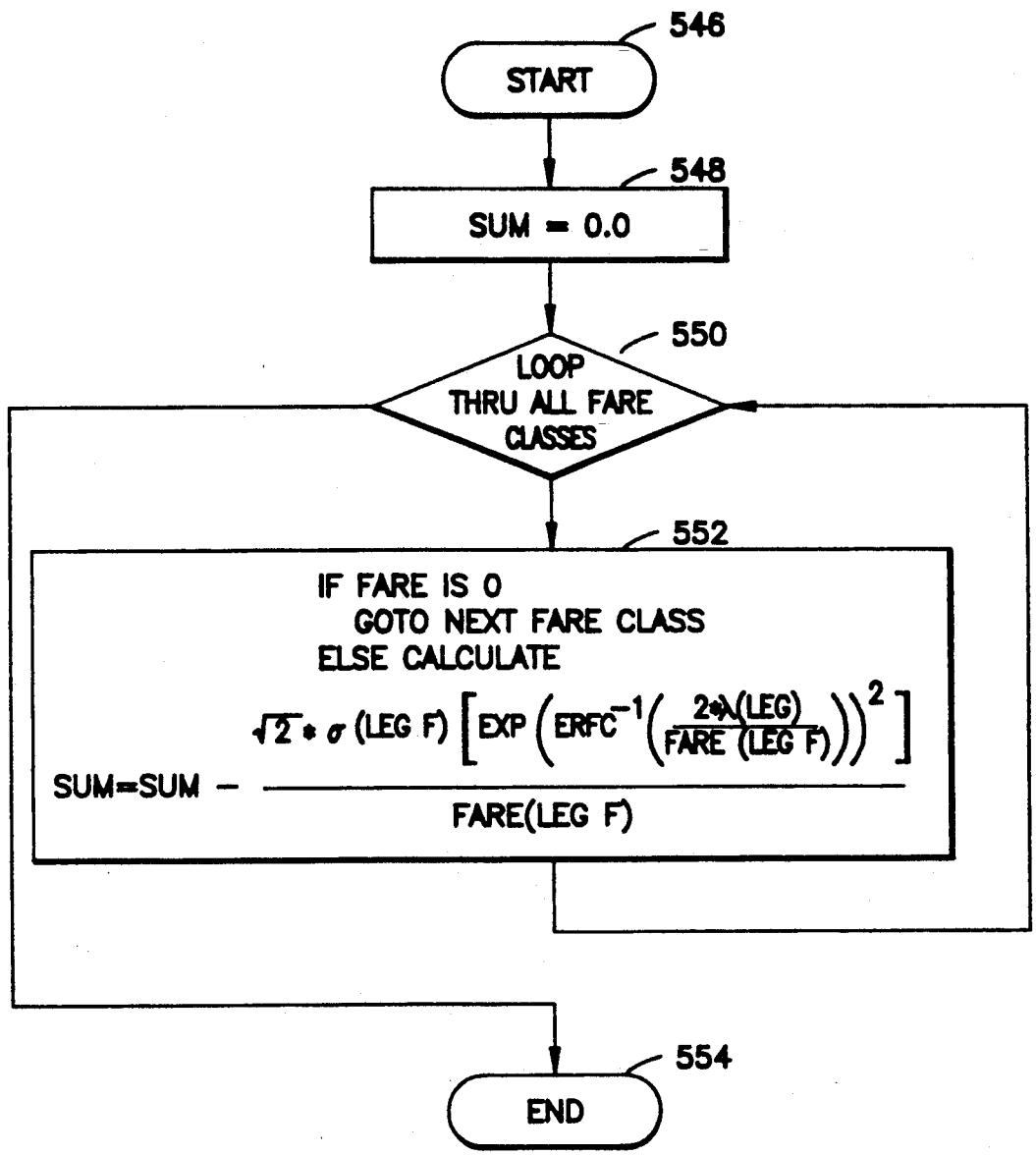
FIG. 19 is a flow chart describing the logic of the Delfunc routine in the preferred embodiment of the present invention.

FIG. 19 is a flow chart describing the logic of the DELFUNC routine in the preferred embodiment. This routine calculates a summation for all fare classes for a particular leg:

$$SUM = SUM - \sqrt{2}\,\sigma(LEG\text{-}F)\exp\left(\left(erfc^{-1}\left(\frac{2\lambda(LEG)}{FARE(LEG\text{-}F)}\right)\right)^2\right) \div FARE(LEG\text{-}F)$$

When the DELFUNC routine starts (246), the variable SUM is initialized to 0 (548). A first loop is executed once for each fare class (550). If FARE(LEG-F) is 0, then the fare class is skipped (552). Otherwise, the above-identified value is calculated (552). The first loop terminates when complete (550) and the DELFUNC routine terminates (554).

Figure 20:
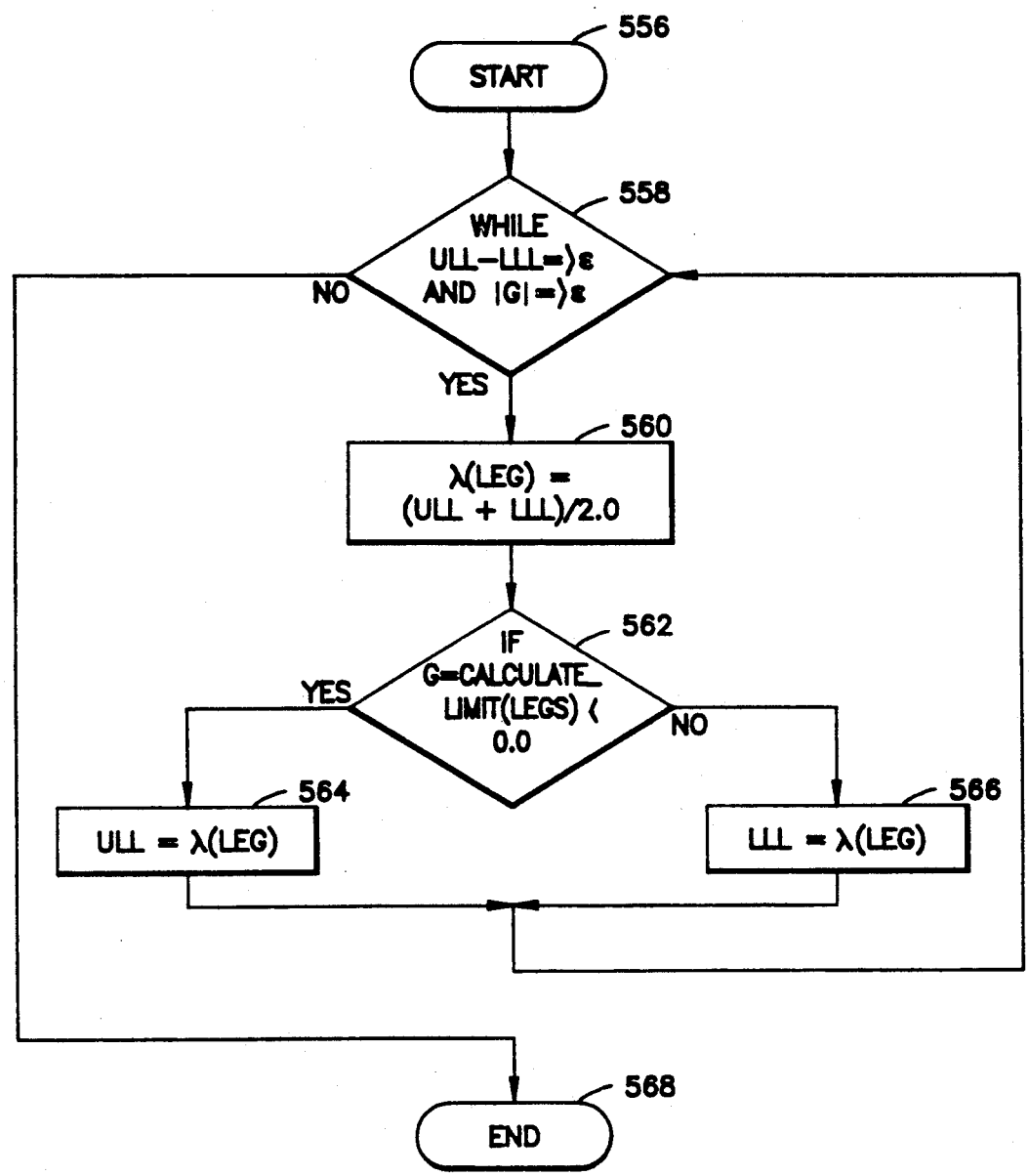
FIG. 20 is a flow chart describing the logic of the Binary routine in the preferred embodiment of the present invention.

FIG. 20 is a flow chart describing the logic of the BINARY routine in the preferred embodiment. The BINARY routine uses a binary search to calculate $\lambda(LEG)$ for a given leg, when the scalar Newton method fails in the leg-based mileage-prorated EMSR method.

After the BINARY routine starts (556), a first loop is executed until the difference between ULL and LLL is less than the $\epsilon$ tolerance value, and the absolute value of G is less than the $\epsilon$ tolerance value (558). $\lambda(LEG)$ is calculated as (560):

$$\lambda(LEG) = \frac{ULL + LLL}{2}$$

If G, which is the returned value from the routine CALCULATE LIMITS, is less than 0 (562), then ULL is set to the $\lambda(LEG)$ value (564). Otherwise (562), if G is greater than or equal to 0 (562), then LLL is set to the $\lambda(LEG)$ value (566). The first loop terminates when complete (558), and the BINARY routine then terminates (568).

VII. Conclusion

This concludes the description of the preferred embodiment of the present invention. The following paragraphs describe some alternative embodiments of the invention.

Any number of other yield management solutions could be substituted for the airline seat inventory control system described herein. Instead of using seats, paths, itinerary/fare classes, and flight legs, the invention could be formulated in terms of resources, paths, demand categories, and resource categories, respectively. This would allow the invention to be generalized to other embodiments, but would not entail any revision to the solution offered. It is believed that most yield management systems can be described in the general terms given above.

In summary, an airline seat inventory control system has been described which assigns seat booking limits to fare classes for at least one origin-destination itinerary in a flight network. The system accomplishes this task by first formulating a plurality of nonlinear equations representing a constrained optimization of an expected total revenue for the flight network. The formulation requires the use of the known seat capacity of each flight leg, the known demand distribution for each fare class, the known revenue yield for each seat reserved with each fare class, the seat booking limits for each fare class, and a plurality of Lagrange multipliers each representing an expected marginal seat revenue for an additional seat available on a flight leg. The system then refines an initial approximation of the solution to the nonlinear equations using a Newton-Raphson iteration until a globally optimal set of the expected marginal seat revenues and seat booking limits for the fare classes are obtained. This system produces optimal seat booking limits network-wide while taking into account the probabilistic nature of demand. Based on a concept termed *Network-Based Expected Marginal Seat Revenue (EMSR)*, the system does not require the large number of variables required by the other network-based approaches, and it incorporates a probabilistic demand model without resorting to computationally intractable integer programming.

The foregoing descriptions of the preferred embodiments of the invention have been presented for the purposes of illustration and description. These preferred embodiments are not intended to be exhaustive nor to limit the invention to the precise forms disclosed. Many modifications and variations are possible in light of the above teaching. It is intended that the scope of the invention be limited not by this detailed description, but rather by the claims appended thereto.

TABLE 1

Comparison Of Seat Allocation Methods

| Algorithm | Optimal Basis | Demand Characteristics | Number Of Variables | Computational Complexity |
| --- | --- | --- | --- | --- |
| Leg-based EMSR | Leg | Stochastic | Small | Linear |
| Virtual-Nesting EMSR | Leg | Stochastic | Small | Linear |
| Deterministic LP | Network | Deterministic | Large | Large Polynomial |
| Probabilistic LP | Network | Stochastic | Very Large | Exponential |
| Network-Based EMSR | Network | Stochastic | Small | Small Polynomial |

APPENDIX A.1

Proof of the Positive Semidefiniteness of the Jacobian

Theorem: The matrix J defined by Eq. (11) is positive semidefinite.

Proof: By definition, the matrix J is positive semidefinite if the quadratic form $x^T J x \geq 0$. Reconsidering Eqs. (11) and (16), we can write:

$$x^T J x = \sum_{p \in P} x^T J(p) x$$

$$= \sum_{p \in P} \frac{\left[ \sum_{\tau=1}^{\phi} - Q_p^j \left( \sum_{c \in p} \lambda_c / f_{p^i} \right) \right]}{f_{p^i}} \left( \sum_{a \in p} x_a \right)^2$$

Each term in this sum is the product of two factors. the first factor is itself a sum of positive terms (cf. Eq. (12)), and so it is positive. The second factor is a square and must be non-negative. Hence, each product term is non-negative, and so, therefore, is the outer sum.

What is claimed is:

1. An airline seat reservation system, comprising:
   (a) a programmed computer;
   (b) data storage means, coupled to the programmed computer, for storing a database describing a flight network and seat reservation requests, the flight network comprised of a known seat capacity for each of a plurality of flight legs, a known demand distribution for each of a plurality of itinerary/fare classes, a known revenue yield for a seat reserved within each itinerary/fare class, and a booking limit for each itinerary/fare class;
   (c) the programmed computer including itinerary/fare class assignment means for processing the data base describing the flight network to assign seats in a flight leg to a plurality of itinerary/fare class combinations in at least one itinerary of the flight network, the assignment means comprising:
      (1) means for formulating a plurality of nonlinear equations representing a constrained optimization of an expected total revenue for the flight network and a plurality of Lagrange multipliers each representing an expected marginal seat revenue for an additional seat available on a flight leg;
      (2) means for refining an initial approximation of a solution to the nonlinear equations using a Newton-Raphson iteration to provide a globally optimal set of expected marginal seat revenues and booking limits;
   (d) reservation terminal means, operatively connected to the programmed computer, for entering a seat reservation request for a particular itinerary/fare class; and
   (e) the programmed computer including reservation means for receiving the seat reservation request from the reservation terminal means, for accepting or rejecting the seat reservation request in accordance with the globally optimal set of expected marginal seat revenues and booking limits, for recording the seat reservation request in the data storage means, and for transmitting an electronic status signal of the seat reservation request to the reservation terminal means.

2. The system of claim 1, wherein the means for formulating comprises means for maximizing the expected total revenue for the flight network, the expected total revenue being defined by:

$$R = \sum_{z \in Z} R_z (S_z)$$

subject to a capacity constraint for each flight leg a so that:

$$\sum_{z \in V(a)} S_z = C_a$$

by introducing a Lagrange multiplier $\lambda_b$ for each flight leg a so that:

$$\sum_{z \in V(a)} Q_z \left( \sum_{b \in U(z)} \lambda_b / f_z \right) = C_a$$

for all $a \in A$ wherein:
(a) z represents an itinerary/fare class;
(b) Z represents a set of all itinerary/fare classes;
(c) a represents a flight leg;
(d) A represents a set of all flight legs;
(e) V(a) represents the set of all itinerary/fare classes that use flight leg a;
(f) b represents a flight leg of the itinerary/fare class z;
(g) U(z) represents the set of all flight legs used by the itinerary/fare class z;
(h) $d_2(x)$ represents a demand distribution function for the itinerary/fare class z;
(i) $S_z$ represents a booking limit for the itinerary/fare class z;
(j) $C_a$ represents a capacity for the flight leg a;
(k) $f_z$ represents a revenue yield for each seat sold in the itinerary/fare class z;
(l) $R_z(S_z)$ represents an expected total revenue for the itinerary/fare class z so that:

$$R_z(S_z) = f_z \left[ \int_{-\infty}^{S_z} x d_z(x) dx = S_z \int_{S_z}^{\infty} d_z(x) dx \right]$$

(m) $R_z'$ represents a derivative of $R_z$, i.e., an expected marginal seat revenue for satisfying additional demand in excess of $S_z$ in the itinerary/fare class z, so that:

$$R_z'(S_z) = \left( \frac{\partial}{\partial S_Z} \right) R_z(S_z) = f_z \int_{S_z}^{\infty} d_z(x) dx$$

(n) $Q_z$ represents an inverse of $R_z'$ wherein $Q_z(R_z'(S_z)/f_z) = S_z$; and
(o) $\lambda_b$ represents an expected marginal seat revenue generated by an additional seat in the flight leg b of the itinerary.

3. The system of claim 1, wherein the means for refining further comprises means for solving a plurality of linear equations for each Newton-Raphson iteration using a Conjugate Gradient iteration.

4. The system of claim 3, where in the means for solving comprises:
(a) means for representing a Jacobian matrix as a summation of a plurality of itinerary matrices, each itinerary matrix comprising a set of identical entries characteristic of an itinerary, the entries comprising partial derivatives of the residual capacity of the itinerary with respect to the expected marginal seat revenues of the flight legs of the itinerary; and
(b) means for accumulating the product of the itinerary matrices and an arbitrary vector into a product of the Jacobian matrix and the arbitrary vector on an itinerary-by-itinerary basis.

5. The system of claim 3, wherein the means for solving further comprises means for terminating the Conjugate Gradient iteration when an approximate solution to the linear system of equations satisfies the convergence criterion defined by:

$$\frac{\| J \delta_\iota - \gamma_\iota \|_2}{\| \gamma_\iota \|_2} \leq \eta_\iota$$

so that $$\eta_\iota = \min \left\{ \frac{1}{(\iota + 2)}, k \| \gamma_\iota \|_2^t \right\}$$

for $0 \leq t \leq 1$ wherein:
(1) J is a Jacobian matrix comprised of a summation of a plurality of itinerary matrices, each itinerary matrix comprising a set of identical entries characteristic of an itinerary, the entries comprising partial derivatives of a residual capacity of the flight legs of the itinerary with respect to the expected marginal seat revenues of the flight legs of the itinerary;
(2) $\delta_1$ is a vector comprising adjustments to the expected marginal seat revenues;
(3) $\gamma_1$ is a vector comprising the residual capacities of the flight legs;
(4) $\iota$ denotes an $\iota$th iterated vector;
(5) $\eta_1$ is a relaxation coefficient; and
(6) $\kappa$ is an arbitrary constant.

6. The system of claim 1, wherein the reservation means for accepting or rejecting the seat reservation request comprises means of accepting the seat reservation request when a total number of seats reserved in the itinerary/fare class does not exceed the booking limit for the itinerary/fare class.

7. The system of claim 1, wherein the reservation means for accepting or rejecting the seat reservation request comprises means for rejecting the seat reservation request when the seat reservation request would yield revenue less than a sum of the expected marginal seat revenues for all flight legs int he itinerary.

8. A yield management system, comprising:
(a) a programmed computer;
(b) data storage means, coupled to the programmed computer, for storing a data base describing known resource capacity for each of a plurality of resource categories, a known demand distribution for each of a plurality of demand categories, a known revenue yield for a resource reserved within each demand category, and a booking limit for each demand category;
(c) the programmed computer including assignment means for processing the database to assign resources in a resource category to a plurality of demand categories, the assignment means comprising:
(1) means for formulating a plurality of nonlinear equations representing a constrained optimization of an expected total revenue for the database and a plurality of Lagrange multipliers each representing an expected marginal resource revenue for an additional resource available on a resource category;
(2) means for refining an initial approximation of a solution to the nonlinear equations using a Newton-Raphson iteration to provide a globally set of expected marginal resource revenues and booking limits;

(d) reservation terminal means, operatively connected to the programmed computer, for entering a resource reservation request for a particular demand category; and (e) the programmed computer including reservation means for receiving the resource reservation request from the reservation terminal means, for accepting or rejecting the resource reservation request in accordance with the globally optimal set of expected marginal resource revenues and booking limits, for recording the resource reservation request in the data storage means, and for transmitting to the reservation terminal means an electronic status signal of the resource reservation request.

9. The system of claim 8, wherein the means for formulating comprises means for maximizing the expected total revenue for the database, the expected total revenue being defined by:

$$R = \sum_{z \in Z} R_z(S_z)$$

subject to a capacity constraint for each resource category a so that:

$$\sum_{z \in V(a)} S_z = C_a$$

by introducing a Lagrange multiplier $\lambda_b$ for each resource category a so that:

$$\sum_{z \in V(a)} Q_z \left( \sum_{b \in U(z)} \lambda_b / f_z \right) = C_a$$

for all $a \in A$ wherein:
(a) z represents a demand category;
(b) Z represents a set of all demand categories;
(c) a represents a resource category;
(d) A represents a set of all resource categories;
(e) V(a) represents the set of all demand categories that use resource category a;
(f) b represents a resource category of the demand category z;
(g) U(z) represents the set of all resource categories used by the demand category z;
(h) $d_z(x)$ represents a demand distribution function for the demand category z;
(i) $S_z$ represents a booking limit for the demand category z;
(j) $C_a$ represents a capacity for the resource category a;
(k) $f_z$ represents a revenue yield for each resource in the demand category z;
(l) $R_z(S_z)$ represents an expected total revenue for the demand category z so that:

$$R_z(S_z) = f_z \left[ \int_{-\infty}^{S_z} x d_z(x) dx = S_z \int_{S_z}^{\infty} d_z(x) dx \right]$$

(m) $R_z'$ represents a derivative of $R_z$, i.e., an expected marginal resource revenue for satisfying additional demand in excess of $S_z$ in the demand category z, so that:

$$R_z'(S_z) = \left( \frac{\partial}{\partial S_z} \right) R_z(S_z) = f_z \int_{S_z}^{\infty} d_z(x) dx$$

(n) $Q_z$ represents an inverse of $R_z'$ wherein $Q_z(R_z'(S_z)/f_z) = S_z$; and (o) $\lambda_b$ represents an expected marginal resource revenue generated by an additional resource in the resource category b.

10. The system of claim 8, wherein the means for refining further comprises means for solving a plurality of linear equations for each Newton-Raphson iteration using a Conjugate Gradient iteration.

11. The system of claim 10, wherein the means for solving further comprises means for terminating the Conjugate Gradient iteration when an approximate solution to the linear system of equations satisfies the convergence criterion defined by:

$$\frac{\| J \delta_\iota - \gamma_\iota \|_2}{\| \gamma_\iota \|_2} \leq \eta_\iota$$

so that $$\eta_\iota = \min \left( \frac{1}{(\iota + 2)}, k \| \gamma_\iota \|_2{}^\iota \right)$$

for $0 \leq \iota \leq 1$ wherein:
(1) J is a Jacobian matrix comprised of a summation of a plurality of demand category matrices, each demand category matrix comprising a set of identical entries characteristic of the demand category, the entries comprising partial derivatives of a residual capacity of the resource categories used by the demand category with respect to the expected marginal resource revenues of those resource categories;
(2) $\delta_1$ is a vector comprising adjustments to the expected marginal resource revenues;
(3) $\gamma_1$ is a vector comprising the residual capacities of the resource categories;
(4) $\iota$ denotes an $\iota$th iterated vector;
(5) $\eta_1$ is a relaxation coefficient;
(6) $\kappa$ is an arbitrary constant.

12. The system of claim 8, wherein the reservation means for accepting or rejecting the resource reservation request comprises means for accepting the resource reservation request when a total number of resources reserved in the demand category does not exceed the booking limit for the demand category.

13. The system of claim 8, wherein the reservation means for accepting or rejecting the resource reservation request comprises means for rejecting the resource reservation request when the resource reservation request would yield revenue less than a sum of the expected marginal resource revenues for all resource categories.

14. An airline seat reservation system, comprising:
(a) a programmed computer;
(b) data storage means, coupled to the programmed computer, for storing a database describing a flight network, the flight network comprised of a known seat capacity for each of a plurality of flight legs, a known demand distribution for each of a plurality of itinerary/fare classes, a known revenue yield for a seat reserved within each itinerary/fare class, and a booking limit for each itinerary/fare class;

(c) the programmed computer including itinerary/fare class assignment means for processing the database describing the flight network to assign seats in a flight leg to a plurality of itinerary/fare class combinations in at least one itinerary of the flight network, the assignment means comprising:

(1) means for formulating a plurality of nonlinear equations representing a constrained optimization of an expected total revenue for the flight network and a plurality of Lagrange multipliers each representing an expected marginal seat revenue for an additional seat available on a flight leg; and (2) means for refining an initial approximation of a solution to the nonlinear equations using a Newton-Raphson iteration to provide a globally optimal set of expected marginal seat revenues and booking limits.

15. The system of claim 14, wherein the means for formulating comprises means for maximizing the expected total revenue for the flight network, the expected total revenue being defined by:

$$R = \sum_{z \in Z} R_z(S_z)$$

subject to a capacity constraint for each flight leg a so that:

$$\sum_{z \in V(a)} S_z = C_a$$

by introducing a Lagrange multiplier $\lambda_b$ for each flight leg a so that:

$$\sum_{z \in V(a)} Q_z \left( \sum_{b \in U(z)} \lambda_b / f_z \right) = C_a$$

for all $a \in A$ wherein:
(a) z represents an itinerary/fare class;
(b) Z represents a set of all itinerary/fare classes;
(c) a represents a flight leg;
(d) A represents a set of all flight legs;
(e) V(a) represents the set of all itinerary/fare classes that use flight leg a;
(f) b represents a flight leg of the itinerary/fare class z;
(g) U(z) represents the set of all flight legs used by the itinerary/fare class z;
(h) $d_z(x)$ represents a demand distribution function for the itinerary/fare class z;
(i) $S_z$ represents a booking limit for the itinerary/fare class z;
(j) $C_a$ represents a capacity for the flight leg a;
(k) $f_z$ represents a revenue yield for each seat in the itinerary/fare class z;
(l) $R_z(S_z)$ represents an expected total revenue for the itinerary/fare class z so that:

$$R_z(S_z) = f_z \left[ \int_{-\infty}^{S_z} x d_z(x) dx = S_z \int_{S_z}^{\infty} d_z(x) dx \right]$$

(m) $R_z'$ represents a derivative of $R_z$, i.e., an expected marginal seat revenue for satisfying additional demand in excess of $S_z$ in the itinerary/fare class z, so that:

$$R_z'(S_z) = \left( \frac{\partial}{\partial S_z} \right) R_z(S_z) = f_z \int_{S_z}^{\infty} d_z(x) dx$$

(n) $Q_z$ represents an inverse of $R_z'$ wherein $Q_z(R_z'(S_z)/f_z) = S_z$; and (o) $\lambda_b$ represents an expected marginal seat revenue generated by an additional seat in the flight leg b of the itinerary.

16. The system of claim 14, wherein the means for refining further comprises means for solving a plurality of linear equations for each Newton-Raphson iteration using a Conjugate Gradient iteration.

17. The system of claim 16, where in the means for solving comprises:

(a) means for representing a Jacobian matrix as a summation of a plurality of itinerary matrices, each itinerary matrix comprising a set of identical entries characteristic of an itinerary, the entries comprising partial derivatives of the residual capacity of the itinerary with respect to the expected marginal seat revenues of the flight legs of the itinerary; and (b) means for accumulating the product of the itinerary matrices and an arbitrary vector into a product of the Jacobian matrix and the arbitrary vector on an itinerary-by-itinerary basis.

18. The system of claim 16, wherein the means for solving further comprises means for terminating the Conjugate Gradient iteration when an approximate solution to the linear system of equations satisfies the convergence criterion defined by:

$$\frac{\| J \delta_\iota - \gamma_\iota \|_2}{\| \gamma_\iota \|_2} \leq \eta_\iota$$

so that $$\eta_\iota = \min \left( \frac{1}{(\iota + 2)}, k \| \gamma_\iota \|_2^t \right)$$

for $0 \leq t \leq 1$ wherein:
(1) J is a Jacobian matrix comprised of a summation of a plurality of itinerary matrices, each itinerary matrix comprising a set of identical entries characteristic of an itinerary, the entries comprising partial derivatives of a residual capacity of the flight legs of the itinerary with respect to the expected marginal seat revenues of the flight legs of the itinerary;
(2) $\delta_1$ is a vector comprising adjustments to the expected marginal seat revenues;
(3) $\gamma_1$ is a vector comprising the residual capacities of the flight legs;
(4) $\iota$ denotes an $\iota$th iterated vector;

(5) $\eta_1$ is a relaxation coefficient; and
(6) $\kappa$ is an arbitrary constant.

19. A yield management system, comprising:
(a) a programmed computer;
(b) data storage means, coupled to the programmed computer, for storing a database describing a known resource capacity for each of a plurality of resource categories, a known demand distribution for each of a plurality of demand categories, a known revenue yield for a resource reserved within each deamand category, and a booking limit for each demand category;
(c) the programmed computer including assignment means for processing the database to assign resources in a resource category to a plurality of demand categories, the assignment means comprising:
 (1) means for formulating a plurality of nonlinear equations representing a constrained optimization of an expected total revenue for the database and a plurality of Lagrange multipliers each representing an expected marginal resource revenue for an additional resource available on a resource category; and
 (2) means for refining an initial approximation of a solution to the nonlinear equations using a Newton-Raphson iteration to provide a globally optimal set of expected marginal resource revenues and booking limits.

20. The system of claim 19, wherein the means for formulating comprises means for maximizing the expected total revenue for the network, the expected total revenue being defined by:

$$R = \sum_{z \in Z} R_z(S_z)$$

subject to a capacity constraint for each resource category a so that:

$$\sum_{z \in V(a)} S_z = C_a$$

by introducing a Lagrange multiplier $\lambda$ for each resource category a so that:

$$\sum_{z \in V(a)} Q_z \left( \sum_{b \in U(z)} \lambda_b / f_z \right) = C_a$$

for all $a \in A$ wherein:
(a) z represents a demand category;
(b) Z represents a set of all demand categories;
(c) a represents a resource category;
(d) A represents a set of all resource categories;
(e) V(a) represents the set of all demand categories that use resource category a;
(f) b represents a resource category of the demand category z;
(g) U(z) represents the set of all resource categories used by the demand category z;
(h) $d_2(x)$ represents a demand distribution function for the demand category z;
(i) $S_2$ represents a booking limit for the demand category z;
(j) $C_a$ represents a capacity for the resource category a;
(k) $f_z$ represents a revenue yield for each resource in the demand category z;
(l) $R_z(S_z)$ represents an expected total revenue for the demand category z so that:

$$R_z(S_z) = f_z \left[ \int_{-\infty}^{S_z} x d_z(x) dx = S_z \int_{S_z}^{\infty} d_z(x) dx \right]$$

(m) $R_z'$ represents a derivative of $R_z$, i.e., an expected marginal resource revenue for satisfying additional demand in excess of $S_z$ in the demand category z, so that:

$$R_z'(S_z) = \left( \frac{\partial}{\partial S_z} \right) R_z(S_z) = f_z \int_{S_z}^{\infty} d_z(x) dx$$

(n) $Q_z$ represents an inverse of $R_z'$ wherein $Q_z(S_z')(S_z)/f_z = S_z$; and
(o) $\lambda_b$ represents an expected marginal resource revenue generated by an additional resource in the resource category b.

21. The system of claim 19, wherein the means for refining further comprises means for solving a plurality of linear equations for each Newton-Raphson iteration using a Conjugate Gradient iteration.

22. The system of claim 21, wherein the means for solving further comprises means for terminating the Conjugate Gradient iteration when an approximate solution to the linear system of equations satisfies the convergence criterion defined by:

$$\frac{\| J\delta_\iota - \gamma_\iota \|_2}{\| \gamma_\iota \|_2} \leq \eta_\iota$$

so that $$\eta_\iota = \min \left\{ \frac{1}{(\iota + 2)}, k \| \gamma_\iota \|_2{}^\iota \right\}$$

for $0 \leq \iota \leq 1$ wherein:
(1) J is a Jacobian matrix comprised of a summation of a plurality of demand category matrices, each demand category matrix comprising a set of identical entries characteristic of the demand category, the entries comprising partial derivatives of a residual capacity of the resource categories used by the demand category with respect to the expected marginal resource revenues of those resource categories;
(2) $\delta_{76}$ is a vector comprising adjustments to the expected marginal resource revenues;
(3) $\gamma_{76}$ is a vector comprising the residual capacities of the resource categories;
(4) $\iota$ denotes an $\iota$th iterated vector;
(5) $\eta_{76}$ is a relaxation coefficient; and
(6) $\kappa$ is an arbitrary constant.

* * * * *

UNITED STATES PATENT AND TRADEMARK OFFICE
CERTIFICATE OF CORRECTION

PATENT NO. : 5,255,184  
DATED : October 19, 1993  
INVENTOR(S) : Scot W. Hornick et al.

Page 1 of 6

It is certified that error appears in the above-indentified patent and that said Letters Patent is hereby corrected as shown below:

In column 6, line 59, after the letters "$S_{(s,t)}$", insert --$\triangle$--.

In column 7, lines 9-10, "$\sum\limits_{\substack{p \in PS_p \\ a \in p}}$" should read --$\sum\limits_{\substack{p \in P \\ a \in p}} S_p$--.

In column 7, lines 22-23, "$\sum\limits_{\substack{p \in PS_p \\ a \in p}}$" should read --$\sum\limits_{\substack{p \in P \\ a \in p}} S_p$--.

In column 7, line 23, "R" should read --$\hat{R}$--.

In column 7, line 29, "R" should read --$\hat{R}$--.

In column 7, line 40, after the letters "$(S_p^i)$", insert --$\triangle$--.

In column 7, line 44, "R" should read --$\hat{R}$--.

In column 7, line 58, "(.)" should read --(·)--.

In column 7, line 60, "(.)" should read --(·)--.

UNITED STATES PATENT AND TRADEMARK OFFICE
CERTIFICATE OF CORRECTION

PATENT NO. : 5,255,184
DATED : October 19, 1993
INVENTOR(S) : Scot W. Hornick et al.

It is certified that error appears in the above-indentified patent and that said Letters Patent is hereby corrected as shown below:

In column 8, line 12, "(.)" should read --(·)--.

In column 8, line 65, after the letter "(x)", insert --$\triangle$--.

In column 9, line 14, "( )" should read --(·)--.

In column 9, line 28, "$\lambda$" (all occurrences) should read --$\gamma$--

In column 9, line 42, after the letters "a,b", insert --$\triangle$--.

In column 9, line 51, "$\lambda_i$" should read --$\lambda_\iota$--.

In column 9, line 51, "ith" should read --$\iota$th--.

In column 10, line 7 after the letter "(x)", insert --$\triangle$--.

In column 10, line 7, "2²" should read -- $2^2$ --.

In column 10, line 15 after the letter "(x)", insert --$\triangle$--.

In column 10, line 30, "$f(\delta_1) \: \frac{1}{2} \: \delta_1^T A\delta_1 - \delta_1^T \gamma_1$" should read --$f(\delta_\iota) \triangleq \frac{1}{2} \delta_\iota{}^T A\delta_\iota - \delta_\iota{}^T \gamma_\iota$--.

In column 11, line 27, "$| \leq |$" should read --$| \leq |$--.

In column 11, line 57, "$\leq \eta_1$" should read --$\leq \eta_\iota$--.

In column 11, line 63, "$\leq t \leq 1$" should read --$\leq t \leq 1$--.

UNITED STATES PATENT AND TRADEMARK OFFICE
CERTIFICATE OF CORRECTION

PATENT NO. : 5,255,184
DATED : October 19, 1993
INVENTOR(S) : Scot W. Hornick et al.

It is certified that error appears in the above-indentified patent and that said Letters Patent is hereby corrected as shown below:

In column 12, line 30, "$\mu_a i$" should read -- $\hat{\mu}_a i$ --.

In column 12, line 34, "$\sigma_a i$" should read -- $\hat{\sigma}_a i$ --.

In column 12, line 53, "$f_a i$" should read -- $\hat{f}_a i$ --.

In column 12, line 54, "$\mu_a i$" should read -- $\hat{\mu}_a i$ --.

In column 12, line 67, "$\lambda$" (both occurrences) should read -- $\hat{\lambda}$ --

In column 13, line 3, "$\sqrt{2\pi}\sigma_a^i$", should read -- $\sqrt{2\pi}\hat{\sigma}_a^i$ --.

In column 13, line 3, "$2\lambda_a^{(t)}$", should read -- $2\hat{\lambda}_a^{(t)}$ --.

In column 13, line 3, "$\gamma_a^{(t)}$" should read -- $\hat{\gamma}_a^{(t)}$ --

In column 13, line 5, "$f_a^i$", should read -- $\hat{f}_a^i$ --.

UNITED STATES PATENT AND TRADEMARK OFFICE
CERTIFICATE OF CORRECTION

PATENT NO. : 5,255,184
DATED : October 19, 1993
INVENTOR(S) : Scot W. Hornick et al.

It is certified that error appears in the above-indentified patent and that said Letters Patent is hereby corrected as shown below:

In column 13, line 15, "(.)" should read --(·)--.

In column 13, line 20, "$\underline{\leq}$" should read --$\leq$--.

In column 15, line 46, after the word "i.e.," "$\delta$" should read --$\lambda$--.

In column 18, line 8, "$\epsilon$" should read --$\lambda$--.

In column 18, line 45, "0.05" should read --0.5--.

In column 20, line 24, "$\epsilon$" should read --$\delta$--.

In column 20, line 25, "$\epsilon$" should read --$\delta$--.

In column 20, line 60, "$\epsilon$" should read --$\delta$--.

In column 20, line 61, "$\delta$" should read --$\epsilon$--.

In column 29, line 48, "$\underline{\geq}$" should read --$\geq$--.

In column 31, line 19, "$d_2(x)$" should read --$d_z(x)$--.

In column 31, line 40, "$\partial S_z$" should read --$\partial S_z$--.

In column 31, line 52, "where in" should read --wherein--.

In column 32, line 5, "$\underline{\leq}$" should read --$\leq$--.

In column 32, line 68, after the word "globally", insert --optimal--.

UNITED STATES PATENT AND TRADEMARK OFFICE
CERTIFICATE OF CORRECTION

PATENT NO. : 5,255,184        Page 5 of 6
DATED : October 19, 1993
INVENTOR(S) : Scot W. Hornick et al.

It is certified that error appears in the above-indentified patent and that said Letters Patent is hereby corrected as shown below:

In column 34, line 24, "$\leqq$" should read --$\leq$--.

In column 34, line 32, "$\leqq t \leqq$ 1" should read --$\leq t \leq$ 1--.

In column 34, line 44, "$\delta_1$" should read --$\delta_\iota$--.

In column 34, line 46, "$\gamma_1$" should read --$\gamma_\iota$--.

In column 34, line 49, "$\eta_1$" should read --$\eta_\iota$--.

In column 36, line 25, "where in" should read --wherein--.

Col. 36, line 45, "$|\gamma|_2\leqq$" should read --$|\gamma_\iota|_2\leq$--.

In column 36, line 53, "$\leqq t \leqq$ 1 should read --$\leq t \leq$ 1--.

In column 36, line 64, "$\delta_1$" should read --$\delta_\iota$--.

In column 36, line 66, "$\gamma_1$" should read --$\gamma_\iota$--.

In column 37, line 1, "$\eta_1$" should read --$\eta_\iota$--.

In column 37, line 11, "deamand" should read --demand--.

In column 37, line 46, "$\lambda$" should read --$\lambda_b$--.

In column 37, line 66, "$d_2(x)$" should read --$d_z(x)$--.

In column 38, line 1, "$S_2$" should read --$S_z$--.

UNITED STATES PATENT AND TRADEMARK OFFICE
CERTIFICATE OF CORRECTION

PATENT NO. : 5,255,184
DATED : October 19, 1993
INVENTOR(S) : Scot W. Hornick et al.

It is certified that error appears in the above-indentified patent and that said Letters Patent is hereby corrected as shown below:

In column 38, line 25, "$(S_z')$" should read --$(R_z')$--.

In column 38, line 40, "$\cong$" should read --$\leq$--

In column 38, line 46, "$|\Upsilon|_2^t$" should read --$|\Upsilon_1|\frac{t}{2}$--.

In column 38, line 48, "$\leq t \leq 1$" should read --$\leq t \leq 1$--.

Col. 38, line 60, "$S_{76}$" should read --$S_\iota$--.

In column 38, line 62, "$\Upsilon_{76}$" should read --$\Upsilon_\iota$--.

In column 38, line 65, "$\eta_{76}$" should read --$\eta_\iota$--.

Signed and Sealed this

Tenth Day of January, 1995

Attest:

BRUCE LEHMAN

*Attesting Officer*     *Commissioner of Patents and Trademarks*